Dec. 31, 1963 R. J. LA MANNA ETAL 3,116,410

SIMPLE GENERAL PURPOSE DIGITAL COMPUTER

Filed Nov. 30, 1959 9 Sheets-Sheet 1

INVENTORS:
Richard J. LaManna
Verne H. Wilson
Vincent I. Pogorzelski
Mark Pivovonsky By Marvin H. Kleinberg
Attorney.

SIMPLE GENERAL PURPOSE DIGITAL COMPUTER

Filed Nov. 30, 1959 9 Sheets-Sheet 2

Fig. 3a (Skip-Execute)

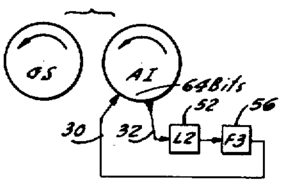

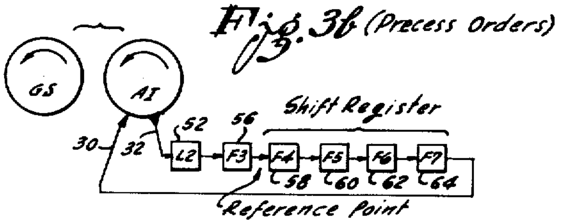

Fig. 3c (Ts-Execute)

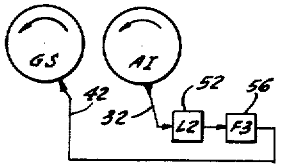

Fig. 3d (TA-Execute)

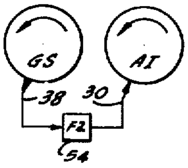

Fig. 3e (Output-Execute)

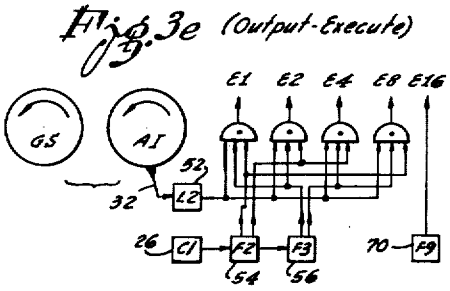

Fig. 3f (Input-Execute)

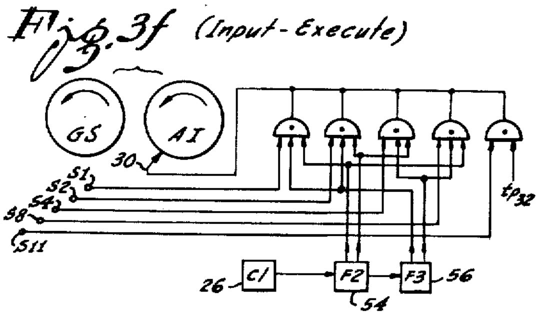

Fig. 3g (Extract-Execute)

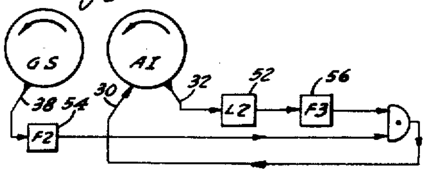

Fig. 3h (Add or Subtract-Execute)

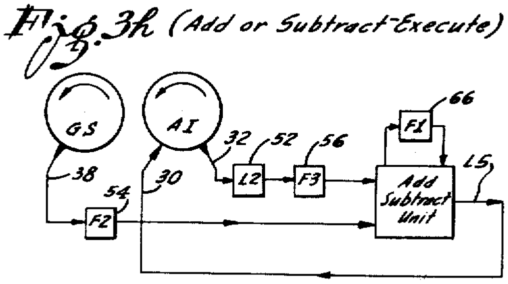

Fig. 3i (Address Count-down precess Time)

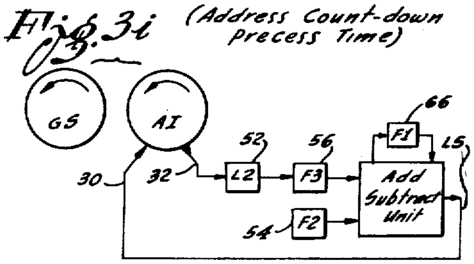

Fig. 3j (Shift Right-Execute)

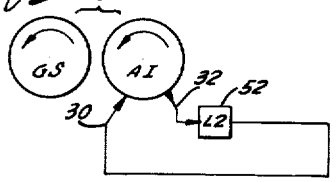

Fig. 3l (Instruction Transfer–Precess)

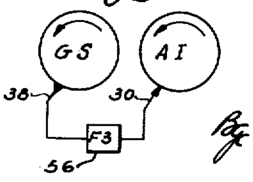

INVENTORS:
Richard J. LaManna
Verne H. Wilson
Vincent T. Pogorzelski
Mark Pivovonsky
By Marvin H. Kleinberg
Attorney SIMPLE GENERAL PURPOSE DIGITAL COMPUTER
Filed Nov. 30, 1959 9 Sheets-Sheet 3
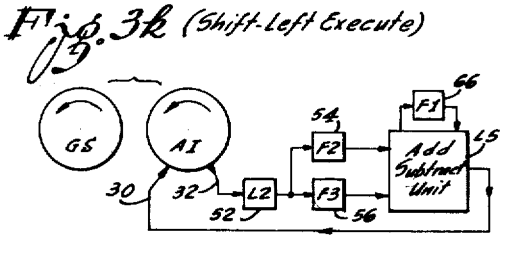
Fig. 3k (Shift-Left Execute)
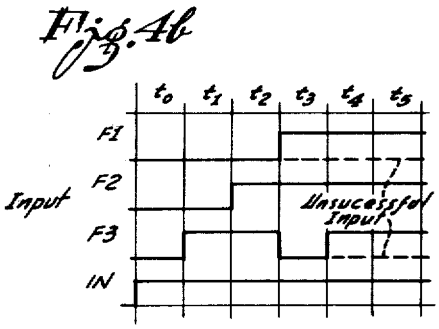
Fig. 4b
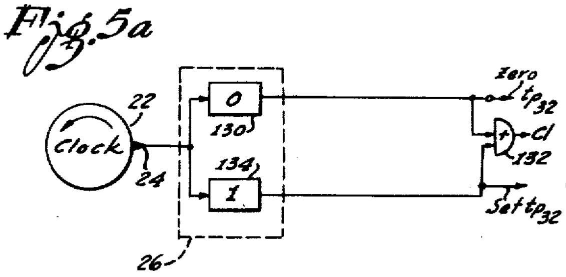
Fig. 5a
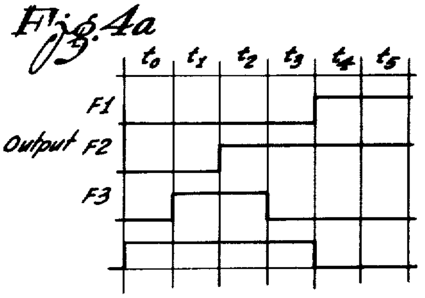
Fig. 4a
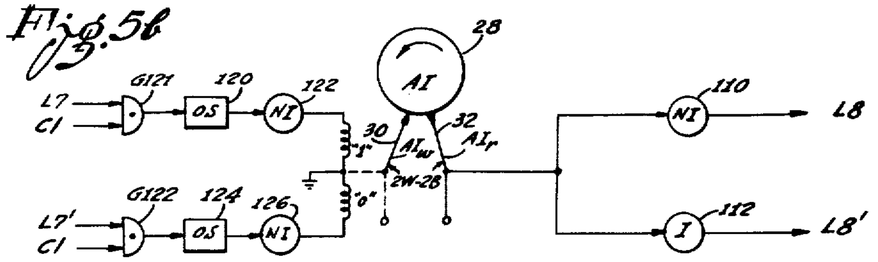
Fig. 5b
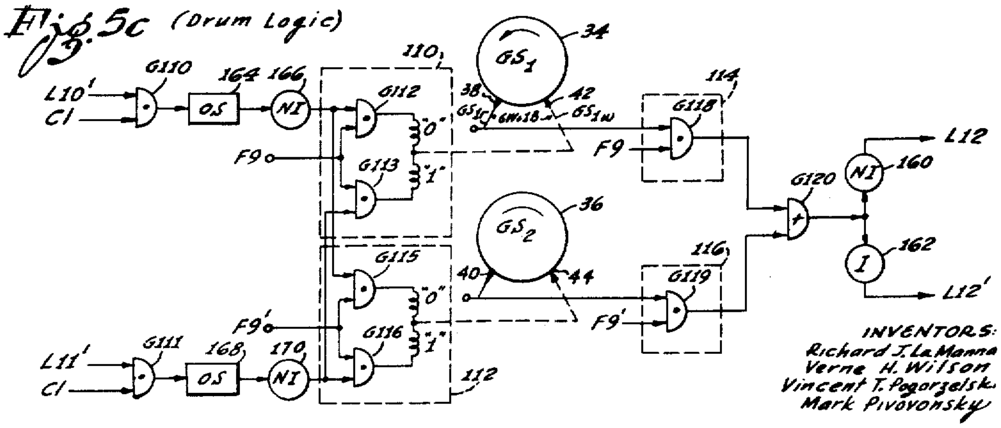
Fig. 5c (Drum Logic)
INVENTORS:
Richard J. La Manna
Verne H. Wilson
Vincent T. Pogorzelski
Mark Pivovonsky
By Marvin H. Kleinberg
Attorney SIMPLE GENERAL PURPOSE DIGITAL COMPUTER
Filed Nov. 30, 1959 9 Sheets-Sheet 4
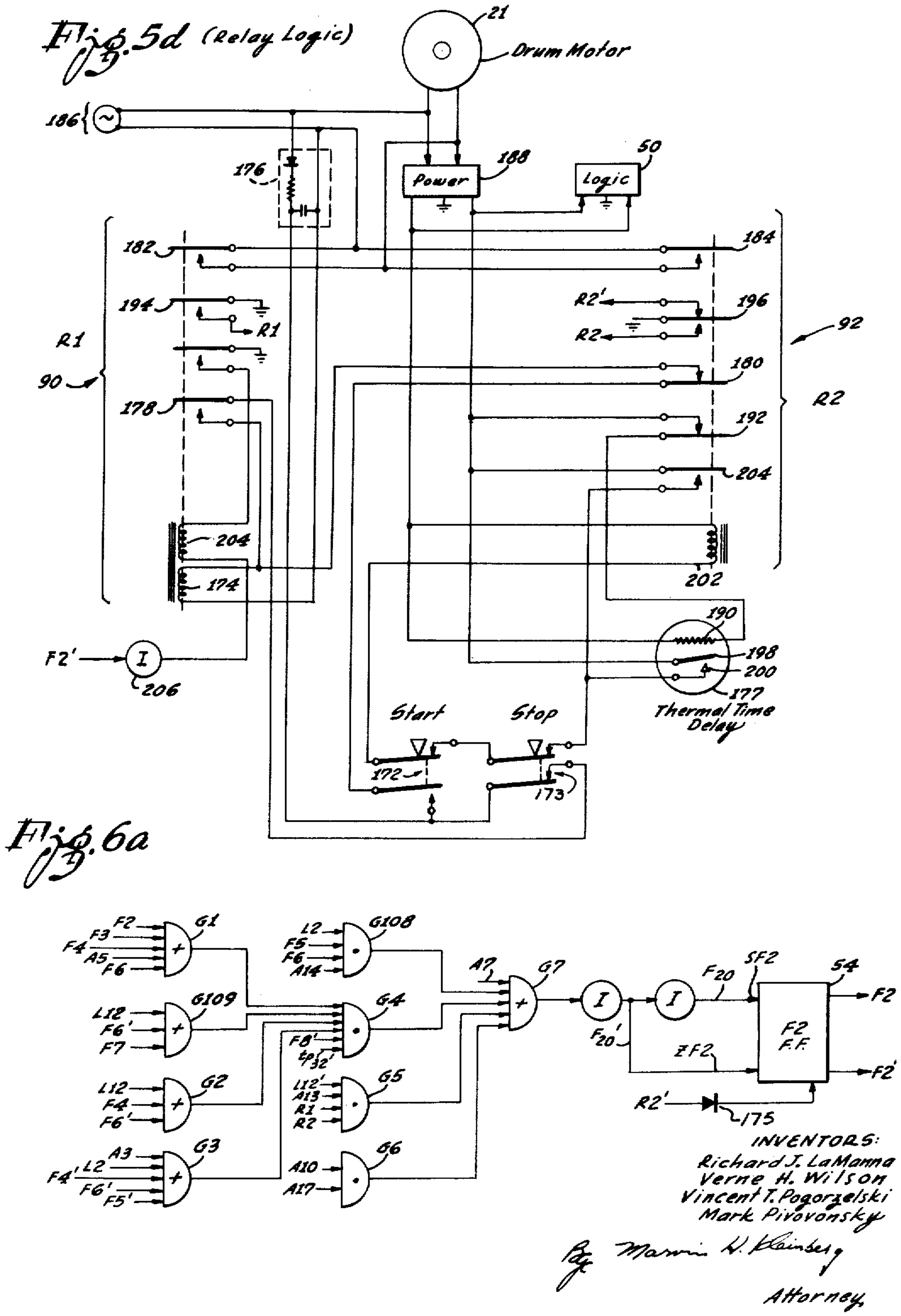
Fig. 5d (Relay Logic), Fig. 6a
INVENTORS:
Richard J. LaManna
Verne H. Wilson
Vincent T. Pogorzelski
Mark Pivovonsky
By Marvin W. Kleinberg
Attorney SIMPLE GENERAL PURPOSE DIGITAL COMPUTER
Filed Nov. 30, 1959 9 Sheets-Sheet 5
Fig. 6b
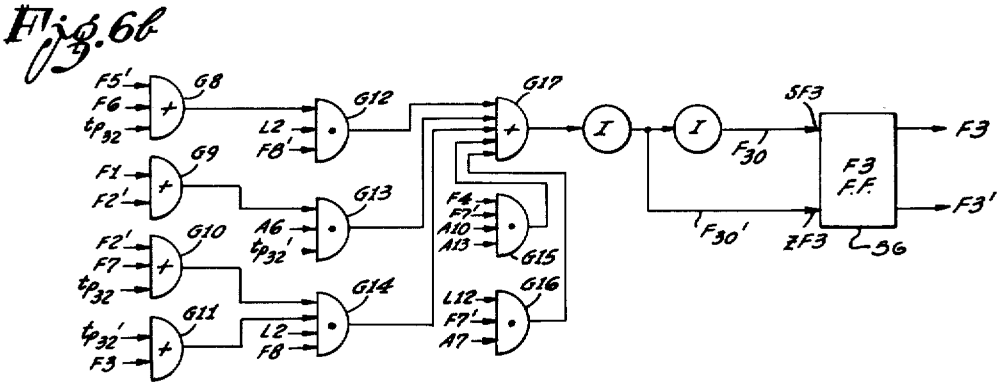
Fig. 6c (GS Write)
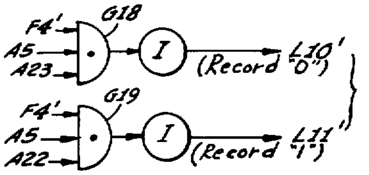
Fig. 6d (AI Write)
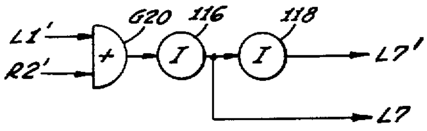
Fig. 6e (Add-Subtract Unit), Fig. 6f (Shift-Register), Fig. 6i (Shift-Register), Fig. 6g (Process-Execute Clock), Fig. 6h (AI Playback)
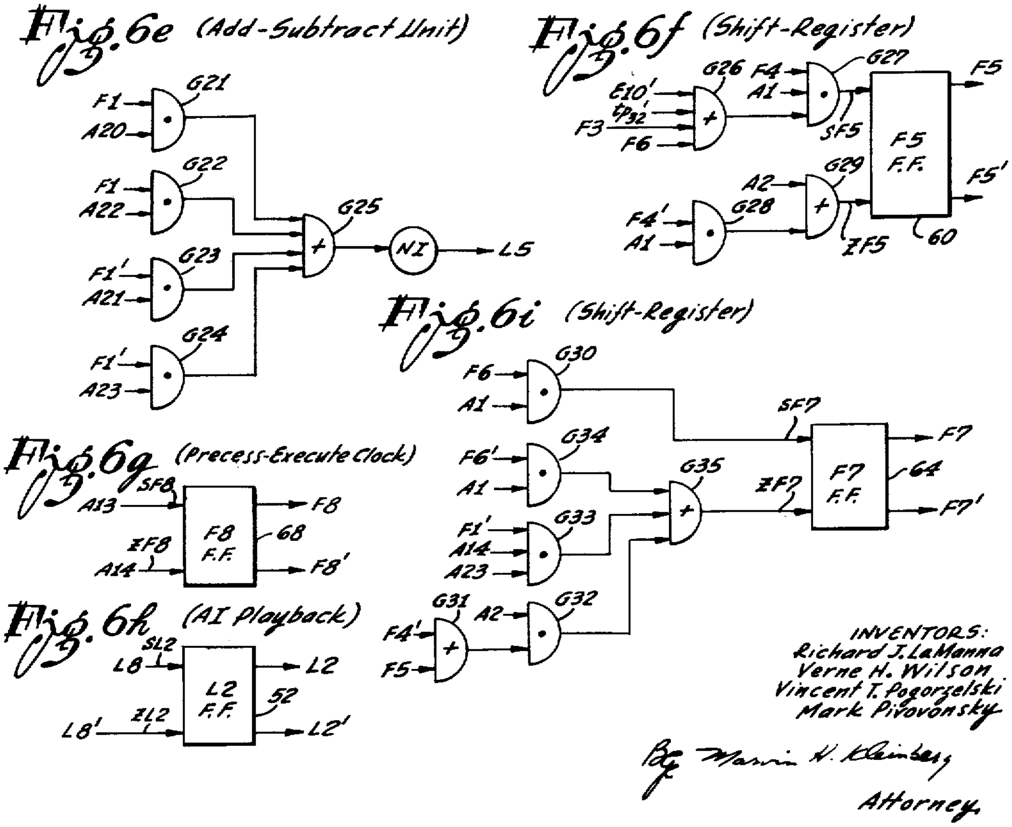
INVENTORS:
Richard J. LaManna
Verne H. Wilson
Vincent T. Pogorzelski
Mark Pivovonsky
By Marvin H. Kleinberg
Attorney

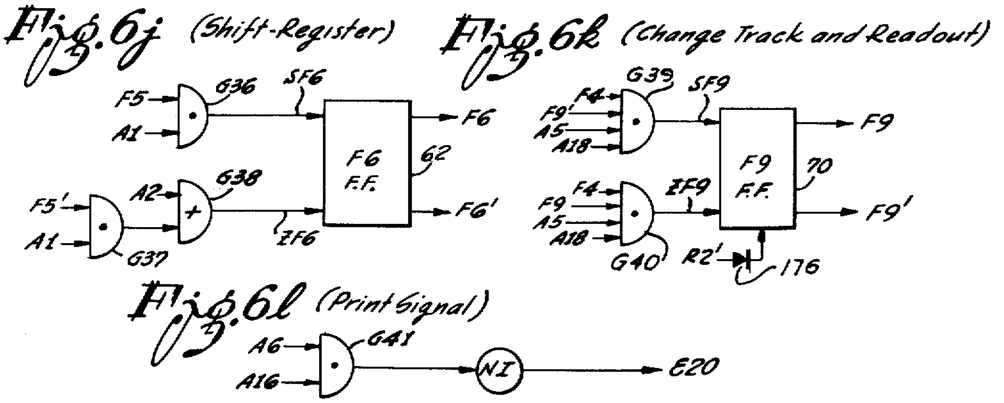
Fig. 6j (Shift-Register), Fig. 6k (Change Track and Readout), Fig. 6l (Print Signal)
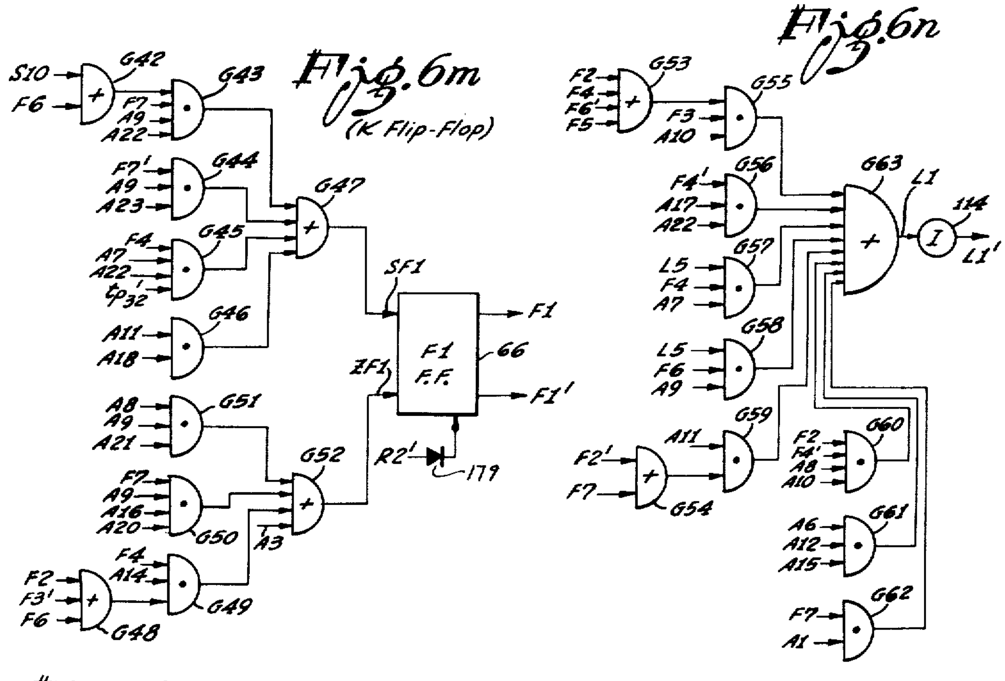
Fig. 6m (K Flip-Flop), Fig. 6n
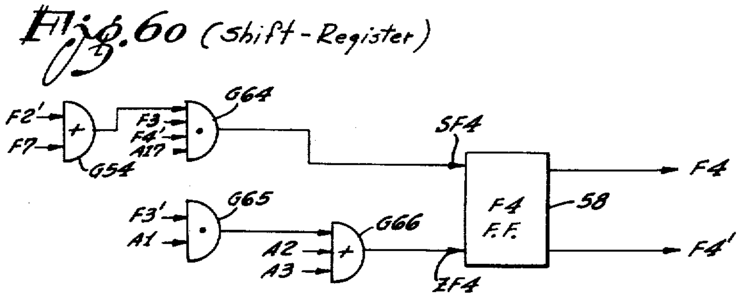
Fig. 6o (Shift-Register)
INVENTORS:
Richard J. LaManna
Verne H. Wilson
Vincent I. Pogorzelski
Mark Pivovonsky
By Marvin H. Kleinberg
Attorney INVENTORS:
Richard J. LaManna
Verne H. Wilson
Vincent T. Pogorzelski
Mark Pivovonsky
By Marvin H. Kleinberg
Attorney

SIMPLE GENERAL PURPOSE DIGITAL COMPUTER

Filed Nov. 30, 1959 9 Sheets-Sheet 8

INVENTORS:
Richard J. LaManna
Verne H. Wilson
Vincent T. Pogorzelski
Mark Pivoronsky By Marvin H. Kleinberg
Attorney INVENTORS:
Richard J. LaManna
Verne H. Wilson
Vincent T. Pogorzelski
Mark Pivovonsky
BY J. L. Knight
Attorney United States Patent Office 3,116,410

Patented Dec. 31, 1963

3,116,410

SIMPLE GENERAL PURPOSE DIGITAL COMPUTER

Richard J. La Manna, Hanover Township, Verne H. Wilson and Vincent T. Pogorzelski, East Orange, and Mark Pivovonsky, Lyndhurst, N.J., assignors to Monroe Calculating Machine Company, Orange, N.J.

Filed Nov. 30, 1959, Ser. No. 856,183

41 Claims. (Cl. 235—157)

This invention relates to general purpose serial computer apparatus. More particularly, in an important aspect, the invention relates to a digital computer having at least two synchronized information circulating loops.

In the present invention, the relatively short or minor loop is synchronized to the relatively long or major loop in an epicyclic timing relation. The computer operating cycle is based upon the recirculation of the minor loop and is divided into two phases. During the first of these one of many command codes is extracted from the minor loop. During the second of these phases the extracted command is executed upon a serially presented operand also circulating in the minor loop and, in certain instances, upon a second operand concurrently presented in serial fashion by the major loop.

This computer is characterized by a displacement type of relative addressing. In this type of addressing the address of the group of commands next to be executed by the minor loop may be a predetermined distance removed from the location in the major loop of the group of commands last transferred to the minor loop. Alternatively this address may be determined by specifying the amount of the displacement of this next group along the circulating major information loop relative to the current position of the minor loop.

Using relative addresses achieves a high efficiency in the use of equipment by avoiding the waste of providing the equipment necessary for searching throughout a serial memory for absolute addresses. Thus, in accordance with an important feature of our invention, addresses are absent in certain operations involving transfers from the major to the minor loop.

THEORETICAL DESCRIPTION

Our invention discloses a computer which is intermediate on the one hand between a Turing type of computer, which by operating in a bidirectional serial manner on one binary bit at a time, uses a minimum of equipment at the expense of very slow operation, and on the other hand, a large scale stored-program parallel type of computer, which achieves very high speed operation at the expense of voluminous and complex equipment. Because of its efficiency, our computer is capable of performing calculations involving business and scientific general purpose programs economically at speeds compatible with electromechanical input and output devices. At the same time computers in accordance with our invention require far less equipment than other general purpose computers. In addition, our invention teaches a computer organization which permits the stored program corresponding to a given computational purpose or format to be injected into the computer by a separate program loading device which can be shared by many such computers with consequent economy.

A basic principle of our invention is to use a minor circulating memory loop of reference information in such a way that the minor loop at any instant contains both a group of operating instructions and multiple digit accumulator information. Our invention, in one preferred embodiment, then divides the time of circulation of this minor loop into two phases or half cycles during the first of which, designated "precess time," one of the instructions of the group is shifted out of this minor loop into an instruction register. During the second phase, designated "execute time," the remembered instruction may be executed. Due to this automatic precession of the instructions, each instruction of a relatively large group may be executed in sequence without need for further transfer of instructions from the major loop until the entire group of instructions in the short, or minor loop is exhausted.

In this way of philosophy of "opportunity" is applied. Thus, while the main memory loop is moving toward the location of an eventually needed piece of stored information, the short loop is processing other pieces of stored information which lie on the way to the indicated location. The results of this last noted processing are deposited at relative positions known to the programmer. This may be considered to be an "addressless" type of computing which flows from the continuously active two-phase minor loop in accordance with our invention.

A computer in accordance with our invention may be designed to execute directly as "micro-operations" such operations as storage to accumulator and accumulator to storage transfers, subtract, add, various jumps and conditional operations, and the input and output of a single character. A micro-program instruction corresponds to the performance of a single such operation upon every bit of a following word. If a micro-program instruction is modified during an execute cycle, the modified instruction advantageously may be executed during the remainder of the cycle.

Other macroscopic operations, such as multiplications, input and output of entire words, binary to decimal and decimal to binary conversions, and other specific operations that may be required for a particular application are programmed in terms of the foregoing primary micro-program operations.

Toward further minimizing equipment complexity, structures in accordance with our invention, employ time sharing of components made possible by the division of the circulation of the short circulating loop into the separate time phases of precessing and executing.

COMPONENT PARTS

The elements of our invention include the two foregoing memory loops each with a reading station and a writing station. In the long or general storage loop, the writing station is "downstream" from the reading station so that information at a given location may be processed and replaced with the result of the processing at the same location. Conversely, in the short loop the reading station is advantageously "downstream" from the writing station. Thus, the information in the short loop advantageously may be continuously regenerated. These loops are preferably in the physical form of tracks on the surface of a magnetic drum, but, within the scope of our invention, they may also comprise a magnetic tape, a shift register, or any type of self-regenerating delay line.

These loops circulate information consisting of words each composed of a fixed number of binary bits. These equal length words may be either an instruction word, or a number word.

ORGANIZATION OF INFORMATION

In one preferred arrangement in accordance with our invention, information is stored in a channel having a fixed number of bits. The information stored in such a channel, by way of example, is divided into a fixed number of storage sectors, say seventy-nine such sectors. Advantageously this number is an odd number as later appears. The information of such an illustrative sector is further divided into groups. Illustratively, each sector contains a single binary indicating bit, a flag bit, and a word having thirty-two additional binary bits. Each word is further subdivided into a plurality of subgroups which together include the remaining bits assigned to a sector. These subgroups may, for example, have informational significance such as the designation of arithmetic operations to be performed or, simply, the value of a number.

TIMING

Clock means are provided to signal bit time and end of word time, and these times are made to be simultaneous for both circulating loops. End of word time is chosen to be coincident with the last bit in each word, and is conveniently designated $t_{32}$ for the above example, where $t_0$ is designated flag bit time.

A feature of our invention, as noted above, is the provision of an odd number of words or "sectors" in the general storage memory loop, and an even number of words (preferably two) in the short "instructions-accumulator" loop.

The consequence of this provision is that on successive circulations of the general storage loop, a given general storage sector will correspond in time alternately to the first, or instruction word, and then to the second, or operand number word, being circulated in the two-word instructions-accumulator loop. It is this feature which allows any word in the general storage loop to be read into the short working loop either as an operator (instruction group), or as an operand (number). Thus, when it is desired to obtain a new group of instructions from the general storage loop, a revolution of the general storage loop is selected in which the desired new instruction word will correspond in time to the instruction part of the short loop, whereas when it is desired to find a new operand (number word) from general storage, a revolution of the general storage loop is selected in which the desired number corresponds in time to the accumulator word in the short loop.

OPERATION OF THE COMPUTER

In accordance with our invention, during normal precess time, a word is read from the accumulator-instructions loop and is permitted by suitable gates to flow through a shift register having as many stages as there are bits in an instruction. The output of this shift register is then written back into the short, two word loop.

At the end of word time of this precess phase ($t_{32}$), the gate leading to the shift register is closed and the shifting operation is stopped thereby stranding the last (highest order) command in the shift register. Due to this diversion from simple regeneration (by passing through the shift register), and since each shift occupies one bit time, the original instruction word under discussion will be delayed at the end of word time relative to the short loop by the length of one instruction. It may be seen that each time this process occurs to an instruction word its information content is circulated or precessed within the word by one command in the direction of higher order.

A single stage binary counter (flip-flop) is provided to count the end of word time signals and thereby to provide the two logical signal levels dividing the computer time into precess time and execute time. When this counter signals that precess time is completed, the proper gates are operated to decode the instruction left in the foregoing shift register and to execute this instruction on each of the bits of the following number word read from the instructions accumulator loop, or from the general storage loop, or both, depending on the command.

For those commands requiring arithmetic processing, a simple binary adder-subtractor is provided having two inputs, one output, and a carry-borrow memory flip-flop which may be interrogated or reset by the logic of the system. When this memory flip-flop is not being used for arithmetic purposes, it serves the important function of being an independent, conditional reference flip-flop for decisions; this is in contradistinction to the usual computer practice of using an accumulator overflow as the condition for a decision.

Simultaneously with the execution of the order, the results of logical operation being performed may be recorded, bit-by-bit, either back on the instructions-accumulator loop, or on the general storage loop.

It is to be noted that, in accordance with a feature of our invention, all recording (writing) operations in our invention are of the type which automatically erase whatever previously recorded bits may have existed on the loop medium. Thus, a previously stored word is replaced with a new word.

INSTRUCTION WORD STRUCTURE

In a preferred embodiment of our invention, instruction signal combinations, i.e. information subgroups for designation of operations to be performed, are of four bits length. These four binary bits give rise to sixteen available instructions which may, illustratively, be allocated between twelve arithmetic operations and four displacement addressing operations. These displacement operations are those in which, for special programming purposes, the normal application sequence of operating instructions to stored information is interrupted and a new set of operating instructions introduced.

These instructions are thus executed in sequence under control of the word counter which repetitively alternates between states representing precess time and execute time, thereby bringing in a new four bit instruction from the current instruction word on each precession.

One of the above noted sixteen instructions, a "skip" instruction, is represented by a combination of all zeroes. This skip instruction does nothing except to regenerate the number in the accumulator portion of the short loop. The importance of this instruction appears hereafter.

After each instruction is executed, the instruction is cleared from the shift regitser (replaced by binary zeroes) so that the process of order code precession is characterized by a discontinuous march of the low order flag bit followed by these zeroes automatically injected from the shift register towards the high order end (last in time) of the instruction word.

A simplifying feature of our invention is the choice of a binary one for the flag bit in combination with the first three automatically following zero bits to comprise the four bit instruction for an automatic fixed length displacement command, designated "jump." After the last order written by the programmer has been executed, a 1000 signal combination artificially generated in the ninth precession enters the shift register and is decoded to effect a fixed displacement addressing operation. A new instruction word is transferred from the general storage without wasting program space in the original instruction word for a jump order. Obviously, the programmer must be sure to provide a new instruction word in general storage at the fixed jump distance from the end of the last instruction written.

It will be seen that this device of so choosing the pattern of a command code that its topology produces useful results is one illustration of a powerful method taught by our invention, and, as will be subsequently disclosed, used to convert one command code into another on the basis of a decision.

ADDRESSING OPERATIONS

The displacement addressing of our invention is accomplished by what we designate a jump delay instruction. When this instruction is included in an instruction word, room must be left to include the binary displacement address at the low order end of the instruction. This binary address number thus replaces one or more tetrads of bits which would otherwise be instructions. On decoding the jump delay, the logical network registers this fact in a "mode" flip-flip memory, and then does nothing for one execute period except to regenerate the information in the short loop. On the following precess period, the normal instruction word precession (through the shift register) is changed and instead, the remainder of the instruction word, which now comprises the binary number representing the displacement address, passes through one of the two inputs of the subtracting unit. The subtractor's output is stored in the short instructions-accumulator loop. In this way, by properly setting the other input of the subtractor, the address number suffers a diminution by one unit each time the short loop undergoes one regenerative circulation, namely, each two word times. Meanwhile, the number word in the accumulator is being regenerated intact during the entire jump.

When the address number in the instruction word has been reduced to zero, this fact is signalled by the condition of the borrow flip-flip, and this combination of conditions causes the logical network to terminate the jump with the reading of a new instruction group word from the general storage loop into the instruction word interval of the short loop.

In this manner, a relative address has been "counted down" to permit the computer to select from general storage a new set of commands as directed by the programmer. It will be seen in the following specification that during this count down, the flag bit has the additional and important function of marking the beginning of the address number regardless of the composition of the instruction word.

BRANCHING OPERATIONS

Branching in our computer may be accomplished by a jump conditional order. In this case, the fixed-displacement (jump order) seeking a new series of instructions is made to be conditional on the state of a condition indicator flip-flop, which can be made to be a memory for the success or failure or overflow of a previous operation. If this condition indicator memory flip-flop is not in the predetermined state to cause a jump, the logic is arranged to change the jump conditional command into a "skip" which regenerates the accumulator word in the short loop and proceeds to the next instruction in the current series.

It may be seen that a jump conditional order followed by a jump delay order, in which the delay or relative address is made to be equal to two circulations of the general storage loop, can be used to set up an iterative test or interrogation routine. The routine will continue until some external condition changes the state of the conditional reference flip-flop, thereby causing a jump and the starting of a new sequence of instructions. This interrogation routine is useful for entering input information if the computer must wait until it receives a keyboard signal, or in providing output information if the computer must also wait for a feedback signal from the printer signifying that it is no longer busy and is ready to receive a new print command.

SPECIAL CONSIDERATIONS

It is a characteristic of our invention that the epicyclic circulation is continuous, and, therefore, there can be no stop instruction in its commands. This fact makes the starting procedure of the computer an essential part of our invention, and it will be seen that we disclose a novel method of starting up and shutting down the machine in such a way as to enter and leave the epicyclic circulation state without destroying the stored program. The flag bits in the general storage track play an important part in this operation and in the loading operation, by providing an index signal to locate the initial instruction word.

Another feature of our invention is the "leap" command which inhibits the word counter action at $t_{32}$, thereby effectively interchanging precess time and execute time, and making the number word in the short loop an instruction word and vice versa. This order is useful in abridging the two circulation epicyclic correspondence period, and in using instruction words which have been built up as a number.

The remaining elements of our invention comprise an input register, an output register, a tetrad counter to distribute input and output signals between parallel and serial presentation, a mode flip-flop to distinguish between arithmetic and displacement type commands, and at least one delay flip-flop for giving early or "anticipated" access to the short circulating loops.

The gating and reset logic of the system is thus arranged to control the information flow between the reading and writing heads of the two loops, the shift register, the add-subtract net, and the input and output registers in accordance with signals received from the clock means, word counter, shift register, conditional reference flip-flop, tetrad counter, and mode flip-flop. In addition, the input and output devices are provided with switches to signal to the logic their availability.

Thus, in accordance with the invention, structures are provided for achieving related principal objects. These objects are to eliminate quiescent time in the utilization of computer elements thus to simplify, to render more economical, and to heighten the reliability of computer structures.

In achieving these objects it is a feature of the present invention that there are provided structures having a relatively short circulating information loop which contains an operand which is subjected to continuing modification in accordance with a group of instructions sequentially circulating with the operand in the information loop.

It is an additional feature of structures in accordance with the invention that instructions are precessed out of a working information loop into a staticizing register and then executed upon an operand following the same loop.

It is a further feature of the invention that there are provided structures having a series of micro-program instructions sequentially circulating in a loop with an accumulator number so that each micro-program instructions, in turn, is executed upon the accumulator number.

A further feature lies in the provision of structure for the relative addressing of groups of instructions in accordance with both programmed and unprogrammed instruction signal combinations.

Another feature of the invention lies in a circulating information loop in which an operand may be placed for being subjected to continuing modification in accordance with a group of instructions sequentially circulating with the operand in the information loop.

An additional feature is the provision of structures in which instructions are alternately precessed out of a working information loop into a register and then executed on an operand following in the same loop.

A still further feature of the invention is the provision of structures for accomplishing fixed displacement addressing in response to predetermined instruction signal combinations which selectively initiate transfers of information from a relatively long loop after a predetermined number of cycles of a relatively short loop.

An additional feature is the provision of logical branching paths upon the displacement of a relative address which is partially conditioned on the state of a memory device.

Another feature of the invention is a memory arrangement in which a specific word location in a major loop corresponds in time to a given word location in a minor loop only on alternate circulations of the major loop.

These and other objects, features, and advantages of the invention, both as to its organization and method of operation, will be better understood by consideration of the appended claims and from the following description considered in connection with the accompanying drawings in which several embodiments of the invention are illustrated by way of example. It is expressly to be understood, however, that the drawings are for the purpose of illustration and description only, and are not intended as a definition of the limits of the invention.

Figures 1, 2:
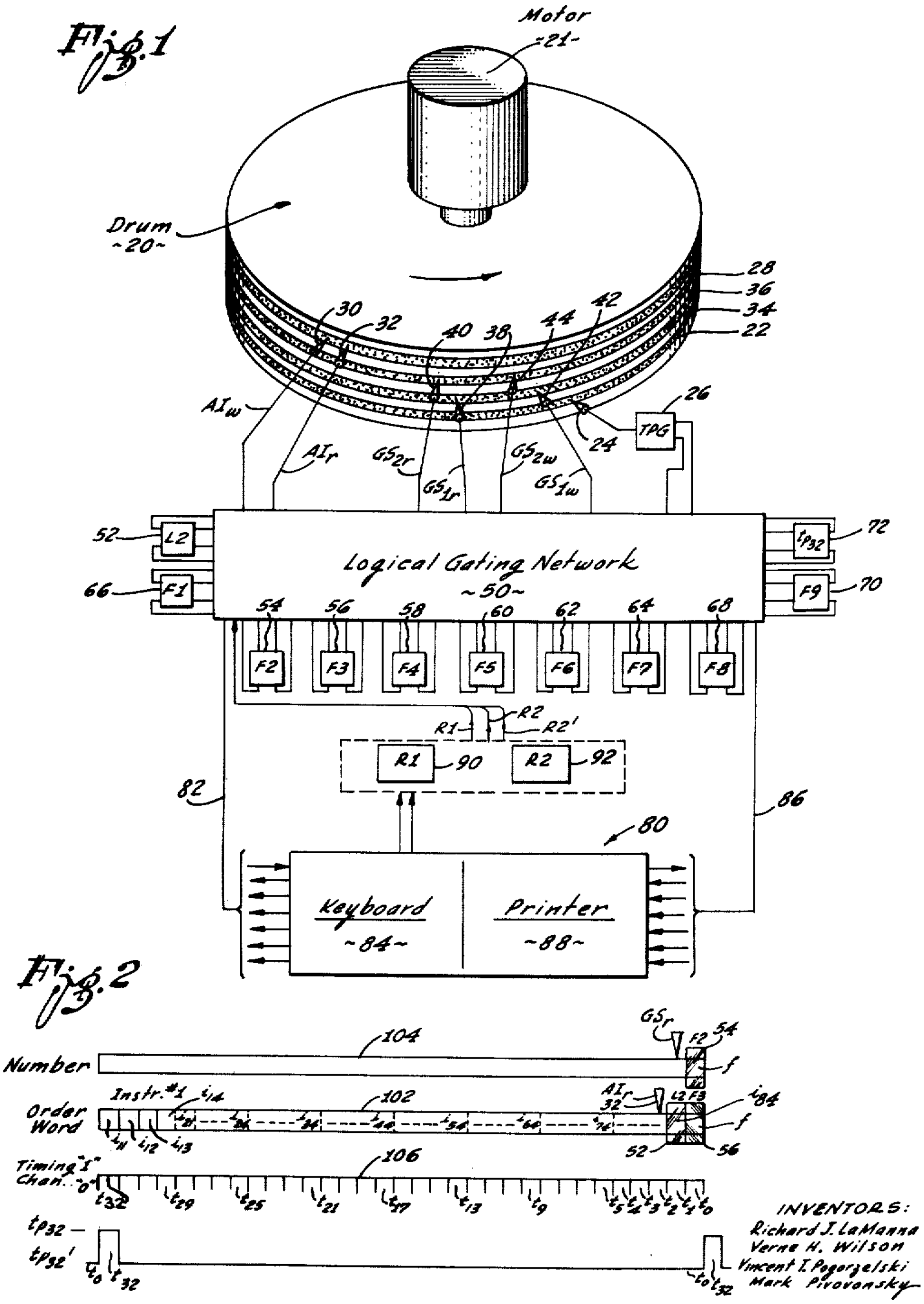
FIGURE 1 is a generalized illustration, partially in block and partially in isometric view of a preferred computer according to the present invention.
FIGURE 2 is a representation of a portion of the memory channels of the computer of FIGURE 1, showing the time correlation between cells of the timing channel and the corresponding cells of the A–I register.
Figure 6P:
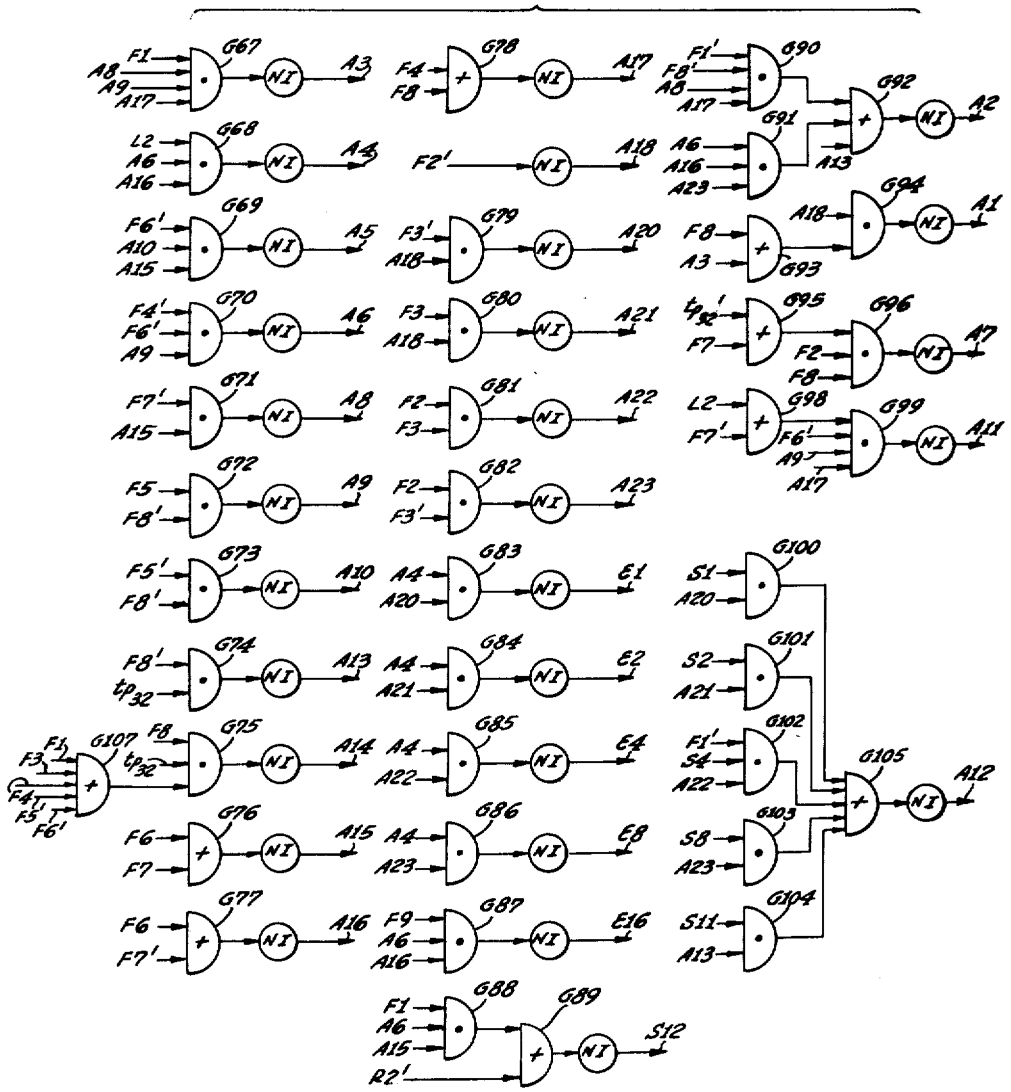
Figures 7A, 7B:
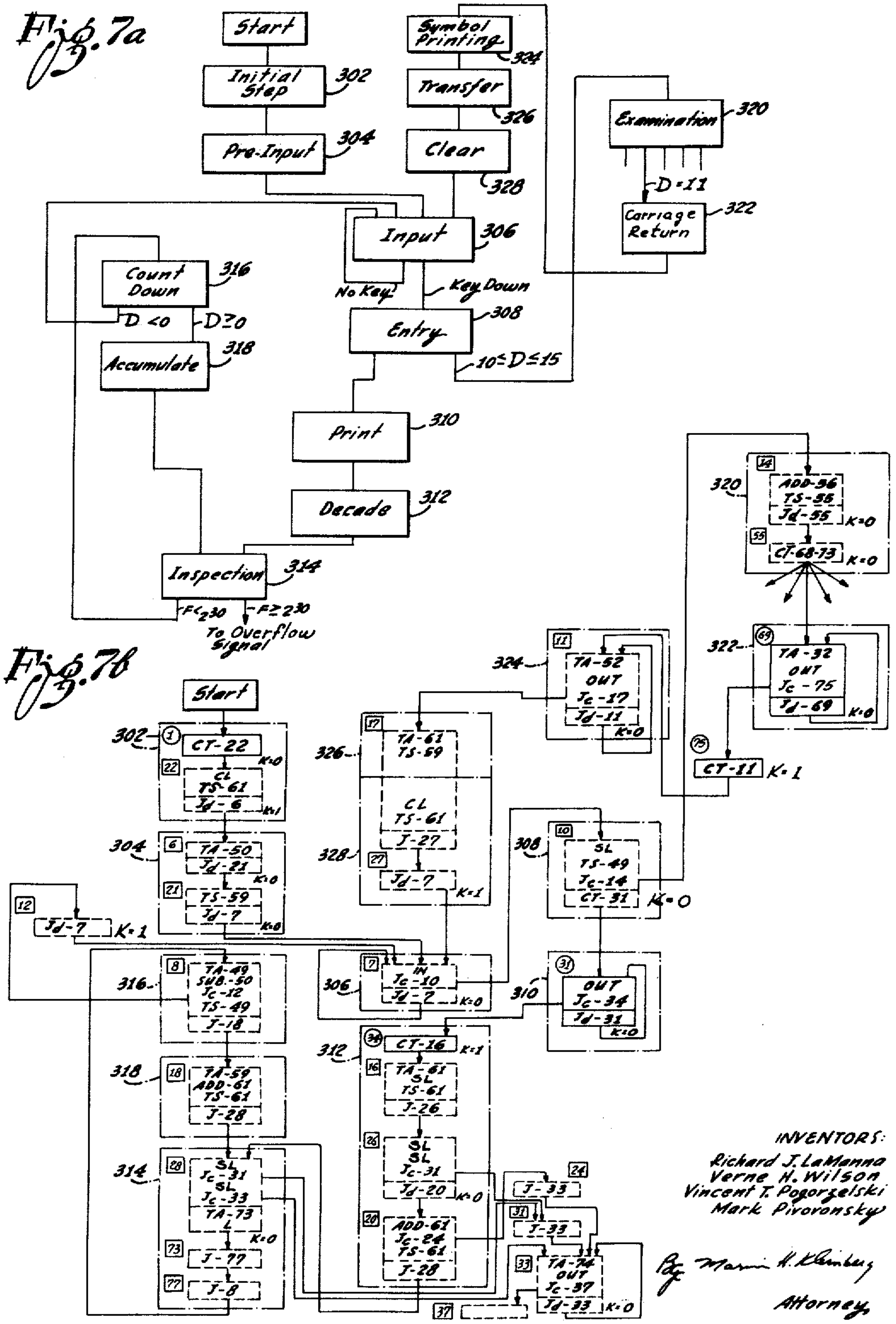
Figure 8:
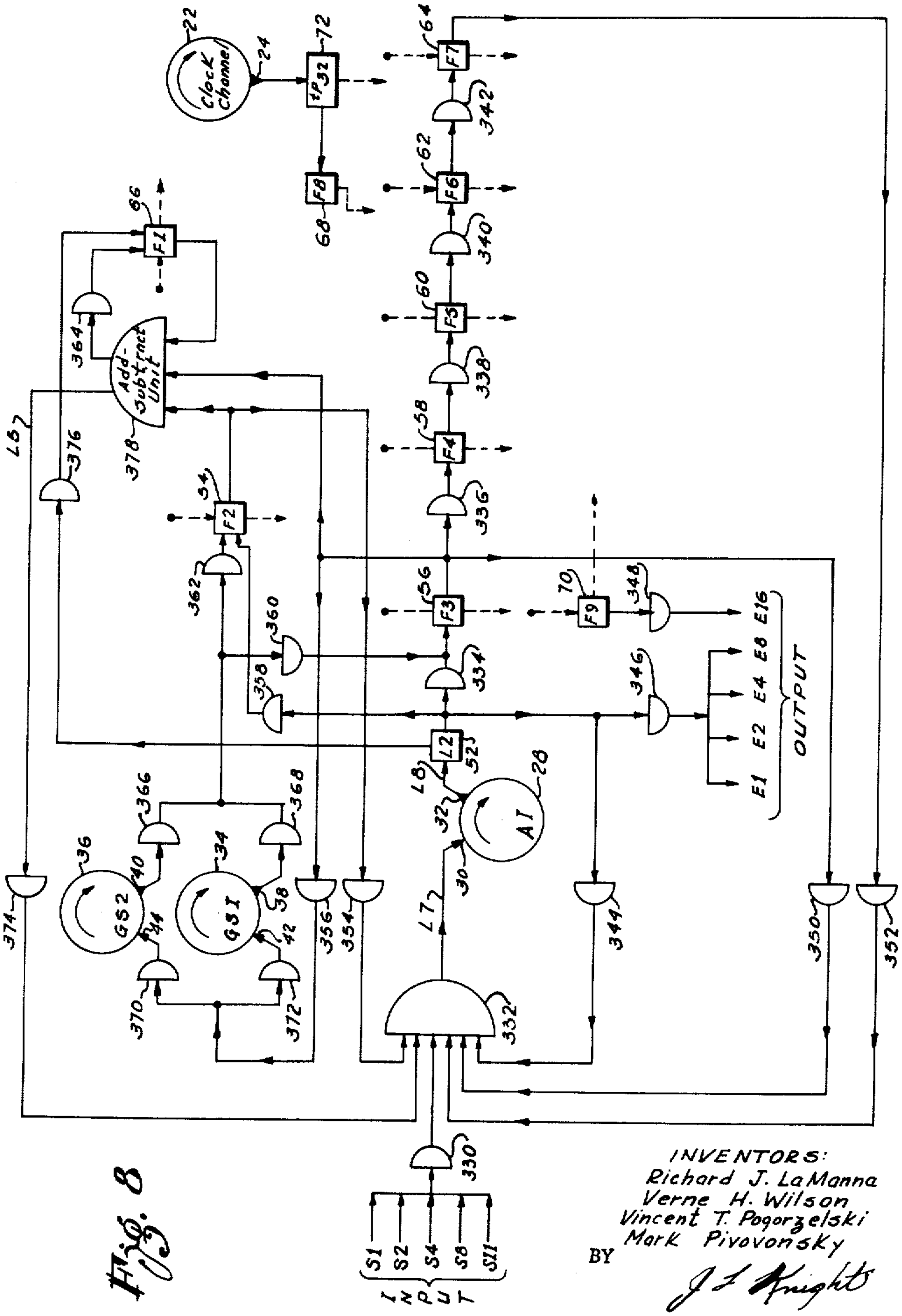

FIGURE 3, consisting of FIGURES 3*a* and 3*l*, is a series of idealized information flow diagrams, each corresponding to a different micro-program operation;

FIGURE 4, consisting of FIGURES 4*a* and 4*b*, is a timing diagram illustrating the operation of an input and output counter;

FIGURE 5, consisting of FIGURES 5*a* through 5*d*, is a more detailed diagram of the reading and writing circuits and the relay circuits of the computer of FIGURE 1;

FIGURE 6, consisting of FIGURES 6*a* through 6*p*, is a series of block diagrams showing in detail the various gating networks included within the logical network of FIGURE 1;

FIGURE 7, consisting of FIGURES 7*a* and 7*b*, is a pair of flow diagrams of a calculator program written for the computer of FIGURE 1; and FIGURE 8 is a block diagram illustrating information flow in an illustrative structure in accordance with the invention.

Turning now to the figures, FIGURE 1 is a diagram of a computer according to the present invention. In a preferred embodiment of the present invention, a magnetic drum 20 driven by a motor 21 has a magnetizable surface which is divided into four drum channels. A timing or clock channel 22 is recorded, containing 79 evenly spaced binary word sectors, each having 33 cells. Each cell of a channel is capable of storing a single bit of information represented by a predetermined state of magnetization within the cell. Each of the 79 sectors of the timing channel 22 corresponds to storages for 33 binary bits.

Within each sector of the timing channel, 32 cells contain binary "0" representing bits to mark the first 32 bits of each word and the last cell of each word stores a binary "1" representing spot to identify uniquely the last bit of each word, which is designated $t_{32}$. The individual magnetic spots within the timing channel 22 are detected by a $T_r$ timing read head 24 which generates electrical signals and applies them to a timing pulse generating unit 26, which is described in greater detail in connection with FIGURE 5*a* below.

A second track on the drum 20 is used to create a two word recirculating memory loop which is designated the Accumulator-Instruction channel 28. The Accumulator-Instruction or A–I channel 28 is used to store a first binary word representing a number, and a second binary word representing a series of instructions corresponding to operations to be performed upon the number. As will be pointed out in greater detail below, the circulating two word memory loop or register, mechanized by the A–I channel 28, uses only 64 storage cells on the drum corresponding to 64 cells of the timing channel 22. The additional two storage cells necessary to store two 33-bit groups are provided by two static storage elements, more fully described below. Associated with the A–I channel 28 is a writing transducer, the A–$I_w$ write head 30 and, separated from it in the direction of drum rotation by a distance equivalent to 64 cells is a read transducer, the A–$I_r$ read head 32.

The remaining two magnetic channels of the drum are used as information storage channels and are designated general storage 1 or $GS_1$ 34 and general storage 2 or $GS_2$ 36. As noted heretofore, general storage channels each contain 79 binary sectors each of which contains a single flag bit though in other embodiments of the invention a different number of flag bits may be advantageous. Within each sector, bits other than flag bits make up a word which is further divided into subgroups. The subgroups may have an instruction significance or a number significance. In conventional parlance they are instruction words or number words. For clarity of discussion, however, these are considered as "subgroups" of the larger "word." Each of the general storage channels 34, 36 has an associated read transducer, a $GS_{1r}$ read head 38 and a $GS_{2r}$ read head 40, respectively. Information is entered into the general storage channels by means of a pair of write transducers, a $GS_{1w}$ write head 42 and a $GS_{2w}$ write head 44, respectively.

The writing heads of the general storage channels are displaced from the reading heads in the direction of drum rotation by a distance equivalent to six word sectors plus one cell or 199 cells of the timing channel 22. This arrangement permits information from the general storage channels to be read from a given sector, operated upon in the A–I register and returned into general storage, in the same sector replacing the former information by processed information. It is therefore a relatively simple matter to "update" stored quantities. The extra cell between the read and write heads is necessitated by the fact that the general storage channel operating circuits include a reading staticizer which introduces a one-bit delay that must be accounted for.

As will be explained in more detail below, conveniently the words in general storage have, as a low order or least significant bit, a binary "1" representing signal which is designated a flat bit. More specifically, in this embodiment, each sector of the general storage, except for one, has this binary "1" flag bit. However, in a predetermined word of one of the general storage channels, the least significant or flag bit position is occupied by a binary "0." It is this "0" flag bit that serves as an index pulse to synchronize the circulating loops of the computer, and control the START and FILL operations.

A logical gating network 50 is shown only in block form in FIGURE 1 but is explained in greater detail in connection with FIGURE 6, consisting of FIGURES 6*a* through 6*p*, described below. The logical network 50 includes the read and write amplifiers and staticizers necessary for operation of the drum and its associated read and write transducers. Also included within the block, are all of the "and" and "or" gates, amplifiers, and inverters, which are necessary to execute the various logical functions during the operation of the computer. These gate circuits receive signals from the drum transducers during certain time intervals, operate upon them, and provide signals to the drum transducers representing the result of a predetermined operation upon concurrently presented information signals. The predetermined operations correspond to the micro-program instructions presented by the A–I channels in a prior word time.

Shown, arrayed about the logical gating network 50, is a plurality of flip-flops, indicated by a plurality of individual rectangles. Each rectangle contains an alphanumeric identifying designation as well as a reference character. Each flip-flop may be a conventional bistable multi-vibrator, well known in the art, having two inputs and two outputs corresponding respectively to each of the stable states of the flip-flop. Each flip-flop receives control signals upon conductors from the logical gating network 50 for placing the flip-flop in either a set or "1" representing state or a zero or "0" representing state, and which are designated respectively, by the alpha-numeric designation of the flip-flop preceded by the letter S for set and Z for zero. The set output conductor has the alpha-numeric designation of the flip-flop and the zero output conductor has the alpha-numeric designation primed.

An L2 flip-flop 52 is connected to the logic network and is normally used as a read staticizer for information coming from the A–$I_r$ read head 32. An F2 flip-flop 54 and an F3 flip-flop 56 are connected to the logical gating network 50 to be used, at different times, as staticizers for the information read from the general storage read heads and, during certain operations further described below, the F3 flip-flop 56 is connected in shift register fashion to receive the output of the L2 flip-flop 52. Four flip-flops, F4 58, F5 60, F6 62, F7 64, are, during certain operations, connected together during the precess period as a four-bit shifting register and, as such, staticize four-bit instructions to control operation upon the succeeding accumulator number.

An F1 flip-flop 66 is used primarily as a carry-borrow flip-flop in arithmetic operations. In other operations of a conditional nature, and in input and output operations, as will be described below, the F1 flip-flop 66 serves as a supplementary memory. Another flip-flop, the F8 flip-flop 68, may be considered a two-counter which assumes alternate stable states in successive word intervals. The F8 flip-flop 68 can therefore be used as a basic reference, the state of which marks the precess and execute periods, and therefore identifies the signals appearing at the $A\text{–}I_r$ read head 32 of the A–I register as number signals or instruction signals. In one state, F8, the signals appearing are bits of an instruction word while in the other F8′ state, the signals representing bits of number words are presented.

An F9 flip-flop 70 is another two-counter that "remembers" which of the two general storage tracks is in communication with the computer. Each time a track change is instructed, the state of the F9 flip-flop is changed. The output of the F9 flip-flop therefore can be used as a logical input for head switching as between the general storage tracks, F9′ selecting $GS_1$ and F9 selecting $GS_2$.

A $tp_{32}$ flip-flop 72 is provided to identify uniquely the time interval corresponding to the last bit time of each word. The $tp_{32}$ flip-flop 72 is in a first stable state, $tp_{32'}$, during the first 32 bits of each word, but during the last or 33rd bit, designated $t_{32}$, the flip-flop assumes its other stable state, $tp_{32}$. The $tp_{32}$ flip-flop 72 can also be used to identify the lowest order or flag bit at time $t_0$ of the next succeeding word. Inasmuch as the recirculation path of the A–I register normally includes both the L2 flip-flop 52 and the F3 flip-flop 56 to total 66 bits of storage, when the bit corresponding to $t_{32}$ is staticized in the F3 flip-flop 56, and the $tp_{32}$ flip-flop 72 is in its $tp_{32}$ representing stable state, the L2 flip-flop 52 will be staticizing the $t_0$ or flag bit of the next word.

An input-output unit 80 is provided to enable the computer to communicate with the external world. A plurality of input keys (not shown) are provided to generate a combination of binary signals on five input conductors and a sixth control signal on a separate conductor. The logical gating network 50 applies a seventh signal to the input devices on a seventh control signal conductor. The gating network 50 provides a combination of signals to the output device on five output conductors and a sixth control signal on a separate conductor. The output device returns a control signal on a seventh conductor. A multi-conductor input cable 82 transmits the signals between an input portion 84 of the input-output unit 80 and the gating network 50. A multi-conductor output cable 86 transmits signals between the gating network 50 and an output portion 88 of the input-output unit 80.

A pair of relays $R_1$ 90 and $R_2$ 92 are provided to facilitate the starting and stopping of the computer. The manner of interconnecting the relays is shown in greater detail in connection with FIGURE 5*d* below. Logic provided within the logical gating network 50 is responsive to signals from the relays to control the energization and de-energization of the electromechanical and electronic components associated with the computer.

There is shown in FIGURE 2, an instruction subgroup of digits 102, at the read point of the A–I register and a number subgroup 104 in one of the general storage channels aligned with a portion 106 of the timing channel 22 corresponding to one sector. In the preferred embodiment of the invention, as was pointed out above, each sector is 33 bits in length having a flag bit in the lowest order or $t_0$ position and, in the case of number words, 32 binary digits. An instruction word contains a flag bit and up to eight, four-bit instructions. In the case of certain relative address operations, however, an instruction word has less than eight instructions, with the remaining group of digits representing a binary number corresponding to a relative address.

As shown, the cells of the individual channels are arranged in vertical alignment representing concurrence in time only. As is well known to those familiar with the art, the individual cells in a given channel may have any physical position with respect to the cells of a different channel so long as the read and write transducers are positioned to present signals synchronized in time. Furthermore, the read transducers are indicated as windows on their respective channels and, in the portion of the A–I channel, the two read staticizers, the L2 and F3 flip-flops are also shown as windows on the channel.

It is therefore apparent from FIGURE 2, that the flag bit signal of the general storage channel words are available at the general storage read transducers simultaneously with the availability of A–I channel word flag bit signals at the L2 flip-flop. This correspondence in time permits the output of the F2 flip-flop, when used as the general storage read staticizer, to be combined with the output of the F3 flip-flop being used as an A–I read staticizer stage.

As was discussed earlier, the operation of the computer is divided into two basic periods corresponding to the half cycles of the A–I circulating register. Each half cycle is one word time in length, alternate half cycles being designated "precess" and "execute" word times. During each precess word time, four bits of an instruction word, representing a single instruction which corresponds to an operation to be subsequently performed, are extracted from the instruction word and are staticized in a four-bit register. During the succeeding execute word time, the staticized bits control the disposition of the number presented by the A–I register. In the execute half cycle, the A–I register may be considered as an accumulator register, storing a number to be operated upon. In order to set up each instruction in the four-bit staticizer, four zeroes are inserted in the A–I register to precess the remaining instructions toward the most significant end of the instruction word. After eight complete cycles of the A–I register, an instruction word consists only of the flag bit in the most significant bit position followed by 32 zeroes.

With instruction signal combinations of four bits each, 16 different program instructions are available to the computer. The selected micro-program instructions of the preferred embodiment are set forth in Table 1 below. Table 1 has been arranged to list each instruction by name, an abbreviation, a binary code number and the decimal number equivalent of the binary code.

*Table 1*

| Name | Abbreviation | Binary Code | Decimal Number |
|---|---|---|---|
| Skip | SK | 0000 | 0 |
| Transfer to General Storage | TS | 0001 | 1 |
| Transfer to Accumulator | TA | 0010 | 2 |
| Extract or Leap: Fl=Extract, Fl′=Leap | E/L | 0011 | 3 |
| Output | OUT | 0100 | 4 |
| Input | IN | 0101 | 5 |
| Subtract General Storage Number from Accumulator Number | SUB | 0110 | 6 |
| Add General Storage Number to Accumualtor Number | ADD | 0111 | 7 |
| Jump | J | 1000 | 8 |
| Change Track Delay | CT | 1001 | 9 |
| Jump Conditional | J*c* | 1010 | 10 |
| Jump Delay | J*d* | 1011 | 11 |
| Clear | CL | 1100 | 12 |
| Right Shift (Divide by 2) | RS | 1101 | 13 |
| Add Conditional | ADD*c* | 1110 | 14 |
| Left Shift (Multiply by 2) | LS | 1111 | 15 |

As seen in FIGURE 2, an instruction word is arranged with the most significant bit of the first instruction located in the last or $t_{32}$ bit position. It is understood that the flow of information is such that the recorded information moves to the right, passing under a stationary read transducer A–$I_r$ indicated by the properly designated window at the right side of the drawing. In the instruction word 102, the first instruction to be executed includes four bits, $i_{11}$, $i_{12}$, $i_{13}$ and $i_{14}$, stored respectively in the $t_{32}$, $t_{31}$, $t_{30}$ and $t_{29}$ bit positions. Similarly, the bits of the second instruction, $i_{21}$ through $i_{24}$ are stored in cells corresponding to $t_{28}$ through $t_{25}$. The bits of the last instruction, $i_{81}$ through $i_{84}$ are located in the cells $t_4$ through $t_1$.

If an instruction word includes a delay type instruction which requires a jump to some relatively remote location in general storage, the instruction requiring this transfer is followed by a binary number which represents a relative address of the word being sought. This binary number is located at the least significant end of the instruction word and occupies as many cells as are necessary to specify the relative address.

A typical number word 104 contains a flag bit at the low order end and a plurality of binary digits which may form the number. The most significant digit position, $t_{32}$, of the number word may be interpreted as a sign bit at the programmer's discretion.

Eleven of the sixteen primary operations, set out in Table 1 above, may be considered arithmetic instructions in that they utilize the accumulator. These eleven consist of the following: transfer to general storage (TS), transfer to accumulator (TA), extract-leap (E/L), output (OUT), input (IN), subtract (SUB), add (ADD), clear (CL), right shift (RS), add conditional (ADD*c*), and left shift (LS). Note that the transfer to general storage command is the only instruction which records new information in general storage. Also, five of these instructions, namely, transfer to accumulator, extract, subtract, add, and add conditional, utilize the general storage read head as the source of the second operand.

Four of the sixteen primary commands serve as displacement addressing instructions. These are the jump group, namely, jump (J), change track (CT), jump conditional (J*c*), and jump delay (J*d*). These instructions operate on the instruction portion of the A–I channel during precess time in contradistinction to the foregoing arithmetic commands which operate on the accumulator portion of the A–I channel during execute time.

The remaining one of the sixteen primary operations is the skip instruction (SK), so titled because it leaves everything unchanged.

The most effective approach to the description of our invention lies in the detailed examination of the role played by the nine basic system flip-flops (F1 to F9) and the two retiming flip-flops, L2 and $tp_{32}$, in effecting the sixteen primary operations.

In the following discussion, FIGURES 3*a*–3*k* are especially useful in correlating the time sharing functions played by these flip-flops during each instruction, and in following the information flow paths for these operations.

The F1 flip-flop 66 is the general purpose conditional memory which is used during the relevant arithmetic operations as the carry-borrow flip-flop for the adder-subtractor unit. In general, F1 remains static during precess word times (except during the jump delay and change track commands) so that in effect it carries information forth from a previous execute word time to a subsequent one.

Thus all the conditional operations (add conditional, jump conditional, extract-leap, jump delay, and change track) are conditioned on the information content of F1, remembered from the previous operation. It should be noted that the conditional part of the add conditional, extract-leap, and jump conditional commands is whether or not they are to be executed, whereas in the jump delay and the change track commands, the condition of the F1 flip-flop is not a condition to the execution, but instead modulates how much displacement will take place as determined by the delay address numbers in the given instruction word. For programming convenience, F1 is usually referred to as the carry flip-flop (designated K flip-flop) although it actually serves as a multi-function conditional register.

During execute word times, flip-flop F2 54, serves as the general storage read flip-flop in those operations where a general storage operand is needed. During the input and output instructions, F2 teams up with the F3 flip-flop 56 to serve as a tetrad counter to identify time intervals $t_0$ to $t_3$. In other operations, F2 serves as a counter flip-flop to designate $t_{0'}$ intervals during execute word times. In the precess word times, however, F2 plays an entirely different role. Here it serves as a mode flip-flop to designate whether the computer is undergoing a normal precess word time or if one of the four jump commands (jump, jump conditional, jump delay, or change track) is being performed. Note that the F3 rather than the F2 flip-flop serves as the general storage read flip-flop when a new instruction word is being transferred from general storage to the instruction portion of the A–I channel during a jump type operation. Thus it is seen that F2 represents the general storage read flip-flop for number words (during execute word times), whereas for instruction words (during precess word times) F3 represents the general storage flip-flop, when necessary.

During normal precess word times, F3 represents a second A–I channel read flip-flop, in series with the L2 flip-flop. F3 serves this same role during execute word times for most of the commands. During input and output, F3 in conjunction with F2 serves as a tetrad counter (from $t_0$ to $t_3$) as previously mentioned, but in general F3 represents an A–I channel read flip-flop whenever it is necessary to use the accumulator as an operand, regenerate the accumulator, or normally precess the instructions.

The F4 to F7 flip-flops, 58, 60, 62, 64, represent the four flip-flops in the command shift register, under control of the F8 flip-flop 68. F8 may be considered as the word time counter, in that its sole function in the computer is to count sector pulses at $t_{32}$. As such, it serves as a fundamental reference flip-flop.

During F8 (precess word time) the command shift register advances the instruction word from the A–I channel read head into the A–I write head, as is best noted in FIGURE 3*b*. The high order tetrad of the instruction word remains locked in the command shift register as F8 ends and F8′ (execute word time) begins. During F8′ this tetrad is decoded from the command shift register as one of the sixteen primary mirco-program instructions.

During the precession in F8, all the tetrads in the A–I channel are precessed up one tetrad towards the high order end. Thus the second highest order tetrad before the precession now becomes the new high order tetrad in the instruction word portion of the A–I channel. As such, it is in position to be precessed into the command shift register during the next F8 precession, where it will be used as the next operation code. It follows that the command shift register normally never advances during F8′ since the operation code is being decoded from it. Conversely, the command shift register always advances during a normal F8 precession (a precession other than one involving a jump type instruction) in order to set up the next primary operation code.

The F9 flip-flop 70 represents the change track flip-flop, and so controls which of the two general storage tracks is selected for reading or writing. This control function is best seen in connection with FIGURES 5*a* and 5*b*, described below. The only time that F9 changes is during a change track instruction (CT). The change track instruction is identical in all respects to the jump delay instruction, except that the F9 flip-flop is triggered to its complementary or opposite state as the instruction's name implies. Thus the change track command is really a member of the jump type (displacement address) instructions identical in all ways to the jump delay except for its one special duty. F9 serves one additional purpose of serving as a fifth channel of output to the typewriter or printer thereby giving the programmer a choice of 32 output characters rather than the 16 provided by the four binary digits.

The logical gating diagrams, FIGURES 6*a*–6*p*, comprise a detailed schematic of the logical gating network 50 from which those skilled in the art can reproduce an operating model of our invention.

In the following descriptions of the logical operations of our computer for each of the sixteen instructions, reference is made to Table 1 which sets forth each of them. Particular note should be made in each case of the disposition of the:

(1) The K (F1) flip-flop
(2) General storage word
(3) The number word in the accumulator ($t_1$–$t_{32}$)
(4) The low order or flag bit of the accumulator, $t_0$

SKIP (SK) (0000) (0)

K, general storage, and the number in the accumulator remain unchanged. The low order bit of the accumulator is reset to zero.

Translating the foregoing definition into computer logic terminology, it is observed that all that is necessary to achieve this command is to regenerate the number in the accumulator. F1 (the K flip-flop) and general storage will automatically remain unchanged unless we specifically write some logic (i.e. provide gates) to change them. The flow path for this operation is set out in FIGURES 3*a* and 5*c*, and the specific gate path is shown in FIGURES 6*a*–6*p*.

The regeneration of the accumulator requires the information word to pass from the A–$I_r$ head, 32, back to the A–$I_w$ head 30. Filling in the gates for this path from FIGURES 6*a*–6*p*, signals pass from the A–$I_r$ head 32–L8–SL2 [FIGURE 6*h*], G8–G12–G17–F30–SF3 [FIGURE 6*b*], G53–G63–L1′ [FIGURE 6*n*], G20–L7 [FIGURE 6*d*], to A–$I_w$ head 30.

To illustrate a detailed tracing of such a logical gating path, it may be seen that, starting in FIGURE 5*b* the A–$I_r$ head 32 leads through a non-inverting amplifier 110 to generate a signal on conductor L8 and through the inverting amplifier 112 to generate a signal on conductor L8′. Thus if a "1" is read by A–$I_r$ head 32, a relatively high or "1" representing signal will appear at clock time C1 on lead L8 while if a "0" is read by head 32 a relatively high or "1" representing signal will appear within bit time C1 on lead L8′. Turning now to FIGURE 6*h*, these leads are shown applied to control the setting of the L2 flip-flop, 52. It is to be understood, at this point, that all setting and zeroing inputs to the flip-flops are clocked by timing pulses C1 which are not necessarily shown in the figures. The state of output conductors L2 and L2′ is then high or not depending on the presence of a 1 or a 0 respectively at the A–$I_r$ head 32 during the previous bit time. Gates G8 and G12 are found in FIGURE 6*b*, and it may be seen that the foregoing L2 signal, together with a signal from gate G8, and the F8′ (execute time) signal are all necessary to pass through the "and" gate G12 to reach "or" gate G17. The signal path then continues through the network designated F30 to control the setting of the F3 flip-flop 56 one bit time later, thereby generating either F3 or F3′. Gate G55 in FIGURE 6*n* is dependent on gate G53 and on the foregoing F3 signal, together with A10, to continue through gate G63, inverting amplifier 114 to L1′. The signal L′ is applied in FIGURE 6*d* to gate G20, the output of which generates a signal L7 by a first inverter 116 and signal L7′ by a second inverter 118. Returning to FIGURE 5*b*, the path leads to the A–$I_w$ head 30 via gate G121, one shot pulse generator 120 and non-inverting amplifier 122 in the case of an L7 or "1" representing signal to be recorded or via gate G122, one shot 124, and non-inverter 126 in the case of an L7′ or "0" representing signal.

The F5′ diode in G8 and the F6′ diode in G53 allow this path to operate. It should be noted that the G8–G12–G17 part of this path does not regenerate the low order flag bit ($t_0$) of the accumulator. The reason for this is that the F30 net (FIGURE 6*b*) is timed one bit early because of its position in the A–I register circulation loop (this bit represents the unit delay in the F3 flip-flop). The F3 flip-flop contains the most significant bit of the instruction tetrad, which is a "0" at $t_{32}$ of the previous F8. The low order bit of the accumulator number is in L2 and the F30 net. At $t_{32}$ of F8, no gate of FIGURE 6*b* can transfer the contents of L2 to F3. The F3 flip-flop therefore copies its contents into the writing circuits, thereby resetting the low order bit position to 0, thus preventing the regeneration of the low order accumulator bit.

TRANSFER TO GENERAL STORAGE (TS) (0001) (1)

The K flip-flop and the number in the accumulator remain unchanged. The flag or low order bit of the accumulator is reset to 0. The number in the accumulator is transferred to general storage thereby replacing the number previously stored there as is shown in the flow path of FIGURE 3*c*.

Aside from the additional function of transferring the number in the accumulator to general storage, this command is identical to the skip command. Thus the previous description of the skip command serves equally well with respect to K, the regeneration of the accumulator, and the loss of the low order accumulator bit. The accumulator regeneration path given for the skip command is identical for the transfer to general storage command. The path from the A–$I_r$ read head 32 to ZF3–G18–L10′–(G114 or G117) and A–$I_r$ read head 32 to SF3–G19–L11′–(G114 or G117) represent the flow of information signals being transferred from the accumulator to the general storage write circuits. The first of the two paths represents that taken by the "0's" in the information word, while the second represents the path of the "1's."

In the transfer to storage command, it is to be noted that this is the only one of the primary commands which records into (changes) general storage, and that the general storage write heads, $GS_{1w}$ and $GS_{2w}$, 42, 44 are six word times (plus 1 bit) behind the $GS_{1r}$ and $GS_{2r}$ read heads (38, 40) so that the word replaced by this command is six sectors removed from the word concurrently presented by the general storage read heads, $GS_{1r}$ and $GS_{2r}$ 38, 40.

In decoding the logic for G18 and G19 in the path from the accumulator to the general storage write circuits, we find the equivalent of an F2 diode on each of these gates. The F2 flip-flop 54 is set to represent time intervals $t_{1-32}$ or $t_0'$ in the transfer to general storage command. Thus we see that the purpose of these F2 diodes is to protect the flag bit in general storage by preventing the transfer of the low order ($t_0$) accumulator bit to general storage.

TRANSFER TO ACCUMULATOR (TA) (0010) (2)

The K flip-flop and general storage remain unchanged. The low order bit of the accumulator is lost (reset to 0). The number in general storage is transferred to the accumulator, and replaces the number previously there (FIGURE 3*d*).

The source of the number in this transfer is a general storage read head (38, 40), which, as has been previously noted, is six sectors removed from the general storage write heads. The actual path of transfer from general storage to the accumulator is L12–(G1, G109, G2, G3)–G4–G7–F20–SF2 [FIGURE 6*a*], G60–G63–L1′ [FIGURE 6*n*], G20–L7 [FIGURE 6*d*]. The F5′ diodes in G3 and implicit in G1 through the A5 diode [FIGURE 6*p*] and the L12 diode in G109 and G2 [FIG- URE 6$a$] allow the path to operate through G4 [FIGURE 6$a$].

As usual K and the general storage remain unchanged since no logic is written to change them. The F2 flip-flop 54, which represents the general storage read flip-flop in this command as is seen in FIGURE 3$d$, is reset originally as we enter the command. This means that "0" is transferred into the low order bit position of the accumulator at $t_0$, and consequently the low order bit previously there is lost (reset to 0).

EXTRACT-LEAP (E/L) (0011) (3)

If the K flip-flop is "1" as this command is entered, the extract order will be executed. If K is "0" as this command is entered the leap order will be executed.

In the extract order, K and general storage remain unchanged. The low order bit of the accumulator is lost (reset to 0). The number in general storage is logically multiplied by the number in the accumulator and the result is placed in the accumulator (FIGURE 3$g$).

K and the general storage remain unchanged for the usual reason that no action is taken otherwise. In computer logic terminology, a logical multiplication is simply an "and" gate. In other words, it takes a "1's" bit in both of the operands to yield a "1's" bit in the logical product for any given position of the number. The "and" gate in question is gate G55 (FIGURE 6$n$). The path of the general storage operand up to this gate is L12–(G1, G109, G2, G3)–G4–G7–F20–SF2 [FIGURE 6$a$], G53–G55 [FIGURE 6$n$], while the path of the operand from the accumulator is L8–L2 [FIGURE 6$h$], G8–G12–G17–F30–SF3 [FIGURE 6$b$], G55. The F5′ diodes in G1, G3, and G8, and the L12 diode in G109 and G2 allow these paths to operate. After the operands have merged in the "and" gate G55 to give the logical product, the path continues as G55–G63–L1′ [FIGURE 6$n$], G20–L7 [FIGURE 6$d$].

As in the transfer to accumulator command, F2 once again represents the general storage read flip-flop and consequently is reset originally. Hence a 0 is transferred at $t_0$ from F2 through G53 to G55. With this input condition the output of G55 (representing the logical product at $t_0$) must be 0, and consequently, the low order bit of the accumulator is once again lost (reset to 0).

In the leap command, which is directed by the (0011) code when $K=0$, K and general storage again remain unchanged and the low order bit of the accumulator is again reset to 0. However, the presence of this command at $t_{32}$ of F8 prevents the immediately following $t_{32}$, end-of-word clock bit from performing its normal changing of F8 (precess time) into F8′ (execute time). As a result, the accumulator word which normally would have been processed by some instruction beginning with F8′ suddenly is regarded by the computer as a regular instruction word and is precessed through the shift register to extract a new command. This reversal of roles between the current accumulator word and instruction word has the same effect as if the drum had suddenly and discontinuously lost or gained one revolution. This, therefore, immediately gives the instruction portion of the A–I channel access to words in the general storage track which it would otherwise have had to wait a full drum revolution to achieve. Conversely, the accumulator portion of the A–I channel is given immediately access to words on the general storage drum for which it would otherwise have had to wait the time of a full drum revolution.

In order to perform the foregoing task for the leap order an "or" gate G107 (FIGURE 6$p$) is provided as an input to "and" gate G75 which is enabled at $t_{32}$. Gate G107 is responsive to signals from the F3, F4, F5, and F6 flip-flops which store the command that will be in the command register at $t_0$. If this tetrad is F3′, F4′, F5, F6, and also if F1 is set to "0" (i.e. F1′), then a leap command exists and circuitry should be provided to inhibit the triggering of the F8 flip-flop. This is accomplished by making the operation of the "and" gate G75 contingent on the presence of any one of the de Morgan (primed) elements of the leap condition. Since the complement of an "and" expression is an "or" expression of the complemented individual terms, if either F1, F3, F4, F5′, or F6′ is present at gate G107 at $t_{32}$, it means that the leap order is not present and the normal generation of F8′ is permitted. Conversely, if none of the above five signals is present, a leap order is present, and gate G75 is prevented from generating the auxiliary logical signal A14 (FIGURE 6$p$) which is applied to the ZF8 terminal of the F8 flip-flop 68, as seen in FIGURE 6$g$.

OUTPUT (OUT) (0100) (4)

If the busy signal (E10) is present, K is reset to 0 and the accumulator remains unchanged. If the busy signal is not present K is set to 1, and the low order tetrad (four bits from $t_1$ to $t_4$) of the accumulator is printed and cleared to 0's. The remainder of the accumulator regenerates and the low order ($t_0$) bit of the accumulator is cleared (reset to 0) regardless of the busy signal.

The first case to be analyzed in the output command will be where the busy signal E10 is found to be present. As shown in the foregoing leap command, it is possible to examine an incoming code before it is fully shifted into the command register, F4, F5, F6, F7, namely at $t_{32}$ of F8 when the command is arrayed in F3, F4, F5, F6.

In the case of the output command, we anticipate it at $t_{32}$ of the previous F8, and block the passage of the 1's bit in the output operation code (0100) from F4 to F5 if we find the busy signal present denoting an unsuccessful output. Thus if the output command is unsuccessful (E10 present), it is automatically changed into a skip command as F8 changes to F8′. Conversely, if F8′ is reached and the output command is still present, we know that it is a successful (E10 not present) output. The G26 "or" gate (FIGURE 6$f$) is the gate for transferring this 1's bit, and the path of the signal is E10′–G26–G27–SF5. If E10 is present, obviously the path cannot operate and the F5 flip-flop 60 remains in the reset or "0" state.

The normal path of information flow at this point in the command shift register is F4–G27–SF5. It will be observed that the G26 "or" gate represents the only point where the busy signal, E10, enters the logic. Thus it may be said that the only function of the busy signal, if present, is to convert the unsuccessful output command into a skip command. The definition and explanation of the skip command, as previously described, serves to complete the unsuccessful output.

If the busy signal is not found present and the output command arrives intact in the command register at F8′, the output is initiated. FIGURE 4$a$ represents the timing diagram for the output operation. In essence, the F2 and F3 flip-flops 54, 56 combine as a two stage tetrad counter as set out in Table 2, below.

*Table 2*

| Time | Counter | K FF | Command Code |
|---|---|---|---|
| $t_0$ | F2′ F3′ | F1′ | F4′ F5 F6′ F7′ |
| $t_1$ | F2′ F3 | F1′ | F4′ F5 F6′ F7′ |
| $t_2$ | F2 F3 | F1′ | F4′ F5 F6′ F7′ |
| $t_3$ | F2 F3′ | F1′ | F4′ F5 F6′ F7′ |
| $t_4$ | F2 F3′ | F1 | F4′ F5′ F6′ F7′ |
| * * | * * | * | * * |
| $t_{32}$ | F2 F3′ | F1 | F4′ F5′ F6′ F7′ |

The F2 F3′ final condition extends across the rest of the word time, but at the end of $t_3$, the output command code is reset to a skip command as shown by the state of the F5 flip-flop 60 in FIGURE 4$a$. At the same time the K flip-flop F1 is set to a 1 in order to serve future notice that the output command was successful. Thus we observe that even with successful output, the output command only lasts four bit times before changing to a skip command.

Ordinarily, the F3 flip-flop 56 serves as part of the accumulator loop with the number word appearing at its output from $t_1$ to $t_{32}$. During the output command we wish to print out only the low order tetrad of the accumulator, which ordinarily is available in the F3 flip-flop 56 at $t_1$ to $t_4$. For efficient minimization, however, we wish to use the F3 flip-flop as part of the tetrad counter for output selection. Thus we tap the accumulator loop one bit early at the L2 flip-flop 52, where the desired information will appear at $t_0$ to $t_3$ rather than $t_1$ to $t_4$. Using the combination of F2 and F3 to count $t_0$ to $t_3$ has already been described in connection with Table 2 above.

After the output command changes into a skip command, the F3 flip-flop resumes its normal role as part of the A–I recirculating loop. Thus the remainder of the accumulator is regenerated and the low order tetrad is printed and cleared. However, one transition bit must be set up correctly when the normal regeneration resumes. During the $t_0$ to $t_3$, the net L1′ [FIGURE 6*n*] will produce 0's since no logic is written there which responds to the command register signal combination representing the output instruction. Then from $t_4$ to $t_{32}$ the funnel net will take the output of F3 because of the skip command. From $t_5$ to $t_{32}$, F3 truly represents the remainder of the information from the accumulator (passing into F3 from L2). At $t_4$, however, F3 represents an inherited bit from the last state, $t_3$, of the tetrad count. Since it is indicated to clear both the low order tetrad and the flag bit, it is necessary for the net L1 to produce 0's from $t_0$–$t_4$. In order that the $t_4$ bit be zeroed, the tetrad count for $t_3$ should include F3′ rather than F3, and the tetrad counter therefore corresponds to the Gray or reflected binary code count.

The four paths for the output information from L2 to the output device during $t_0$ to $t_3$ are as shown in FIGURE 6*p* as follows: L2–G68–A4–G83–E1, L2–G68–A4–G84–E2, L2–G68–A4–G85–E4, and L2–G68–A4–G86–E8. Notice that the decoding for signals A20–A23 found on "and" gates G83–G86 respectively, actually represent the count combinations corresponding to the four bits $t_0$ to $t_3$.

The path F9–G87–E16 represents the fifth wire in the five wire output code yielding thirty-two combinations. A more detailed description of this fifth wire in the output code was previously described in conjunction with the primary functions of the F9 flip-flop 70.

In order to realize the successful output command from the engineering standpoint, we need a common signal which will be activated whenever any successful output occurs, regardless of the five wire output code. This common "print" command signal is represented by the path G41–E20, in FIGURE 6*l*.

The following logical paths are provided to enable the operation of the output counter. Initially F2 and F3 must be reset for the first count, $t_0$, of F8′. Since the reset is simply the prime (De Morgan) of the set net for both of these flip-flops, we simply do not write any logic in the set net operable at time $t_{32}$ of F8. At the end of $t_0$ however, the F3 flip-flop is set. The path for this is F2′–G9–G13–G17–F30–SF3 [FIGURE 6*b*]. At the end of $t_1$ we must set F2. This is accomplished by the path (G1, G109, G2, G3)–G4–G7–F20–SF2 [FIGURE 6*a*]. The F3 diode in G1, and the F6′ diodes in G109, G2, and G3 make this path possible. At the end of $t_2$ we must reset F3. Once again this is achieved by writing no logic to cover the desired time ($t_2$) in the set net. It should be noted that F20 and F30 represent the set nets for F2 and F3 flip-flops respectively, and as previously stated, the structure of the logic is such that F20′ and F30′, represent the two reset nets respectively.

At the end of $t_2$ the K (F1) flip-flop is set in order to later indicate the successful output. This path is represented by G44–G47–SF1 [FIGURE 6*m*]. It was also necessary to reset F1 originally, at $t_{32}$ of F8, in case the busy signal was present to make the output command unsuccessful. The path taken for this is G48–G49–G52–ZF1, with F3′ diode in G48 making the path possible.

At the end of $t_3$, the successful output command must be reset to a skip command. Actually, only one (F5) of the four command shift register flip-flops (F4 to F7) needs to be reset here, but it is more expedient to use the common reset signal (A2) for the command shift register to accomplish the task. This is done via path G91–G92–A2 [FIGURE 6*p*], G29–ZF5 [FIGURE 6*f*].

INPUT (IN) (0101) (5)

If the key down signal (S10) is received, indicating a good input, K is set to 1. The contents of the keyboard are read into the $t_0$, $t_1$, $t_2$, and $t_3$ positions of the accumulator. If the keyboard character is a non-numeric character (not one of the digits 0 through 9), a 1 is written in the highest order bit position ($t_{32}$) of the accumulator. The remainder of the accumulator is cleared to all 0's. If the keyboard down signal S10 is not received, K is reset to 0 and the accumulator fills with either zeroes or meaningless information (depending on whether switches S1, S2, S4, and S8 are open or in the act of bouncing or being set).

The input operation (FIGURE 3*f*) resembles the output in that F2 F3 combine to form a counter for identifying the bit times of the low order tetrad $t_0$ to $t_3$. Another similarity between the two operations is that F1 (the K flip-flop) is used to later indicate whether or not the operation was successful. FIGURE 4*b* shows a timing diagram for both the successful and unsuccessful input.

F1 is initially reset as the input operation begins. This is accomplished at $t_{32}$ of the previous F8 by the path G48–G49–G52–ZF1 [FIGURE 6*m*] with the F3′ diode in G48 making the path possible. At the end of $t_2$, as indicated on the input timing diagram (FIGURE 4*b*), F1 is set high if the key down signal S10 is received indicating a successful input. The path is S10–G42–G43–G47–SF1 [FIGURE 6*m*]. If the key down signal is not received, F1 remains reset, indicating that the input was unsuccessful. The key down signal (S10) as received from the keyboard is nothing more than a delayed common contact. In other words, when the key down signal is received, we are assured that the contacts providing the other input signals (S1, S2, S4, S8, and S11) have stopped bouncing and are thus safe to sample. Note that the contact for the key down signal S10 itself may still be bouncing, but this does not matter since the system samples it only at one discrete time interval, namely $t_2$ as indicated.

Another requirement of the input timing system is that the F1 flip-flop set F3 if F1 has been set at the end of $t_2$. F3 can then be set at the end of $t_3$. The path for this is F1–G9–G13–G17–SF3 [FIGURE 6*b*]. Observe that prior to the end of $t_3$, both F2 and F3 acted as the tetrad counter just as they did in the output operation. F2 and F3 were both reset originally at $t_{32}$ of F8. F3 was then set at the end of $t_0$. The paths necessary to achieve this logic were described in detail in the description of the tetrad counter for the output operation. The tetrad counter and its associated logic are substantially similar for both the input and output operations.

At $t_0$, the path of a $2^0$ bit from the keyboard to the A–I write, head is S1–G100–G105–A12 [FIG. 6*p*], G61–G63–L1′ [FIG. 6*n*], G20–L7 [FIG. 6*d*]. The latter part of this path, namely, A12–G61–G63–L1′–G20–L7 is common for all five of the information bits passing from the keyboard switch contacts (S1, S2, S4, S8, and S11) to the accumulator.

The following represents the other four paths prior to their merger at A12 in FIG. 6*p*. During $t_1$, the path of a $2^1$ bit is S2–G101–G105–A12. At $t_2$ the path of the $2^2$ bit is S4–G102–G105–A12. The path of the $2^3$ bit during $t_3$ is S8–G103–G105–A12. Finally, the path for the non-numeric (not 0 through 9) indicator bit at $t_{32}$ is S11–G104–G105–A12.

It should be noticed that normally, the low order tetrad of the accumulator is applied from $t_1$ to $t_4$ to the write head. The successful input operation, however records the low order tetrad in the accumulator in the $t_0$ to $t_3$ bit positions, clears the accumulator (to 0's) from $t_4$–$t_{31}$, and, if necessary, inserts the non-numeric tetrad indicator bit at $t_{32}$. The clearing of the accumulator from $t_4$ to $t_{31}$ is accomplished by simply writing no logic in the net (L1') to do otherwise.

A successful input command is usually followed by a shift left command, explained in greater detail below. This shifts the high order $t_{32}$ bit (representing the non-numeric tetrad indicator bit) into the K flip-flop where the programmer can then test for its presence. The shift left command will also shift the low order tetrad from ($t_0$ to $t_3$), to ($t_1$ to $t_4$), and thus place it in its normal position in the accumulator.

The input operation normally serves as the first of a group of four operations. The second operation of the group will be a jump conditional, explained below, which tests whether or not the input was successful by checking the K flip-flop. A shift left command (as before noted) then follows the jump conditional provided the input was successful. The fourth operation of this group will be another jump conditional which will test for the presence of the non-numeric tetrad indicator bit by means of the K flip-flop.

SUBTRACT (SUB) (0110) (6)

K is reset to 0 initially. The number in general storage is subtracted from the number in the accumulator, and the result replaces the number in the accumulator. If the general storage number is larger than the number originally in the accumulator, K is set to a 1. The number in general storage remains unchanged. The low order ($t_0$) bit of the accumulator is cleared (reset to 0). (FIGURE 3*h*).

The L5 gate circuit represents the sum-difference net for the adder-subtractor unit. The path of the resultant signal from L5 to the A–I write head is L5–G58–G63–L1' [FIGURE 6*n*], G20–L7 [FIGURE 6*d*].

It may be noted that in binary addition or subtraction, the sum and difference digits are identical but that the borrow and carry differ.

This is more easily noted from Table 3A below, in which F1 represents the carry-borrow, F2 represents the addend-subtrahend, and F3 represents the augend-minuend.

*Table 3A*

| K | Operand | Sum/difference | K | |
|---|---|---|---|---|
| | | | Borrow | Carry |
| F1' | F2' F3' | L5' | F1' | F1' |
| F1' | F2' F3 | L5 | F1' | F1' |
| F1' | F2 F3' | L5 | F1 | F1' |
| F1' | F2 F3 | L5' | F1' | F1 |
| F1 | F2' F3' | L5 | F1 | F1' |
| F1 | F2' F3 | L5' | F1' | F1 |
| F1 | F2 F3' | L5' | F1 | F1 |
| F1 | F2 F3 | L5 | F1 | F1 |

A major purpose of the K (F1) flip-flop in our invention is to serve as the carry-borrow flip-flop for the adder-subtractor unit. Consequently, at the end of an F8' executing an addition or subtraction operation, F1 will be left high (set to 1) if we have had an overflow in the addition or if we have subtracted a larger number from a smaller one. It should be observed that in general F1 does not change during an F8 word time, so that in essence it carries forward information from one F8' to the next F8'. Thus if we followed a subtraction operation with a jump conditional (conditional on K1 to be explained below) we could branch the program depending on whether or not subtraction resulted in a change of sign.

As can be seen from Table 3A above, the three inputs to the adder-subtractor unit of FIG. 6*e* are F1, F2, and F3. As previously stated, F1 represents the carry-borrow flip-flop. F2 represents the operand from general storage in the addition and subtraction operation, and its path from general storage to F2 is L12–(G1, G109, G2, G3)–G4–G7–F20–SF2 [FIG. 6*a*]. The F6 diode in G1, the L12 diode in G109 and G2, and the F4' diode in G3 allow this path to operate. Similarly, F3 represents the operand from the accumulator which is the augend and minuend in the addition and subtraction operations. The path of this operand from the A–I read head to F3 is L8–L2 [FIG. 6*h*], G8–G12–G17–F30–SF3 [FIG. 6*b*], with the F6 diode in G8 allowing the path to operate.

The combining of the three inputs (F1, F2, and F3) to form the sum (or the difference) in the addition and subtraction operations is represented by the common mixing paths (F2–A18–F3)–(G79–A20, G80–A21, G81–A22, G82–A23) [FIG. 6*p*], (G21, G22, G23, G24)–G25–L5 [FIG. 6*e*], the third input F1 enters into the mixing path through gates G21–G25 as follows: F1–G1–G22, G23, G14)–G25–L5. The purpose of this mixing path in the adder-subtractor is simply to give a sum (or difference) on the L5 output line whenever any one or all three of the inputs (F1, F2, and F3) are present. Thus, the sum-difference logic for L5 may be written as set forth in Table 3B. This logical statement $L5=1$ can be expressed in the conventional terminology in which "and" groups are connected by dots (.) and in which "or" groups are connected by the plus (+).

*Table 3B*

Sum $L5=F1\ F2\ F3+F1'\ F2'\ F3+F1'\ F2\ F3'+F1\ F2'\ F3'$

Borrow $SF1=F1'\ F2\ F3\quad ZF1=F1\ F2'\ F3'$

Carry $SF1=F1'\ F2\ F3'\quad ZF1=F1\ F2'\ F3$

The initial output of the sum-difference gate at $t_0$ is 0 because the input condition is $F1'.F2'.F3'$. Thus the low order bit of the accumulator is reset (cleared to 0) in both the addition and subtraction operations. F2 and F3 are low at $t_0$ simply because no logic was written to set them at $t_{32}$ of the previous F8. The carry-borrow flip-flop F1 was reset to 0 at the end of $t_{32}$ of the previous F8 by means of the path G48–G49–G52–ZF1 [FIG. 6*m*] with the F3' diode allowing the path to operate.

It is pertinent to note that up until this point a common description (with the corresponding logic and gating paths) has served for both the addition and subtraction operation. The only difference between the two operations is the logic for setting and resetting the carry-borrow flip-flop F1 (K) during F8'. It has already been observed that F1 is reset initially in both operations.

With reference to FIG. 6*m*, in subtraction, the path for setting F1 high as a borrow corresponding to Table 3B above is (F2, F3')–G82–A23 [FIG. 6*p*], G44–G47–SF1 [FIG. 6*m*]. The corresponding reset path for F1 in subtraction is (F2', F3)–G80–A21 [FIG. 6*p*], G51–G52–ZF1 [FIG. 6*m*]. In the addition operation the path for setting F1 high as a carry is (F2, F3)–G81–A22 [FIG. 6*p*], G42–G43–G47–SF1 [FIG. 6*m*], with the F6 diode in G42 allowing the path to operate. The corresponding reset path for F1 in addition is (F2', F3')–G79–A20 [FIG. 6*p*], G50–G52–ZF1 [FIG. 6*m*].

ADD (ADD) (0111) (7)

K is reset to 0 initially. The number in general storage is added to the number in the accumulator, and the result replaces the number in the accumulator. If the result in the accumulator overflows (exceeds thirty-two bits) K is set to a 1. The number in general storage remains unchanged. The low order bit of the accumulator is cleared (reset to 0).

A complete description of the addition operation with the corresponding logic and gating paths was covered under the previous description of the substraction operation. As previously mentioned, a common description serves both of these operations aside from the logic of the carry-borrow flip-flop F1 (K) which was fully set forth above.

JUMP (J) (1000) (8)

K, general storage, and accumulator remain unchanged. A new instruction word for general storage is brought into the instruction portion of the A–I channel during the next word time. The first (high order) tetrad of this new instruction word is executed three word times later (or equivalently four word times after the jump command was initially executed).

The jump command represents the first of four (jump, change track, jump condition, and jump delay) displacement addressing instructions. They are control instructions (in contrast to arithmetic instructions such as addition) in that they operate on the instruction portion rather than the accumulator portion of the A–I channel. The normal routine of setting up (precessing in) a new command during F8 and then executing it during the next word time F8′ can only be applied to the arithmetic type instructions and the skip command. This results from the fact that only the accumulator is available during F8′. The control type instructions are set up during F8 as usual, but we find it impossible to execute them the next succeeding F8′ word time, since the instruction portion of the channel is simply not available during F8′.

The purpose of the jump command is to transfer a new instruction word from general storage into the A–I channel. Supposedly we have already executed all of the eight commands found in the previous instruction word, and now must bring in a new instruction word in order to keep the computer sequencing. Ordinarily we would have to program the jump as the last (eighth or low order tetrad) command in the old instruction word in order to bring in a new instruction word. Thus every instruction word would only have seven useful commands, with the eighth command being used as a jump in order to replace the instruction word with a new one.

In our invention, however, all eight commands in the instruction word are useful. The jump command need never be programmed as the eighth command in order to transfer in a new instruction word. The reason for this is the "automatic" jump feature.

To the computer the automatic jump looks exactly as if a jump command had been programmed as a fictitious ninth command on the low order end of the instruction word. Though the automatic jump need not be programmed, the regular time allotted for the execution of a jump command must also be allowed for the automatic jump when writing a program. In other words, the programmer knows that the computer is going to introduce a ninth command, namely, the automatic jump, after all the instructions of a word have been executed. Thus we see that this computer has automatic sequential control for instruction words.

Though it is not programmed, the realization of the automatic jump feature in the computer is as follows:

When the new instruction word is transferred from general storage to the A–I channel (as a result of a jump type command), it occupies the position $t_{1-32}$ in the orders channel. During this transfer, however, a 1's bit is always deposited into the low order (flag) $t_0$ position of the instruction portion of the A–I channel. The 1's bit will precess up the loop with the instruction word. It is this 1's bit that ultimately is executed as the automatic jump command.

At this point it is pertinent to observe some properties of the instruction word precession in the A–I channel. This is a high order or long type precession in that the circulating information is displaced to a position four bits later in the word time after each precession. Thus the tetrad of information representing the eighth command in the instruction word will move from $t_{1-4}$ to $t_{5-8}$ after the initial precession.

This precession is achieved during F8 by passing the A–I channel read output through the command shift register (four bit delay) and back to the A–$I_w$ write head. This is represented by FIG. 3*b* and the path L8–SL2 [FIG. 6*h*], (G10, G11)–G14–G17–F30–SF3 [FIG. 6*b*], (G54–G64–SF4)(G65–G66–ZF4) [FIG. 6*o*], (G26–G27–SF5)(G28–G29–ZF5) [FIG. 6*f*], (G36–SF6)(G37–G38–ZF6) [FIG. 6*j*], (G30–SF7)(G34–G35–ZF7) [FIG. 6*i*], G62–G63–L1′ [FIG. 6*n*], G–20–L7 [FIG. 6*d*]. The F2′ diode in G10, and the $tp_{32}'$ diode in G11, and the A1 diodes in G65, G27, G28, G36, G37, G30, G34, and G62 make this path possible. The F4′ diode in gate G64 is redundant logically, but is necessary for signal loading considerations. The A1 signal in this path represents the "advance" signal for the command shift register (F4–F7). The logic for this advance signal is represented by the path G93–G94–A1 [FIG. 6*p*].

The path for the insertion of the 1's bit (representing the automatic jump) into the orders channel to $t_0$ (when the instruction word is being transferred from general storage to the order channel) is G74–A13 [FIG. 6*p*], G15–G17–F30–SF3 [FIG. 6*b*], G81–A22 [FIG. 6*p*], G56–G63–L1′ [FIG. 6*n*], G20–L7 [FIG. 6*d*]. Note that while the 1's bit is originally inserted (G15) at $t_{32}$ of the previous F8′, it picks up a unit delay in going through the F3 flip-flop so that it appears at the A–$I_w$ write head (L7) at $t_0$ of the following F8.

After each precess time circulation, the high order tetrad of the orders channel (which occupied the position $t_{29-32}$) is left in the command shift register, while the second highest order tetrad ($t_{25-28}$) is precessed up into the high order tetrad position. This tetrad which precesses off the high order end of the A–I channel and left in the command shift register is the command that will be executed the next F8′ word time.

During the precession, however, four new bits must have shifted into the low order end of the orders channel during $t_{0-3}$ to displace the information toward the higher order end. As indicated by the logical gating path, we see that F7 is the path source for these bits. Thus we observe that ordinarily the old command code (which was just decoded from the command shift register and executed during the F8′ word time previous to the precession) would be the source of the four additional bits in question. Allowing this situation to occur would continually recirculate the instruction word and require that a jump instruction be included in every instruction word. Therefore, the A2 function net (which represents the common reset signal for the command shift register) resets the commond shift register to all 0's at the ends of $t_{32}$ of every F8′. This is achieved in the A2 net by the path A13–G92–A2 shown in FIG. 6*p*. The four paths from A2 to the command shift register are A2–G66–ZF4 [FIG. 6*o*], A2–G29–ZF5 [FIG. 6*f*], A2–G38–ZF6 [FIG. 6*j*], and A2–G31–G32–G35–ZF7 [FIG. 6*i*]. In the last of the four paths, G31 inhibits the resetting of F7 during the change track and jump delay commands. The reason for this will be covered later during the description of these commands.

Thus we observe that as a result of the A2 signal at $t_{32}$ of the previous F8′, four 0's are shifted into the A–I channel at the low order end, $t_0$–$t_3$, during every F8. Thus as the precessions of the instruction word continue, the instruction word eventually fills up with 0's from the low order end. Another way of looking at this is that for every command (four bits) precessed off the high order end of the instruction word into the command shift register, there is an equivalent four bits (all 0's) shifted into the low order end of the word.

Now let us return to the 1's bit that was placed in the A–I channel at the low order end $t_0$ when the new instruction was transferred in from general storage.

After the initial precession, the 1's bit will have moved up into the $t_4$ position, and four 0's will occupy positions $t_{0-3}$. The eighth (low order) tetrad in the instruction word will have moved up from $t_{1-4}$ to $t_{5-8}$. A new tetrad consisting of the 1's bit at $t_4$ and three 0's bits from $t_{1-3}$, now occupies the low order tetrad position ($t_{1-4}$) of the instruction word and represents a fictitious ninth tetrad. The fictitious tetrad will also precess up through the instruction word following the eighth tetrad that was actually programmed in the original instruction word. When this ninth tetrad is finally precessed out of the A–I channel into the command shift register, it will be decoded as a binary eight (1000) and thus be executed as a jump command. It may be observed that the automatic jump command (represented by the fictitious ninth tetrad that was not programmed) and a legitimate programmed jump command appear identical to the computer resulting from the assignment of binary eight as the jump operation instruction signal combination.

The path of the instruction word being transferred from general storage to the A–I channel is L12–G16–G17–F30–SF3 [FIG. 6*b*], G81–A22 [FIG. 6*p*], G56–G63–L1' [FIG. 6*n*], G20–L7 [FIG. 6*d*]. Notice that F3, rather than F2, represents the general storage read flip-flop for this path. During a normal F8, F3 is being used as part of the A–I channel circulation path. Since we obviously no longer care about the previous contents of the A–I channel when we are transferring in a new instruction word, it is quite safe to use F3 as part of the new instruction word path (namely, the general storage read flip-flop) at this point.

It will be obvious that we cannot execute the jump command during the normal F8' word time since the instruction portion of the A–I channel is not available at this time. Consequently, we need a memory flip-flop to remember that we have had a jump command; to prevent normal precession in the next following F8. It is the purpose of F2 to serve as the memory flip-flop for the jump type instructions. We may define the combination *F2'·F8* as representing the normal precession word time. This signal combination can be found in the path given earlier for the instruction word circulation and is a part of the command register advance signal A1.

The combination *F2.F8* is therefore used to represent a precession word time in one of the jump type instructions, with F2 being the memory that says we are not doing a normal precession. Although there are four jump type instructions (jump, change track, jump conditional, and jump delay), we may subgroup them into only two categories after the initial F8' word time. In other words, the computer cannot tell the difference between a jump and a successful jump conditional, or the difference between a change track and jump delay, after the initial F8' of the command. Thus we need only supply memory for these two main subgroups of the jump type instructions. For simplicity we will label these as the jump and jump delay subgroups.

The signal combination identifying the jump subgroup is *F2.F7'* while the combination for the jump delay subgroup is *F2.F7*. The path logic for setting the F2 flip-flop during the initial F8' to remember a jump type instruction is G6–G7–F20–SF2 [FIG. 6*a*]. The path logic for keeping the F2 flip-flop set during F8 (once it has already been set previously) is G95–G96–A7 [FIG. 6*p*], G7–F20–SF2 [FIG. 6*a*]. During the initial F8' of the jump command, the entire accumulator (including the low order $t_0$ position) regenerates. The path for the regeneration of the number is L8–SL2 [FIG. 6*h*], G8–G12–G17–F30–SF3 [FIG. 6*b*], G53–G55–G63–L1' [FIG. 6*n*], G20–L7 [FIG 6*d*], with the F5' diode in G8 and the F4 diode in G53 making the path possible. The regeneration of the low order accumulator bit at $t_0$ is represented by the path L8–SL2 [FIG. 6*h*], (G10, G11)–G14–G17–F30–SF3 [FIG. 6*b*], G53–G55–G63–L' [FIG. 6*n*], G20–L7 [FIG. 6*d*]. The $tp_{32}$ diode in G10, the F3 diode in G11, and the F4 diode in G53 allow the path to operate.

Notice that the first command of the new instruction word is not executed until three word times after the instruction word has been transferred into the A–I channel from general storage. The reason for this becomes more apparent if we analyze the jump command in terms of necessary word times. After the initial F8 when the jump command is set up originally, we find that we need two additional F8 periods to accomplish all the necessary requirements.

The first of these F8 periods will follow the normal F8' execute word time of the command. The first F8, designated by the control logic condition *F2.F7'.F8*, is used to transfer the new instruction word into the A–I channel as previously explained. At the termination of this F8, the jump memory flip-flop F2 is reset. This occurs because of the $tp_{32}$ diode in G95 of the set path for F2, namely, G95–G96–A7 [FIG. 6*p*], G7–F20–SF2 [FIG. 6*a*]. During the next F8', however, the $t_0$ bit is preserved if the next command to be executed also preserves it. The second F8 in question is needed to shift the first (high order) tetrad of the new instruction word into the command shift register. The following F8', we will be able to execute this command and return to the normal computer sequence.

An extra F8' is involved, namely, the F8' following the instruction word transfer during which the computer decodes and executes a skip command from the command shift register. This skip command was not precessed into the command shift register (as would be the case with a normal programmed skip command), but rather resulted from the fact that the command shift register was reset (as usual) at the end ($t_{32}$) of the previous F8' and then left undisturbed. Normally the command shift register is reset by A2 at the end of each F8' in order to shift the four 0's into the low order end of the instruction word during the following F8. But in the particular case of the jump command, the four 0's remain in the command shift register during the following F8, and thus supply the automatic skip command for the next F8'.

The low order bit of the accumulator is regenerated during this automatic skip command only if the $t_{32}$ bit of the new instruction word is a "1" because of the F3 diode in G11. The path for this regeneration is L8–SL2 [FIG. 6*h*], (G10, G11)–G14–G17–F30–SF3 [FIG. 6*b*], G53–G55–G63–L1' [FIG. 6*n*], G20–L7 [FIG. 6*d*]. In an ordinary programmed skip command, the low order bit of the accumulator is lost because at $t_{32}$ of F8, the F3 flip-flop stores the "0" that will be in F4 during the execution of the skip command, and, therefore, the gate G11 is disabled. The automatic skip following the termination of a jump command looks like a regular skip command to the computer. The programmer, however, must consider the time for the automatic skip as two extra word times in the execution of the jump command.

The jump command may now be summarized by describing six successive word times of programmed operation. The first word time is the F8 during which a jump command (programmed or automatic) is precessed into the command shift register. The second word time is the initial F8' during which a normal command would be executed. In the jump command F2 is set during this word time in order to later remember that a jump command was present. The third word time is represented by the control logic condition F2F7'F8. During this word time the new instruction word is transferred from general storage into the A–I channel. The jump memory flip-flop F2 is reset at the termination of this word time. The automatic skip command is executed during the fourth word time (F8'), with the accumulator being regenerated. A normal precession (F8) of the instruction word occurs during the fifth word time, leaving the high order tetrad of the new instruction word in the command shift register. This high order tetrad is executed as the first command of the new instruction word during the sixth word time (F8').

CHANGE TRACK (CT) (1001) (9)

K is reset to 0. The accumulator and general storage remain unchanged. The low order ($t_0$) bit of the accumulator is lost (reset to 0). This command switches the computer to the opposite general storage track from where it has been. The execution of this track change is accomplished first, and thereafter the command looks identical to the jump delay command. If K is 0 when the operation starts, the next instruction word that is brought into the A–I channel is located at a distance Δ word times from the first (execute) word time of the command. Δ is the actual relative displacement which is known. The relative address, number D which must be set into the low order tetrads of the instruction is found from the relationship $\Delta=2D+3$. If K is 1 when the operation starts, the instruction word transfer into the A–I channel occurs $2D+5$ word times after the initial word time of the command and therefore $\Delta=2D+5$. As in the jump command, the first (high order) tetrad of the new instruction word is executed three word times after the transfer of the new instruction word into the A–I channel. D, representing the amount of delay or displacement for the jump delay command a binary number that is written at the lower end of the jump delay instruction word. (See FIG. 3*i*) The displacement number D occupies an integral number of tetrads and therefore may have zeroes at the most significant end.

An an example we might consider the case where K is 0 and the next instruction word we wish to execute is located thirty-seven word times later. Equating our formula, 2D+3 to 37 yields a value of 17 for D. Thus we would write the binary value for 17, namely 0001 0001, at the low order end of the jump delay instruction word.

Note that if the jump delay command happens to occur in the seventh tetrad of the instruction word, we may not be able to write a large enough value for D to satisfy the problem (the maximum value for D in this case would be 15, since only the low order eighth tetrad is left in which to write the delay). In such cases the programmer may be forced to use an extra jump delay instruction word to accomplish his goal.

As a programming rule, a jump delay command cannot be placed in the low order eighth tetrad position of the instruction word. Such a jump delay would of necessity have a value of D equal to 0 (since there would be no room left in the instruction word to write D). If such a command could be executed, a new instruction word would be brought into the orders channel three word times later. However, this may be accomplished by programming a skip command in the eighth tetrad position (rather than the jump delay with $D=0$), thus allowing the automatic jump command to bring in the desired instruction word. The reason for the rule will be explained in the discussion below.

The polarity of F9 (the change track flip-flop) is reversed at the end of $t_0$ in the initially executed word time (F8') of the change track command. In other words, if F9 is found in the reset condition (F9'), it is set by means of the path F2'–A18 [FIG. 6*p*], G39–SF9 [FIG. 6*k*], occurs when F9 is found in the set condition (F9). The presence of F2' in these paths limits them to one unique bit time of the change track command, namely, $t_0$ of the initial execute word time. Since F2 is reset at $t_{32}$ of F8, set at the end of this initial $t_0$, and remains set throughout the duration of the change track command, the state F2' will exist only during $t_0$.

The change track command is then identical in all respects to the jump delay command after the initial word time (F8') when the actual track change is accomplished. For ease of reader understanding, the discussion of the jump delay aspect of the change track command will be treated fully in connection with the explanation of the jump delay (J*d*) command, fully set out below.

JUMP CONDITIONAL (JC) (1010) (10)

K, general storage, and the entire accumulator (including the low order bit at $t_0$) remain unchanged. If $K=0$ initially the jump conditional changes into a skip command. If $K=1$ initially, the jump conditional changes into a jump command.

The purpose of the jump conditional command in the computer is to provide a conditional branch in the program format. Programming versatility in any electronic digital computer is in a great part derived from the branch or decision type commands. In more conventional computers, the branch instructions are usually comparison commands, where the location of the next instruction depends on whether or not the comparison of two quantities denoted equality. These branch commands allow the computer to make elementary type decisions based on some previous information, some arithmetic result previously computed. In special cases, however, this information could represent whether or not a given input (or output) device was busy. The information could also represent an actual number being keyed into the computer from an input device.

A good example of where a jump conditional command might be useful is in an input test routine which might consist of three commands. These three commands, input, jump conditional, and a jump delay, in that order may form a closed loop which is continually repeated until a successful input is found. Each unsuccessful input zeroes the K flip-flop which causes the jump delay command following the jump conditional in the instruction word to be executed. The example is explained more fully in connection with the discussion of the jump conditional instruction below. In the case when a successful input finally is found, the K flip-flop is set to 1. The following jump conditional command is then changed into a jump command which transfers a different instruction word into the A–I channel, thereby branching the computer out of the input test routine.

The great flexibility of the jump condition as a branch command in our computer is realized by making the command conditional upon the K flip-flop. Since the K flip-flop remains unchanged during a normal F8 precession ($F2'.F8$), we observe that the contents of K are usually derived from the execution of the previous command. K is set high during input and output if these commands have been successful. Thus programming a jump conditional following these commands will allow the computer to branch out of an input or output test routine. K is also set high if an addition command (or a successful add conditional) overflows, or if a larger number is subtracted from a smaller in a subtraction command. Thus the computer may be programmed to branch as a result of an overflow or a negative number if we follow these respective commands with a jump conditional.

In the left shift command, described in greater detail below, a bit is shifted from the high order end ($t_{32}$) of the accumulator into K. Similarly a bit is shifted from the low order end ($t_1$) of the accumulator into K in the right shift command. Thus we can branch the program as a result of either a high or a low order digit of the accumulator number by following the appropriate shift command with a jump conditional.

The F1 or K flip-flop remains unchanged in many of the commands (namely skip, transfer to storage, transfer to accumulator, extract, jump, jump conditional, and unsuccessful add conditional) as well as in the normal precession ($F2'.F8$) during F8. Furthermore, the K flip-flop is intentionally set to 1 during the clear command more fully explained below. The programmer can take advantage of the fact that a right shift command followed by a left shift will reset K to 0, while at the same time leaving the accumulator unchanged. Therefore an operation that is conditioned upon the state of the K flip-flop does not necessarily have to follow directly after the operation that determined the state of K.

The low order bit of the accumulator is regenerated (and thus remains unchanged) during F8′ as a result of the path L8–SL2 [FIG. 6h], (G10, G11)–G14–G17–F30–SF3 [FIG. 6b]–G53–G55–G63–L1′ [FIG. 6n], G20–L7 [FIG. 6d]. The $tp_{32}$ diode in G10, the F3 diode in G11, and the F4 diode in G53 make this path possible.

If $K=0$ initially, the jump conditional is changed into a skip command at the end of $t_0$ of F8′. This is accomplished by means of the function A2 that serves as the common reset signal for the command shift register. The common path logic for this reset is G90–G92–A2 [FIG. 6p]. The presence of the F1′ diode in G90 of this common reset path fulfills the requirement that $K=0$. The respective paths from A2 to the command shift register are A2–G66–ZF4 [FIG. 6o], A2–G38–ZF6 [FIG. 6j] and (A2, G31)–G32–G35–ZF7 [FIG. 6i]. Notice that the F4′ diode and the F5 diode disable G31 if any of the jump instructions are staticized in the command register. Since F7 is already in the reset condition (F7′) in this command, however, it is not necessary that this path operate. Thus the command shift register will contain all 0's and decode as a normal skip command during the remainder ($t_{1-32}$) of F8′. Reference may be made to the description of the skip command for the remaining path logic involved in the unsuccessful ($K=0$) jump conditional command.

If $K=1$ initially, the jump conditional is changed into a jump command at the end of $t_{32}$ of F8′. This is accomplished by setting the F2 flip-flop at this time to serve as the jump command memory. The path logic for this is G6–G7–F20–SF2 [FIG. 6a]. The only difference between the successful ($K=1$) jump conditional and an ordinary jump command is that the F6 flip-flop remains set during the initial F8′ of the jump conditional. The computer, however, recognizes no difference between these commands, and executes the successful jump conditional exactly as if it were a jump command without regard for the state of the F6 flip-flop. Reference is made to the description of the jump command above, for the remaining path logic involved in the successful ($K=1$) jump conditional command.

JUMP DELAY (JD) (1011) (11)

The jump delay command is identical in all respects to the change track command except for the absence of the change track feature. The K flip-flop is reset to "0" and the low order accumulator bit $t_0$ is lost.

The purpose of the jump delay and change track commands is to skip over several word times (sectors) of general storage in order to resume the normal mode of operation at some new index point. The normal mode of operation is simply defined as the process-execute cycle, with a new primary command being executed every other word time. The length of the jump delay command is determined within two words by the relative address number D that the programmer has written at the low order end of the jump delay instruction word. The state of the K flip-flop determines whether the new word is transferred after $2D+3$ word times or $2D+5$ word times. With reference to general storage, this relative address represents the number of word times between the location currently being presented to the read circuits and the next instruction word to be executed. In other words, the relative address indicates a count of the number of word times we wish to skip before executing the next command.

An example of the application of the jump delay command occurs in an input "test" routine. If a new instruction word is transferred from general storage to the A-I channel, the first command will be executed three word times later. Suppose this first command is an input and the next two commands in the instruction word are a jump conditional and a jump delay respectively. The jump conditional command is then executed two word times after the input command, and tests whether or not the input command was successful. If the input was unsuccessful, the jump delay command is executed two word times after the jump conditional. In other words, the jump delay, programmed as the third command in the instruction word, will be executed seven word times after the instruction word was transferred into the A–I channel.

The jump delay command following the input can then form a closed loop for the input test routine if the input is unsuccessful. This closed loop, consisting of the three commands mentioned enables the computer to execute the same instruction over and over again until the input is successful, at which point the jump conditional command branches the program out of the input test routine. Notice that each time the closed loop is repeated for the input test routine, the same instruction word must be transferred from general storage into the A–I channel, since the instruction word is destructively executed, the A–I channel must get a new instruction word to continue the test routine.

Thus, we see that, in this example, the requirement is to return the computer to the same instruction word in general storage that the computer has been executing. Since K is known to be 0 (as a result of the unsuccessful input) after execution of the jump conditional command, we make use of our first equation, $\Delta=2D+3$ to compute the value of D in the instruction word. The next instruction word brought into the A–I channel, therefore will be presented $2D+3$ word times from the first execute word time of the command. We wish the computer to bring in the instruction word that is located two revolutions minus seven word times from the first execute word time of the jump delay command in question. As previously mentioned, the seven word times correspond to the jump delay's position as the third command in the instruction word. In other words, the jump delay is executed seven word times after the instruction word has been transferred into the A–I channel. It is pertinent to note here that after one revolution minus seven word times, the instruction word would line up with the accumulator portion (F8′) rather than with the instruction portion of the A–I channel (F8) as desired because of the odd number (seventy-nine) of word times per revolution.

Equating our figure of two revolutions minus seven word times (equivalent to 151 word times) to $2D+3$ yields a value of 74 for D. Thus we would write a value of 74 in binary (0100 1010) at the low order end of our instruction word for the input test routine.

The jump delay command is executed by reducing the count D in the instruction word to zero, and then changing the jump delay into a jump command. This jump command will automatically terminate the jump delay since a new instruction word will be transferred into the A–I channel. During the count reduction, the A–I channel must regenerate, rather than process through the command shift register as in a normal F8. Further, the adder-subtractor unit should be included in the A–I channel regeneration return path, in order that the count D may be reduced by one during each F8. Actually, the count D is reduced until it goes negative, which is two word times (the next F8) after the count has been reduced to zero.

It is possible to use the adder-subtractor to subtract one from the count each F8 until the count went negative, at which time the count going negative would produce a high order borrow in the F1 flip flop at $t_{32}$. However, a most significant factor in computer minimization was the use of a single structure as both an adder and subtractor. Three of the system's flip-flops (F1, F2, and F3) represent direct inputs to the adder-subtractor unit which produces a sum difference result digit. F1 represents the carry-borrow flip-flop, and, during F8′ (when the adder-subtractor unit is customarily used in contrast to F8), F2 and F3 represent the two operands, from general storage and the accumulator, respectively. During F8′ the adder-subtractor unit performs either addition by adding the digit in F2 to the digit in F3 or subtraction by subtracting the digit in F2 from the digit in F3 depending on the operation code. During F8, F1 still represents the carry-borrow flip-flop, while F3 represents the A–I channel. We have already stated, however, that the memory for the jump delay subgroup of commands (change track and jump delay) is $F2.F7$. Thus we see that the F2 input to the adder-subtractor unit will be continually high during the jump delay command. This does not matter during F8′, since the regeneration of the accumulator is independent of the adder-subtractor unit. The path for this regeneration during F8′ is L8–SL2 [FIG. 6*h*], G8–G12–G17–F30–SF5 [FIG. 6*b*], G53–G55–G63–L1′ [FIG. 6*n*], G20–L7 [FIG. 6*d*]. The F7 diode in G10, the $tp_{32}'$ diode in G11, and F2 diode in G53 make this path possible.

During F8, however, the fact that the F2 input to the adder-subtractor unit is continually high during the jump delay presents a unique approach to the problem of counting down the D number. The obvious method of counting down would be to subtract "1" from the count each F8, which requires that F2 be continually low rather than high. Since the subtractor unit is designed to subtract F2 from F3, the single "1" we wish to subtract from the count could be introduced to the adder-subtractor unit through the F1. This, however, is undesirable inasmuch as F2 is needed as a control flip-flop to remember the jump and jump delay subgroups of commands.

By resorting to the arithmetic principle of complementing, the existing interconnection can accomplish the ultimate goal which is to reduce the count D by unity until it goes negative. The principle of complementation allows us the alternative method of adding a constant "1" to each bit of the D number. Since the word length of the computer is thirty-three bits (thirty-two usable bits plus a low order flag bit), a constant high is equivalent to $2_{33}-1$. Thus we may rephrase our statement to say that in our computer, the process of subtracting a low order bit from the count is equivalent to the process of adding $2_{33}-1$ (a constant high) to the count which is the component of 1. Both methods reduce the count by one until it goes negative. The only difference between the two methods is that the count going negative is detected by the presence of a high order borrow in subtraction, whereas in addition, the negative going count is detected by the absence of a high order carry which then can be used to terminate the process. Obviously, the F2 flip-flop provides a constant high $(2_{33}-1)$ to the adder-sutractor unit. Moreover, the addition method has the further advantage that we need not insert the "1" (which was to be subtracted) into the borrow-carry flip-flop F1 as would be necessary in the subtraction method.

It is also important to note the position of the count D in the A–I channel with respect to the remainder of the instruction portion when the jump delay command is being executed. Remembering that the count D was written at the low order end of the instruction word originally, jump delay tetrad may have been programmed in any of the other higher order tetrad positions. Thus the count D precesses up through the instruction word (a tetrad at a time during each F8) until the jump delay tetrad is actually executed as a command. This process leaves the count D in some variable position within the A–I channel as the jump delay command is executed. The final position of the count D in the A–I channel will naturally be a direct function of where the jump delay tetrad was programmed in the original instruction word.

When the instruction word containing the jump delay was transferred into the A–I channel originally, a "1" was inserted at $t_0$, the low order flag position of the instruction portion of the A–I channel. As previously described in the write-up for the jump command, this bit precesses up through the A–I channel along with the rest of the new instruction word, and forms the automatic jump command if its tetrad is finally executed. In a jump delay instruction word, however, this A–I channel flag bit serves a different function. In both applications, the flag bit marks the low order end of the original instruction word as it precesses up through the A–I channel. But in the jump delay application, it is more significant to realize that the flag bit marks the lower end of the binary D number as the jump delay instruction word precesses up through the A–I channel.

The F4 flip-flop is used to remember that the instruction word flag bit has been found during each F8 of the jump delay command. This is accomplished by resetting F4 originally (at $t_{32}$ of the previous F8′) and then allowing it to take information from the A–I channel (F3) as in a normal precession during F8. Unlike the normal precession, however, the F4 flip-flop does not reset during F8, once it has been set. Since the flag bit is the first 1's bit found in the A–I channel (looking from the lower end), it follows that F4 can serve as memory, during each F8, that the flag bit has been found.

The path for resetting F4 at $t_{32}$ of F8′ is G74–A13–G92–A2 [FIG. 6*p*], G66–ZF4 [FIG. 6*o*]. The path for setting F4 during F8 is (G54, F3)–G64–SF4 [FIG. 6*o*] with the F7 diode in G54 making the path possible. The A1 diode in G65 prevents F4 from being reset during F8 of the jump delay command.

As in the addition operation, the sum gate logic L5 for the adder-subtractor unit yields an output sum whenever any one or all three of the inputs (F1, F2, and F3) are high. The mixing path for the sum gate is (G21, G22, G23, G24)–G25–L5 [FIG. 6*c*]. A more detailed description of this mixing path is given above with the description of the subtraction operation. F3 represents the A–I channel input to the adder-subtractor unit during F8, taking the path L8–SL2 [FIG. 6*h*], (G10, G11)–G14–G17–F30–SF3 [FIG. 6*b*], with the F7 diode in G10 and the $tp_{32}'$ diode in G11 making the path possible. It must be remembered that only the count D (and the flag bit) is contained in the instruction portion of the A–I channel during the jump delay command.

The path logic for setting the F2 flip-flop during the initial F8′ to remember the jump delay command is G6–G7–F20–SF2 [FIG. 6*a*]. The path logic for keeping F2 set during F8 (once it has already been set previously) is G95–G96–A7 [FIG. 6*p*], G7–F20–SF2 [FIG. 6*a*]. It will be remembered that, during the jump command, the F2 flip-flop was reset at the end of the inital F8 because of the $tp_{32}'$ diode in G95. In turn, F2 being reset initiated the termination of the jump command by providing an automatic skip during the next F8′. During the jump delay command, however, the F7 diode in G95 prevents F2 from being reset at the end of F8. Thus, unlike the jump command, F2 is still set at $t_0$ of the following F8′. It is this condition that allows the computer to remember that it is still executing the jump delay command during the succeeding F8′ word times.

The condition $F2.F7'$ provides the memory for the jump command, while $F2.F7$ provides the memory for the jump delay as was pointed out above. The path logic F4–G78–A17 [FIG. 6*p*], G6–G7–F20–SF2 [FIG. 6*a*] keeps the F2 flip-flop set during each F8′ of the jump delay command. The F4 flip-flop is set during the previous F8 when it finds the A–I channel flag bit, and is not reset until the end of $t_{32}$ of F8′.

The path of the output sum from L5 (the sum gate of the adder-subtractor unit) to the A–$I_w$ write head during each F8 of the jump delay is L5–G57–G63–L1′ [FIG. 6*n*], G20–L7 [FIG. 6*d*]. The control path leading to the A7 diode in G57 is G95–G96–A7 [FIG. 6*p*], with the F7 diode in G95 making the path possible. The F4 diode in G57 does not allow the output of the adder-subtractor unit to be recorded in the A–I channel until after the flag bit has been found in F8, since the purpose of F4 during the jump delay command is to search for this flag bit. The path for regenerating the flag bit itself in the A–I channel is L8–SL2 [FIG. 6h], (G10, G11)–G14–G17–F30–SF3 [FIG. 6b], G31–A22 [FIG. 6p], G56–G63–L1' [FIG. 6n], G20–L7 [FIG. 6d]. The F7 diode in G10 and the $tp_{32}$ diode in G11 allow the path to operate. Thus we see that all 0's are recorded until the flag bit which occurs in some variable position) is found. The flag bit is regenerated, and thereafter the output of the adder-subtractor unit (representing the old count D reduced by one) is recorded in the A–I channel.

As mentioned in the description of the jump command, A2 is the common reset signal for the command shift register. The command shift register is usually reset to all 0's at the end of $t_{32}$ of every F8'. This is achieved in the A2 net by the path A13–G92–A2 [FIG. 6p]. The four paths from A2 to the command shift register are A2–G66–ZF4 [FIG. 6o], A2–G38–ZF6 [FIG. 6l], and A2, G31–G32–G35–ZF7 [FIG. 6l]. In the change track and jump delay commands, however, G31 being disabled blocks A2 from resetting the F7 flip-flop, inasmuch as the F5 diode in G31 can never be high in a jump delay instruction while the F4' diode in G31 is always low when A2 is high (namely at $t_{32}$ of F8'. Since the F4 search flip-flop is set when the orders channel flag bit is found, it will not be reset until the end of $t_{32}$ of F8'. Thus we see that the disabled gate G31 protects F7, which distinguishes the jump delay subgroup from the jump subgroup of commands.

The path (F2, F3)–G81–A22 [FIG. 6p], G45–G47–SF1 [FIG. 6m] represents the logic for setting the carry flip-flop F1 during F8 of the jump delay command. The presence of the F4 diode in G45 inhibits F1 from being set high until after the flag bit has been found. Thus we see that the presence of any 1's bit in the A–I channel (other than the flag bit which sets F4) will set F1. In turn, the carry flip-flop F1 being set will indicate that the count D contained at least one 1's bit, and therefore has not yet been reduced to zero. Notice that F1 is not reset until the end of $t_{32}$ of F8, as indicated by the path (G75–A14 [FIG. 6p], G48)–G49–G52–ZF1 [FIG. 6m] which is enabled by the F2 diode in G48. Thus we may consider that the purpose of the carry flip-flop F1 during F8 of the jump delay command is to sense a non-zero D number in the A–I channel. At the same time this D number is being reduced by one in the adder-subtractor unit, following which it is recorded as the new count D in the A–I channel. The logic for this process has been previously described.

When D has been finally reduced to zero, the carry flip-flop F1 is not set during the next F8. The flag bit then represents the only 1's bit remaining in the instruction portion of the A–I channel. In turn, F1 being found in its reset condition at $t_{32}$ of F8, in conjunction with an F3' signal (indicating a zero count D) results in the F7 flip-flop being reset at the end of $t_{32}$. Note that we must also sense for the absence of a high order bit in the count (indicated by F3') in order to insure that we really have a zero count. Otherwise a non-zero count (containing only a high order 1's bit) would interfere with our zero count sensing logic, which is the reason for the rule prohibiting a Jd or CT instruction in the last tetrad. If such a procedure were permitted, the only bit in the instruction portion would be the flag in $t_{32}$ position. The path logic for resetting F7 is G82–A23 [FIG. 6p], G33–G35–ZF7 [FIG. 6l] which requires an F3' signal at $t_{32}$, and which would be an impossibility if the flag were in the $t_{32}$ position. The A14 diode in G33 (representing the path G75–A14) guarantees that F7 will not be reset until the end of $t_{32}$ of the F8 in question.

Let us now consider the next word time (F8') after F7 has been reset in the jump delay command (resulting from the count D being reduced to 0). We have already observed that the signal combination F2F7 identified the jump delay command. But we have now reset F7, and thus produced the combination *F2.F7'*, which represents the jump command. Thus we achieve the termination of the jump delay command by simply changing it into a jump command which is indistinguishable to the computer from any other jump command. In other words, the new instruction word will be transferred from general storage into the A–I channel two word times after the count D has been found reduced to zero. This corresponds to the definition of the jump command, where the transfer of the new instruction word is made one word time after the initial F8'. That F4 will be set during every F8 of the jump delay command, since the orders channel must always contain a flag bit. This allows us to achieve the signal combination F4 F5' F6' F7' during the F8' word time after F7 has been reset, which is decoded as a binary eight the instruction signal combination for the desired terminating jump command.

Our definition of the jump delay command initially stated that the next instruction word would be transferred into the A–I channel either (2D+3) or (2D+5) word times after the initial F8'. The formula for this number of word times (2D+3 or 2D+5) was dependent upon the programmed count D and also upon whether or not the carry flip-flop (F1) had been found reset initially. The 2D part of the formula is obvious from the fact that the count D is only reduced during F8 or every other word time. The 3 in the 2D+3 formula (covering the case where F1 is found reset initially) now also becomes obvious when we realize that it corresponds to the time required for the terminating jump command.

The count reduction process assumes that F1 is reset initially so that the count D is reduced by one when all 1's (on the adder F2 input) are added to it. If the F1 flip-flop is set initially, however, an extra low order, "1" is added to the number $2^{33}-1$ in the addition process. This low order one changes all the 1's (from the adder F2 input) to all 0's. In other words, the net effect of the carry flip-flop F1 being found set initially is to inhibit the count reduction during the initial F8. At the end of $t_{32}$ of this initial F8, however, F1 is reset and the actual count reduction can not start until the second F8 of a jump delay command if the carry flip-flop has been found set initially. This explains the two extra word times in the 2D+5 formula for the length of the jump delay command.

As previously mentioned, the carry flip-flop is reset to 0 at the end of $t_{32}$ of every F8 during the jump delay command. The terminating jump command will leave F1 unaltered because of the jump command's definition with respect to the carry flip-flop. Thus we observe that both the jump delay and the change track commands will result in the carry flip-flop K being reset to 0. The accumulator remains unchanged during these commands, but the low order accumulator flag bit at $t_0$ is lost (reset to 0). The regeneration path for the accumulator during F8' has been previously described. The accumulator flag bit is lost because of the F3 diode in G11. The flag bit occurs in L2 during $t_{32}$ at this point, and since F3 must be low at $t_{32}$ when the count D is finally reduced to 0, G11 is disabled and F3 will also be low at $t_0$ of F8'.

CLEAR (CL) (1100) (12)

K is set to 1. General storage remains unchanged. The accumulator is cleared ($t_{1-32}$), and a "1" is put into the low order bit position ($t_0$) of the accumulator.

The path logic for inserting the low order one into the accumulator at $t_0$ in the clear command is G54–G59–G63–L1' [FIG. 6n], G20–L7 [FIG. 6d]. The F2' diode in G54 allows this path to operate. F2' is used to denote $t_0$ time in the clear command. The F2 flip-flop enters F8' of the clear command in its reset condition (F2'). It is set at the end of $t_0$ of F8', however, and remains set throughout F8'. The path logic for setting F2 in the clear command is (G1, G109, G2, G3)–G4–G7–F20–SF2 [FIG. 6a], with the F4 diodes in G1 and G2, and the F6′ diode in G109 and G3 making the path possible. The accumulator is cleared (to all 0's) during the remainder ($t_{1-32}$) of F8′ of the clear command simply by not writing any logic in the L1′ net. The absence of logic in this net results in all 0's being recorded through the path L1′–G20–L7′ [FIG. 6d]. The F1 flip-flop (K) is set high at the end of $t_0$ of F8′ during the clear command as a result of the path F2′–A18 [FIG. 6p], G46–G47–SF1 [FIG. 6m].

RIGHT SHIFT (RS) (1101) (13)

General storage remains unchanged. The number in the accumulator is shifted one bit position to the right (divided by 2). The low order $t_0$ bit is lost, while the $t_1$ bit is shifted into both the K flip-flop and the $t_0$ position. (See FIG. 3j.)

The right shift operation is achieved by tapping the accumulator one bit early at the L2 flip-flop 52. The bits of the information word will be presented during $t_{0-31}$ at this position, in contrast to their normal timing of $t_{1-32}$ at the F3 flip-flop 56. The path of the number from the early tap position L2 to the accumulator record head is L2–G98–G99–A11 [FIG. 6p], G54–G59–G63–L1′ [FIG. 6n], G20–L7, [FIG. 6d], with the F7 diode in G54 making the path possible. It should also be noted that the absence of a high on the F7′ diode (since F7′ is low during the clear command) in G98 allows the L2 diode in G98 to have control of this gate during the clear command.

The path logic for inserting the $t_1$ bit of the accumulator into the K flip-flop (F1) is L2–G98–G99–A11 [FIG. 6p], G46–G47–SF1 [FIG. 6m]. It is important to notice that we have used the early tap (L2) of the accumulator for this transfer also, so that the $t_1$ bit (with reference to F3) actually occurs at $t_0$ (one bit early) at the L2 position. Thus we observe that we wish to make this transfer only at $t_0$. This is achieved by the A18 diode (which actually reflects F2′) in G46 of the above path. F2′ is used to denote $t_0$ in the right shift command as well as in the clear command. The path logic and description for this application of the F2 flip-flop was given under the description of the clear command.

The F1 flip-flop is reset at the end of $t_{32}$ of F8, just prior to the execute word time of the right shift command. The reset path logic is G48–G49–G52–ZF1 [FIG. 6m], with the F6 diode in G48 making the path possible. This reset path is necessary in the right shift command since the F1 flip-flop has separate set and reset networks. In other words, F1 is reset initially so that only the "1" output of the L2 flip-flop need be applied to the F1 flip-flop representing the $t_1$ bit of the accumulator number. If the $t_1$ bit is a "0," the F1 flip-flop remains in the zero state.

ADD CONDITIONAL (ADDc) (1110) (14)

If $K=0$ initially, the add conditional changes into a skip command. K, general storage, and the entire accumulator (including the low order bit at $t_0$) remains unchanged. If $K=1$ initially, it is reset to 0 and the add conditional changes into an add command. If the result of the addition exceeds 32 bits (overflows), K is set to 1. General storage remains unchanged, while the low order accumulator bit at $t_0$ is reversed.

If $K=0$ initially, the low order bit of the accumulator is regenerated (and thus remains unchanged) during F8′ as a result of the path L8–SL2 [FIG. 6n], (G10, G11)–G14–G17–F30–SF3 [FIG. 6b], G80–A21 [FIG. 6p], G23–G25–L5 [FIG. 6e], G58–G63–L1′ [FIG. 6n], G20–L7 [FIG. 6d]. The $tp_{32}$ diode in G10, the F3 diode in G11, and the A18 diode (reflecting F2′) in G80 make this path possible. The unsuccessful add conditional ($K=0$ initially) is changed into a skip command at the end of $t_0$ of F8′. This is accomplished by means of the command reset signal (A2) for the command shift register, just as in the unsuccessful jump conditional command. The common path logic for this reset is G90–G92–A2 [FIG. 6p], with the presence of the F1′ diode in G90 fulfilling the requirement that $K=0$. The respective paths for applying A2 to the command shift register have been described above. Thus the command shift register will contain all 0's and decode as a normal skip command during the remainder ($t_{2-32}$) of F8′. The reader is referred to the description of the skip command for the remaining path logic involved in the unsuccessful ($K=0$ initially) add conditional command.

If $K=1$ initially, the low order ($t_0$) bit of the accumulator is reversed (a 0 bit changes into a 1, or a 1's bit changes into a 0). This is accomplished by means of the path L8–SL2 [FIG. 6h], (G10, G11)–G14–G17–F30–SF3 [FIG. 6b], G80–A21 [FIG. 6p] if the original bit was a "1," with the $tp_{32}$ diode in G10 and the F3 diode in G11 allowing the path to operate. A21 is not able to get the original "1" bit through the adder-subtractor unit sum net (L5) because of F1, and thus the resulting low on L5 causes a "0" to be recorded in the low order bit position of the accumulator. If the original low order bit is a "0," however, it appears as F3′ and results in the path F3′–G79–A20 [FIG. 6p], G21–G25–L5 [FIG. 6e], G58–G63–L1′ [FIG. 6n], G20–L7 [FIG. 6d]. Thus in this case a "1" is recorded in the low order bit position ($t_0$) of the accumulator.

The successful ($K=1$ initially) add conditional is changed into an add command at the end of $t_0$ of F8′. This is accomplished by advancing the command shift register once more at the end of $t_0$ to F8′, while at the same time insuring that a "0" bit enters the command shift register. It is obvious that this process merely shifts the number to the right, halving the binary number in the command shift register. In this particular case, therefore, a binary fourteen is changed into a binary seven. These represent, respectively, binary number codes for the add conditional and add commands. The common path logic for generating the command shift register advance signal (A1) is G67–A3–G98–G94–A1 [FIG. 6p], with the F1 diode in G67 fulfilling the requirement that $K=1$. The respective paths from A1 to the low order three stages (F5, F6, F7,) of the command shift register are (A1, G26–)–G27–SF5 [FIG. 6f], A1–G36–SF6 [FIG. 6j], and A1–G30–SF7 [FIG. 6i]. The $tp_{32}'$ diode in G26 makes the operation of the first of these paths possible.

The reset paths from A1 to the command shift register (resulting in F5′, F6′, and F7′) are not energized since the A1 signal merely applies the contents of the adjacent flip-flop and three 1's are being shifted in the case of the successful add conditional. The signal A3 (with path F1–G67–A3 [FIG. 6p] actually represents the signal combination for the successful add conditional command, and is used to reset F4 as well as to advance the command shift register by generating A1. The path logic for A3 resetting the F4 flip-flop is A3–G66–ZF4 [FIG. 6o]. Thus the command shift register will contain a binary seven and thus decode as a normal add command during the remainder ($t_{1-32}$) of F8′. Reference is made to the description of the add command for the remaining path logic involved in the successful ($K=1$ initially) add conditional command.

It may be noted that the actual add conditional command will only last one bit time (namely $t_0$ of F8′) regardless of whether or not the command is successful. At the end of this bit time the command will either be changed into a skip command or an add command depending on whether K was initially equal to "0" or "1" respectively. In the latter case we find that it is necessary to reset the F1 flip-flop at the end of $t_0$ of F8′ as we change the successful add conditional into an add command. Otherwise the F1 flip-flop being set (reflecting $K=1$ initially would result in the propagation of a low order carry into the add command, which in turn would result in the final sum being increased by unity. The path logic for resetting the F1 flip-flop in this instance is G67–A3 [FIG. 6p], G52–ZF1 [FIG. 6m].

Unlike the jump conditional, the add conditional is not a primary branch type command in that the same instruction word is retained regardless of the success of the command. The add conditional may be considered as a degenerate unit branch command, however, in that it provides two alternate paths of reaching the same common program point, namely the next command in the instruction word. One of these paths contains an add command, while the other does not. In other words, the number in the accumulator may or may not be modified (by addition), depending on the previous state of the K flip-flop. The great flexibility realized in our computer by making the conditional type commands conditional upon the K flip-flop has already been described in the write-up for the jump conditional command.

LEFT SHIFT (LS) (1111) (15)

General storage remains unchanged while the low order ($t_0$) accumulator bit is reset to 0. K is reset to 0 initially. The number in the accumulator (including the original low order bit at $t_0$) is shifted one bit position to the left (multiplied by 2). The high order bit ($t_{32}$) is shifted into the K flip-flop. (See FIG. 3*k*.)

The F1 flip-flop (K) is reset at the end of $t_{32}$ of F8, just previous to F8' of the left shift command. The reset path logic is G48–G49–G52–ZF1 [FIG. 6*m*], with the F6 diode in G48 allowing the path to operate. This initial resetting of F1 is necessary in order to insure that a low order carry does not propagate into the addition process that follows.

The left shift command is achieved by simply adding the accumulator member to itself in the adder-subtractor unit. This addition process doubles the contents of the accumulator and which is equivalent to a left shift. Moreover, the addition process will cause the original high order bit at $t_{32}$ to be shifted into the carry flip-flop F1 automatically. This results from the fact that a high order 1's bit in the accumulator will result in an overflow (high order carry) into the carry flip-flop F1 during the addition process.

The path of the low order bit ($t_0$) from the accumulator to the adder-subtractor unit F3 input is L8–SL2 [FIG. 6*h*], (G10, G11)–G14–G17–F30–SF3 [FIG. 6*b*], with the $tp_{32}$ diode in G10 and the F3 diode in G11 making the path possible. The path of the remainder of the accumulator ($t_{1\text{-}32}$) from L8 to the adder-subtractor unit F3 input is L8–SL2 [FIG. 6*h*], G8–G12–G17–F30–SF3 [FIG. 6*b*], with the F6 diode in G8 allowing the path to operate. The path of the low order bit ($t_0$) from the accumulator to the adder-subtractor unit F2 input is L8–SL2 [FIG. 6*h*], G108–G7–F20–SF2 [FIG. 6*a*]. The path of the remainder of the accumulator ($t_{1\text{-}32}$) from L8 to the adder-subtractor unit F2 input is L8–SL2 [FIG. 6*h*], (G1, G109, G2, G3)–G4–G7–F20–SF2 [FIG. 6*a*], with the F4 diodes in G1 and G2, the F7 diode in G109 and the L2 diode in G3 making the path possible. The path of the result from the adder-subtractor unit to the A–$I_w$ write head is L5–G58–G63–L1' [FIG. 6*n*], G20–L7 [FIG. 6*d*].

Reference is made to the description of the addition command for the various logic paths (including the common mixing path) involved in the adder-subtractor unit. All of these paths (including the setting and resetting of the carry flip-flop F1 during F8') are identical for the addition and left shift commands.

It has already been described that F1 is reset as we enter F8' of the left shift command. Thus the input conditions of the adder-subtractor unit at $t_0$ must either be F1', F2', F3' or F1', F2, F3, depending on whether the original low order accumulator bit was 0 or 1. Either of these two possible input conditions will result in the output of the sum-difference net (L5) being 0 to $t_0$. Thus we observe that the low order ($t_0$) bit of the accumulator is reset to 0 in the left shift command.

Note that no information is lost in either the left or right shift commands. This results from the fact that the bit is always shifted off the end of the accumulator (either $t_{32}$ in the left shift or $t_1$ in the right shift) into the K flip-flop in both commands. Coupling this feature of the shift commands with the jump conditional command provides the powerful feature, in our invention, of branching the program depending on the respective high or low bits of the accumulator.

Having described in detail the individual operations which one illustrative computer in accordance with our invention can perform and the logical circuits permitting their implementation, there is shown in FIG. 8 an overall block diagram of our computer showing the paths of flow of information signals within the computer during its operation. Items corresponding to those of other figures have corresponding designating numbers.

The circles of FIG. 8 represent the drum channels. The squares represent the system flip-flops. The dotted arrows leading in and out of flip-flops represent control signal paths (as distinguished from information signal paths).

The solid lines represent information signal paths. Each line may correspond to one or more conductors in the actual machine and may include other devices (for example, amplifiers) not shown in the diagram. A few of the lines are marked with symbols such as L5, L7, L8, S1, S2, S4, S8, S11, E1, E2, E4, E8, E16.

The semicircular symbols represent the gating of the flow of information. These gate symbols serve merely to facilitate the functional understanding of the machine and do not correspond, except in a general sense, to the structural gates in the logical gating network. Each of these idealized gates is governed by control signals from the flip-flops. The control signals entering the gates are not shown in the diagram.

FIGURE 8 is closely related to FIGURES 6*a*–6*k*. By deleting in FIGURE 8 the information inoperative during individual computer operations one could obtain the diagrams corresponding to those of FIGURES 6*a*–6*k*.

As it was already shown, each individual computer operation consists of two or more (in one exceptional case only one) cycles, each cycle of one word time duration. During each cycle certain control flip-flops remain in a constant state, certain control flip-flops may change their state during the cycle and certain flip-flops act as delay or memory elements in the path of flow of information. A feature of our invention is that one flip-flop may function both as information and control flip-flop at different times.

Table 128 below contains the list of different types of cycles occurring during the operation of the machine together with the flip-flop configurations determining each type of cycle.

*Table 128*

EXECUTE CYCLES

| | |
|---|---|
| F4' F5' F6' F7' F8' | Skip. |
| F4' F5' F6' F7 F8' | Transfer to Storage. |
| F4' F5' F6 F7' F8' | Transfer to Accumulator. |
| F1' F4' F5' F6 F7 F8' | Extract. |
| F4' F5 F6' F7' F8' | Output. |
| F4' F5 F6' F7' F8' | Input. |
| F4' F5 F6 F7' F8' | Subtract. |
| F4' F5 F6 F7 F8' | Add. |
| F4 F5' F6' F7' F8' | Jump. |
| F4 F5' F6' F7 F8' | Change Track (and execute cycles of a Jump Delay operation). |
| F1' F4 F5' F6 F7' F8' | Jump Conditional Unsuccessful. |
| F1 F4 F5' F6 F7' F8' | Jump Conditional Successful. |
| F4 F5' F6 F7 F8' | Jump Delay (first execute cycle). |
| F4 F5 F6' F7' F8' | Clear. |
| F4 F5 F6' F7 F8' | Right Shift. |
| F1' F4 F5 F6 F7' F8' | Add Conditional Unsuccessful. |
| F1 F4 F5 F6 F7' F8' | Add Conditional Successful. |
| F4 F5 F6 F7 F8' | Left Shift. |

PRECESS CYCLES

| | |
|---|---|
| F2' F8 | Normal Precess Cycle. |
| F2 F4' F7' F8 | Instructions Transfer Cycle. |
| F2 F7 F8 | Count Down Cycle. |

Table 129 gives a list of operations which can be programmed and a breakdown of each operation into cycles.

*Table 129*

OPERATION CYCLES

| | |
|---|---|
| Skip | Normal process.<br>Skip. |
| Transfer to Storage | Normal Precess.<br>Transfer to Storage. |
| Transfer to Accumulator | Normal Precess.<br>Transfer to Accumulator. |
| Extract | Normal Precess.<br>Extract. |
| Leap | Normal Precess. |
| Output Unsuccessful | Normal Precess.<br>Skip. |
| Output Successful | Normal Precess.<br>Output (4 bit times).<br>Skip (27 bit times). |
| Input (Successful or Unsuccessful) | Normal Precess.<br>Input. |
| Subtract | Normal Precess.<br>Subtract. |
| Add | Normal Precess.<br>Add. |
| Jump | Normal Precess.<br>Jump.<br>Instruction Transfer.<br>Skip. |
| Change Track | Normal Precess.<br>Change Track.<br>Count Down.<br>Change Track.<br>Count Down.<br>.<br>.<br>.<br>Change Track.<br>Count Down.<br>Jump.<br>Instruction Transfer.<br>Skip. |
| Jump Conditional Successful | Normal Precess.<br>Jump Conditional Successful.<br>Instruction Transfer.<br>Skip. |
| Jump Conditional Unsuccessful | Normal Precess.<br>Jump Conditional Unsuccessful (1 bit time).<br>Skip (32 bit times). |
| Jump Delay | Normal Precess.<br>Jump Delay.<br>Count Down.<br>Change Track.<br>Count Down.<br>.<br>.<br>.<br>Change Track.<br>Count Down.<br>Jump.<br>Instruction Transfer.<br>Skip |
| Clear | Normal Precess.<br>Clear. |
| Shift Right | Normal Precess.<br>Shift Right. |
| Add Conditional Successful | Normal Precess.<br>Add Conditional Successful (1 bit time).<br>Add (32 bit times). |
| Add Conditional Unsuccessful | Normal Precess.<br>Add Conditional Unsuccessful (1 bit time).<br>Skip (32 bit times). |
| Shift Left | Normal Precess.<br>Shift Left. |

Clock pulses occurring every bit time and necessary for the proper operation of the computer are not represented in FIGURE 8. The flip-flop $tp_{32}$ (72) connected to the clock channel 22 emits a control pulse at the end of every cycle. The flip-flop F8 is low and high for alternate cycles thus distinguishing between the precess and execute cycles. The operation of the computer during execute cycles is governed by the flip-flops F4 (58), F5 (66), F6 (62), F7 (64) which comprise the control shift register. During normal precess cycles these flip-flops form a part of information loop precessing the instruction word in the A–I channel. The function of the control flip-flop is at this time taken over by the F2 flip-flop.

The transducers at the general storage channels GS1 (34) and GS2 (36) are connected through the four gates 366, 368, 370, 372 which are controlled by the state of the track counter flip-flop F9. The state of this flip-flop is changed during the $t_0$ time of the first change track cycle of change track operation. At all other times it remains constant.

The information in the accumulator-instruction channel 28 is, when it is not processed otherwise, regenerated through the loop consisting of the elements 32, 52, 334, 56, 350, 332, 30. This loop introduces a delay of two bit times in addition to the delay of 64 bit times between the writing transducer 30 and reading transducer 32.

NORMAL PRECESS CYCLES

Gate 350 is closed and the gates 334, 336, 338, 340, 342, 352 are open completing the precession loop, which delays by 4 bits the regeneration of the instruction word. At the end of the normal precess cycle the gates 336, 338, 340, 342, 352 become closed, i.e. become non-conducting, and an instruction is stranded in the flip-flops F4, F5, F6, F7 to be executed during the next cycle. The flip-flop F2 is a constant control flip-flop during the normal precess cycle.

Depending upon the anticipated instruction the following things may occur during the $t_{32}$ time of the normal precess cycle:

(*a*) F1 flip-flop may be reset to zero, or may remain intact.

(*b*) Accumulator flag-bit may be transferred from L2 to F2 through gate 358, or F2 may remain at zero.

(*c*) Accumulator flag-bit may be transferred from L2 to F3, or the gate 334 may be closed early to block this transfer and to reset F3 to zero.

(*d*) In case of anticipated leap (distinguished from anticipated extract by the state of the F1 flip-flop) the resetting to zero of the F8 at the end of the normal precess cycle is blocked, so that the normal precess cycle is followed by another normal precess cycle.

(*e*) In case of anticipated output at the time the printer is busy the gate 338 is closed at $t_{32}$ time blocking the precession of the "1" signal in the output instruction, thus causing the next cycle to be a skip.

INSTRUCTION TRANSFER CYCLES

During these cycles an instruction word is transferred from general storage to the A–I channel through the path 360, F3, 350, 332, 30. The gate 334 is closed. The flip-flops F2, F4, F7 are constant control flip-flops. The flip-flops F5, F6 are at zero and do not perform any function during the transfer. At $t_{32}$ time of the cycle, the gate 360 is closed, and the gate 334 may be open to transfer the accumulator flag bit into the flip-flop F3. At the end of this cycle the four control flip-flops F4, F5, F6, F7 remain reset, thus making the next cycle a skip.

COUNT DOWN CYCLES

The flip-flops F5, F6 are at zero, but perform no function. The flip-flops F2, F7 are constant control flip-flops. The flip-flop F4 is a variable control flip-flop. During the first phase of the cycle, the normal regeneration loop is in operation. Simultaneously, the gate 336 is open, thus setting the F4 flip-flop, whenever a "1" occurs in the loop. After that, the normal regeneration loop becomes inoperative and the gates 374, 364 become open enabling the add-subtract unit to operate. The gate 334 remains open so that the add-subtract unit adds a string of 1's from the control flip-flop F2 to the count number which is in the instruction word flowing through the flip-flop F3. The flip-flop F1 serves as carry flip-flop.

At time $t_{32}$ the information in the F4, F5, F6, F7 flip-flops represents normally a 1001 code, thus making the next cycle a change track. However, if the count number has been reduced to zero, there is no carry in the process of addition. In this case the F7 flip-flop is reset to zero at $t_{32}$ time making the next cycle a jump.

EXECUTE CYCLES

Most execute cycles are followed by normal precess cycles. Exceptions to this rule are Jump, Jump Conditional Successful, Jump Delay, Change Track. This is achieved by resetting F2 to zero at the end of the execute cycle. Simultaneously, the four control flip-flops F4, F5, F6, F7 are reset to zero, thus introducing zeroes into the precession loop. The gate 334 is always closed at the end of an execute cycle.

SKIP CYCLES

The normal regeneration loop is in operation.

*Transfer to storage cycles.*—In these cycles the F2 flip-flop serves as a variable control flip-flop to distinguish between $t_0$ bit time when the transfer of the flag bit is blocked and the rest of the cycle. The normal regeneration loop containing the flip-flop F3 is in operation. The transfer to storage occurs through the gate 356 from the flip-flop F3.

*Transfer to accumulator cycles.*—The transfer occurs through the path consisting of the elements 362, F2, 354, 332, 30.

EXTRACT CYCLES

The flip-flops F2 and F3 act as general storage and accumulator playback flip-flops respectively. The output of both of these flip-flops goes through the gates 350 and 357 into the gate 332 which performs the extract function and transmits the result to the transducer 30.

OUTPUT AND INPUT CYCLES

The flip-flops F2 and F3 act as variable control flip-flops and form a counter which counts the first four bit times of an output or input cycle. In an output cycle, the output code is then reset so that the remainder of the cycle operates as skip. The normal regeneration path is not working in either output or input cycles. However, it becomes operative when an output is changed into a skip. The input signals go into the accumulator through the gate 330, and the output signals go from the accumulator through the L2 flip-flop and the gate 346; the fifth output signal originates in the track counter flip-flop F9 and goes through the gate 348. The F1 flip-flop is set or not in dependence upon whether the input or output operation is successful or unsuccessful.

ADD AND SUBTRACT CYCLES

The flip-flops F2 and F3 serve, respectively, as a general storage playback flip-flop and an accumulator playback flip-flop. The flip-flop F1 serves as carry flip-flop for addition, and as borrow flip-flop for subtraction. The gates 334, 362, 364, 374 are conducting. A feature of our invention is that the add-subtract unit is permanently connected to the flip-flops F1, F2 and F3 without intervening gates. The output L5 of the add-subtract unit is connected whenever necessary through the gate 374 to the gate 332 and the A–I channel.

SHIFT LEFT CYCLES

During these cycles both the F2 and F3 flip-flops act as accumulator play-back flip-flops. Otherwise, the computer operates in the same way as during add cycles, performing an addition of the number in the accumulator to itself. The conducting gates are 334, 358, 364, 374.

ADD CONDITIONAL CYCLES

The add conditional code exists in the control shift register (F4, F5, F6, F7) for a duration of only one bit time. Then it is changed in dependence upon the state of the F1 flip-flop, either to an add code or to a skip code.

SHIFT RIGHT CYCLES

The accumulator regeneration occurs through the loop L2, 344, 332, 30 containing only one flip-flop and causing a recording of the information in the accumulator one bit time earlier than the normal regeneration loop. The $t_1$ bit of the word in the accumulator is transferred through the gate 376 into the F1 flip-flop. This gate is conducting only at $t_0$ bit time of the cycle (the flip-flop L2 being situated early in the loop contains the $t_1$ bit at $t_0$ bit time). The flip-flop F2 serves as a variable control flip-flop to distinguish the $t_0$ time from the rest of the cycle.

CLEAR CYCLES

At $t_0$ time "1" is recorded in the accumulator and inserted into the F1 flip-flop. During the rest of the cycle all gates of FIGURE 8 are non-conducting and the rest of the accumulator is reset to zero. The flip-flop F2 serves as a variable control flip-flop to distinguish the $t_0$ time from the rest of the cycle.

JUMP CYCLES

The normal regeneration path is in operation. The F2 flip-flop is set during the cycle and remains set at the end of the cycle, thus causing the next cycle to be an instructions transfer cycle. The F3 flip-flop is set at $t_{32}$ time of the jump cycle. The "1" in this flip-flop is incorporated as the flag bit into the instruction word transferred during the succeeding instruction transfer cycle.

JUMP CONDITIONAL CYCLES

The normal regeneration path is in operation. If the F1 flip-flop is at zero, the jump conditional code exists for only one bit time and is turned into a skip code. If the F1 flip-flop is set the jump conditional code exists for the duration of the whole cycle. The operation of the computer is in the latter case identical to that during a jump cycle.

JUMP DELAY AND CHANGE TRACK CYCLES

The normal regeneration path is in operation. The F2 flip-flop, if not already set, is set and remains set at the end of the cycle. Only three control shift register flip-flops (F4, F5, F6) are reset at the end of the cycle. The fourth flip-flop F7 remains set, thus causing the next cycle to be a count down cycle. In change track cycles, the change in the state of the track counter flip-flop F9 occurs if the previous cycle has been a normal precess cycle and not a count down cycle. These two cases are distinguished by the state of the F2 flip-flop during the $t_0$ time of the change track cycle.

WARMUP

In more conventional computers, the warmup period simply consists of some fixed length of time (after the computer is turned on initially) sufficiently long to insure that all the various warmup conditions are satisfied. These conditions allow the power supplies to warm up, the drum to reach top speed, and various other warmup requirements. The computer is always left in the rest state at the termination of the warmup period if the warmup routine forces the conditions for the rest state.

The warmup requirements for the computer of the present invention are complicated by the fact that no static rest state exists as such in this microprogrammed computer. In other words, the computer is continually running in its normal dynamic mode. This becomes more obvious when we notice that no stop command exists in the sixteen primary commands. Our computer, however, may be considered to be in a pseudo-rest state if the computer is dynamically processing a closed loop input routine, and continues to do so until a successful input is found. During this time the computer is in the equivalent mode of a static rest state, for it accomplishes nothing useful (except waiting) until the actual input occurs.

Depending on the program, the input character could serve to tell the computer which program to execute next. In this case the input character would serve as decision control, rather than as the customary numerical input where it is simply part of a number word. It is fairly obvious that the initial program executed by this computer following the warmup period must be a master routine. This master routine will call for an input character, which in turn will be automatically processed as a decision control character. Thus the master routine will allow this character to determine which of the various sub-programs is to be executed next.

The additional requirement of the warmup period is to somehow synchronize with and thus initiate the master routine. In other words, the initial instruction word of the master routine must be indexed so that it will be the first useful instruction word to be executed once the warm-up period is over. This will achieve the goal of leaving the computer in its pseudo rest state following the warm-up period, with the input loop of the master routine serving as the rest state in question.

The two master control relays, R1, R2, 90, 92 serve to specify the four possible warmup states as set out in Table 4.

*Table 4*

| | |
|---|---|
| R1'R2' | Off. |
| R1R2' | Start. |
| R1R2 | Fill. |
| R1'R2 | Compute. |

These relays work in conjunction with the two operator control buttons, the START 172, and the STOP 173. When the STOP button is pushed, all power is removed from the computer which results in both control relays being de-energized. This yields the state R1', R2', which represents the "computer off" state.

When the START button is pushed, the computer proceeds to sequence through the three remaining states of the two control relays. The first two of these states, START and FILL, cover the complete warmup period, while the third computed state represents the normal dynamic state of the computer in action. Initially the computer changes from the "power off" state (R1', R2') to the START state (R1, R2'). During this state all 0's are recorded in the accumulator instruction channel as a result of the path R2'–G20–L7'. It will be noticed that the gating structure of the L7 net is such that the R2' diode in G20 will not affect the computer once the START state has been completed.

Three of the nine systems flip-flops (F1, F2, and F9) are forced low to their respective reset conditions during this initial warmup state. The R2' diodes (179, 175, 176, respectively), tied directly to the zero output sides (F1', F2', F9') of these flip-flops achieve the forced reset. The circuitry in question dictates that these diodes will only affect the flip-flops when the common input R2' of the diodes is high (grounded). This restricts the action of the diodes to the initial warmup state. Furthermore, the circuitry also dictates that these forced reset diodes override the effect of the flip-flop's normal set and zero logic.

An important consideration here is that the computer logic structure has always utilized the back contact of the R2 relay (namely R2') in achieving the desired reset goals during the START state. This is mandatory because of the fact that a relay's forward contact does not always represent the reverse polarity of the back contact. In other words, a small time interval exists when the relay operates during which neither contact is energized.

Furthermore, the contact bounce problem, which occurs both when a relay is leaving or arriving at a contact, must always be taken into consideration by the logic. The fact that only the back contact of the R2 relay is used in the START state (*R*1, *R*2') allows the computer to switch into the second warmup or FILL state (*R*1.*R*2) involving a change in R2 with no transient problem.

It will be further noticed that only one or the other (never both) of the two control relays is switched at any one time as our computer sequences through the warmup states. In other words pushing the START button when the computer is "off" causes the sequence of states *R*1'.*R*2'—*R*1.*R*2'—*R*1.*R*2—*R*1'.*R*2. Furthermore, pushing the STOP button when the computer is "on" causes the sequence *R*1'.*R*2—*R*1'.*R*2'. Pushing the START button when the computer is "on" causes the sequence *R*1'.*R*2—*R*1'.*R*2'—*R*1.*R*2'—*R*1.*R*2—*R*1'.*R*2, which thus achieves a "reset" function of the button. In all of these sequences it is only necessary to switch one of the two control relays at any given time in order to achieve the desired state change. This method of sequencing eliminates the "critical race" problem which always occurs when adjacent states require more than one relay to change simultaneously.

As previously described, the initial warmup state (*R*1.*R*2') resets to zero the three system flip-flops F1, F2, and F9, and also records all 0's in the A–I channel. The length of this state is determined by a time delay device 177 shown in FIG. 5*d*, which is sufficient to allow the various warmup features (power supply warmup, drum attaining full speed, etc.) to take place. The computer automatically sequences into the FILL state (*R*1.*R*2) when the R2 relay operates at the end of the time delay.

The FILL state (*R*1.*R*2) is really a general storage synchronizing state in that the programmed master routine (previously mentioned) must be located and initiated. A steady state signal long enough to drop out the R1 relay and thus achieve the final "compute" state (*R*1'.*R*2) must be provided by programming as a part of the initial instruction word of the master routine.

The method used to achieve the general storage synchronization is to utilize the low order ($t_0$) flag bits of the general storage words as a pseudo index pulse track. The general storage track used will be the one selected by the reset (F9') condition of the F9 flip-flop. This reset condition was forced in the initial warmup state as previously described. None of the sixteen primary commands can either record in or read from the flag bit position of the general storage words. Consequently the flag bit positions of the general storage track selected by F9' may be envisioned as an index pulse track in that they are recorded with the original program and thereafter never disturbed. Needless to say, all except one of the flag bits on this pseudo index pulse track are of the same polarity (namely all 1's), with the lone exception being a "0" flag bit. This lone "0" flag bit represents a pseudo index pulse, and consequently the general storage word associated with this flag bit represents the initial instruction word that will be executed. Before the initial instruction word is located, the computer sequences normally in the FILL state, but executes only harmless skip commands since the A–I channel contains nothing but zeros. In this aspect the skip command (decoded as all 0's from the command shift register) serves the very important function of "doing nothing."

Since the general storage read signals L12 and L12' are timed one bit early (in order to make up for the one bit delay in the general storage read flip-flop F2), we find that they represent the general storage index flag bit at $t_{32}$ of F8' rather than at $t_0$ of F8. The signal L12' is used in the search for a 0's rather than a 1's flag bit, while the early reference time $t_{32}$ of F8' indicates that we wish to transfer the index instruction word from general storage into the A–I channel, during the following F8. The path logic G5–G7–SF2 [FIG. 6*a*] is all that is needed to accomplish this task. The presence of the R1 and R2 diodes in G5 limit this gate to searching for the "0" flag bit only during the FILL state.

Once the search path has located the "0" flag bit, the computer will enter the following F8 with the F2 flip-flop in its set condition (F2). This fact produces the combination F2F7'F8 inasmuch as the F7 flip-flop is reset as a result of precessing all 0's through the command shift register up until this time. It will be remembered that this represents the unique combination in the jump command which signifies that a new instruction word should be transferred into the A–I channel from general storage during this word time. Thus we see that the computer can in no way tell from this time on that it is not terminating the execution of a regular jump command. The circuits which insert a "1" into the flag bit position of the instruction word in a regular jump command remain, however, inoperative.

The stored program now has control of the computer, but one final task must be accomplished before the system can proceed with the programmed master routine. This final task is to provide a steady state signal long enough to drop out the R1 relay and thus terminate the FILL state. This will leave the system in the final "COMPUTE" state (*R1'.R2*). The long steady state signal is provided by programming a jump delay or change track command in the niitial index instruction word. This initial jump delay instruction word must contain a sufficiently large delay count number to allow ample time for the resulting steady state signal F2 to drop out the R1 relay. Once this initial jump delay has been executed, the computer proceeds with its program. This results from the fact that the length of the jump delay command guarantees that the final state *R1'.R2* will be reached sometime during the command.

The purpose of resetting the F1 flip-flop during the initial warmup state was to guarantee that $K=0$ when the initial jump delay command is executed. The skip commands executed prior to the jump delay leave K unchanged. The purpose of resetting the F2 flip-flop during the initial warmup state was to insure that no transfer of instructions into the A–I channel occurs before the initial word is found. The presence of the F3 diode in G1 requires that the accumulator contain at least one 1's bit in order to set the F2 flip-flop during a skip command. Consequently the all zero A–I channel which results from the START state will inhibit the F2 flip-flop from being set during the "mark time" skip commands of the FILL state. In other words, the F2 flip-flop is reset during the START state and will remain in its reset condition until the general storage index flag bit is located.

The actual embodiment of the computer also contains circuits (not shown in figures) which prevent the writing in general storage unless the machine is in the COMPUTE (*R1'.R2*) state.

The circuitry used in the preferred embodiment of the computer is illustrated in FIG. 5 consisting of FIGURES 5*a*–5*d*. Referring to FIG. 5*a*, it may be seen that signals recorded in the timing channel 22 are read by the $T_r$ read head 24 and applied to a timing pulse generating unit 26 containing a "0" pulse generator 130 and a "1" pulse generator 134. The output of the "0" pulse generator 130 is applied to the $Ztp_{32}$ conductor which is connected to the zero terminal of the $tp_{32}$ flip-flop 72, and also to one input of a two input C1 "or" gate 132, the output of which is the timing signal C1.

The "1" pulse generator output, which occurs once each word time is applied to the $Stp_{32}$ conductor which is connected to the set terminal of the $tp_{32}$ flip-flop 72, (shown in FIG. 1). It is also applied to the second input of the C1 "or" gate 132.

In operation, thirty-two "0" signals are derived from the timing channel 22 and produce timing pulses C1, as well as a zeroing signal for the $tp_{32}$ flip-flop 72. The thirty-third binary bit, a "1" signal from the timing channel 22, is separated by the timing pulse generating unit 26 and applied to the $Stp_{32}$ conductor. In the absence of an output from the "0" pulse generator 130, the output from the "1" pulse generator 134 provides a C1 pulse through the C1 "or" gate 132.

Obviously, the timing channel $T_r$ read head 24 is positioned so that the time interval during which the $tp_{32}$ flip-flop is in its "1" or set state, coincides with the presentation of the $t_{32}$ bits at the general storage read transducers.

The circuits for the A–I register are shown in FIG. 5*b*. Information read from the A–I channel 28 generates signals in the $A–I_r$ read head 32 which are applied to non-inverting amplifier 110 and an inverting amplifier 112 to generate signals L8 and L8', respectively. To record signals in the A–I channel, the L7 signals are applied to a clock "and" gate G121 and through a one-shot 120 and a non-inverting amplifier 122 to the write "1" terminal of the $A–I_w$ write head 30. L7' signals which place a "0" in the A–I channel, follow a correspondingly similar path through a clocked "and" gate G122, a one shot 124, and a noninverting amplifier 126 to the write "0" terminal of the $A–I_w$ head 30.

The general storage circuits are shown in FIGURE 5*c*, where it may be seen that signals generated in the $GS_{1r}$ head 38 from general storage track 34 are passed through gate G118 when the track selection signal F9 is high, whereas signals from $GS_{2r}$ head 40 belonging to general storage 2 track 36 are passed through gate G119 when F9 is low (F9'). From either G118 or G119, signals pass through "or" gate G120 to generate L12 and L12' by means of non-inverting amplifier 160 and inverting amplifier 162 respectively.

Signals intended to write "0's" on a general storage track, namely L10', are clocked through gate G110 and are processed by one-shot multivibrator 164 and non-inverting amplifier 166 and then passed either through gates G112 to the "0's" terminal of the $GS_{1w}$ write head 42 on track $GS_1$ (34), or through gate G115 to the "0's" terminal of the $GS_{2w}$ write head 44 on track $GS_2$ (36). The selection between these alternatives is determined by the presence of F9 or F9' respectively. Similarly, L11' signals intended to write "1's" on a general storage track are clocked through gate G111 and are shaped by one-shot multivibrator 168 and amplified by non-inverting amplifier 170 and then passed either through gate G113 to the "1's" terminal of $GS_{1w}$ write head 42 on track $GS_1$ (34) or through gate G116 to the "1's" terminal of $GS_{2w}$ write head 44 on track $GS_2$ (36).

The relay starting circuitry and logic is shown in greater detail in FIG. 5. Start button 172 is provided whose actuation may be seen to cause the locking in of relay R1 via the continuously active power supply 176 and locking contact 178. The actuation of Start button 172 also de-energizes relay R2 if it had been previously locked in, thereby permitting the normally closed contact 180 to complete the locking in path for R1. Due to contacts 182 and 184 the energization of either R1 or R2 supplies the line power 186 to the magnetic drum motor 21 and to the main computer power supply 188. The energization of supply 188 enables the logical gating network 50 to operate, while at the same time energizing the heater resistance 190 of thermal timer 177 through the normally closed contact 192 of relay R2. Contacts 194 and 196 signal to the logic system 50 the state of relays R1 and R2 respectively, so that the system passes from the state *R1.R2'* to the state *R1.R2'* when Start button 172 is actuated.

After a predetermined time interval, the bimetallic strip 198 under the heating of resistance 190 makes contact with point 200 thereby locking in relay R2 by means of coil 202 and holding contact 204. The system is now in state *R1.R2*. The heater 190 is now de-energized by contact 192 opening thereby allowing contacts 198–200 to open for any subsequent restarting. As before described, the state *R1.R2'* forces the A–I channel into a skip state by resetting the F1, F2, and F9 flip-flops and recording all "0's" in the A–I channel. When the thermal timer causes transition to the *R1.R2* state, the computer begins its search for the "0" flag bit index marker in $GS_1$. The successful location of this index and consequent transfer of the initial instruction word into the instruction portion of the A–I channel is then signalled by the condition F2 lasting for a certain period of time. This condition causes inverting amplifier 206 to energize coil 204 of R1 thereby opposing the relay magnetic flux supplied by coil 174, and causing relay R1 to drop out, thus generating state *R1'.R2* which corresponds to the COMPUTE state of the computer.

Although the computer of the present invention has been fully described in detail, for the benefit of those more familiar with the use of logical equations, the equations which have been mechanized in the above described circuits are set forth below without further comment.

It is well within the skill of the art, to rewrite the equations in slightly different form and further simplify the structure of a computer according to the present invention.

*Table 5*

(1) $SF1=F7A9A22(S10+F6)+F7'A9A23+F4A7A22tp_{32}'+A11A18$ (2) $ZF1=A8A9A21+F7A9A16A20+F4A14(F2+F3'+F6)+A3$

[FIG. 6*m*]

(3) $SF2=F8'tp_{32}'(A5+F2+F3+F4+F6)(L12+F6'+F7)(L2+A3+F4'+F5'+F6')(L12+F4+F6')+L12'A13R1R2+L2A14F5F6+A10A17+A7ZF2=(SF2)'$

[FIG. 6*a*]

(4) $SF3=L2F8'(F5'+F6+tp_{32})+(F1+F2')A6tp_{32}'+F4F7'A10A13+L12F7'A7+L2F8(F2'+F7+tp_{32})(tp_{32}'+F3)ZF3=(SF3)'$

[FIG. 6*b*]

(5) $L1=F3A10(F2+F4+F5+F6')+F7A1+F4'A17A22+L5F4A7+L5F6A9+F2F4'A8A10+(F2'+F7)A11+A6A12A15L1'=(L1)'$

[FIG. 6*n*]

(6) $L7'=L1'+R2'$
$L7=(L7')$

[FIG. 6*d*]

(7) $L5=F1A20+F1A22+F1'A21+F1'A23$

[FIG. 6*e*]

(8) $SF9=F4F9'A5A18$
(9) $ZF9=F4F9A5A18$

[FIG. 6*k*]

(10) $SF4=F3F4'A17(F2'+F7)$
(11) $ZF4=F3'A1+A2+A3$

[FIG. 6*o*]

(12) $SF5=F4A1(E10'+tp_{32}'+F3+F6)$
(13) $ZF5=F4'A1+A2$

[FIG. 6*f*]

(14) $SF6=F5A1$
(15) $ZF6=F5'A1+A2$

[FIG. 6*j*]

(16) $SF7=F6A1$
(17) $ZF7=F6'A1+A2(F4'+F5)+F1'A14A23$

[FIG. 6*i*]

(18) $SF8=A13$
(19) $ZF8=A14$

[FIG. 6*g*]

(20) Write "0" $=L10'=(L10)'$
(21) $L11=F4'A5A22$
Write "1" $L11=(L11)'$

[FIG. 6*c*]

(22) $S12=F1A6A15+R2'$
(23) $E1=A4A20$
(24) $E2=A4A21$
(25) $E4=A4A22$
(26) $E8=A4A23$
(27) $E16=F9A6A16$

[FIG. 6*p*]

(28) $E20=A6A16$

[FIG. 6*e*]

(29) $A1=(F8+A3)A18$
(30) $A2=F1'F8'A8A17+A6A16A23+A13$
(31) $A3=F1A8A9A17$
(32) $A4=L2A6A16$
(33) $A5=F6'A10A15$
(34) $A6=F4'F6'A9$
(35) $A7=F2F8(tp_{32}'+F7)$
(36) $A8=F7'A15$
(37) $A9=F5F8'$
(38) $A10=F5'F8'$
(39) $A11=(L2+F7')F6'A9A17$
(40) $A12=S1A20+S2A21+F1'S4A22+S8A23+S11A13$
(41) $A13=F8'tp_{32}$
(42) $A14=F8tp_{32}(F1+F3+F4+F5'+F6')$
(43) $A15=F6+F7$
(44) $A16=F6+F7'$
(45) $A17=F4+F8$
(46) $A18=F2'$
(47) $A20=F3'A18$
(48) $A21=F3A18$
(49) $A22=F2F3$
(50) $A23=F2F3'$

[FIG. 6*p*]

Heretofore there has been described one illustrative embodiment of the invention. Hereafter the programming of this computer is considered. Thus, by specific example, the advantageous operational employment of this illustrative structure may be more clear.

At starting it may be well to observe the epicyclic nature of this structure with particular regard to circulation of information in the major, general storage loop and in the associated minor data, instruction loop noted heretofore.

Mathematically, an epicycle may be the locus of a point on the surface of one cylinder as it rolls on the surface of another cylinder. If the circumference of the rolling cylinder, the minor cylinder, is not a submultiple of the circumference of the stationary, major cylinder, then a given point on the minor cylinder will coincide with a given point on the major cylinder only after the former has rolled about the latter more than once.

This geometric epicyclic relationship provides a convenient analogue for the relationships of the mathematical representations which characterize the circulation of information in the major and minor loops of the invention.

Thus, in the illustrative embodiment of the invention described, seventy-nine binary words are distributed about a track of the general storage drum. Two words, one an instruction word and the other a data word, are included in an associated minor loop in acordance with the invention.

Seventy-nine differs from the nearest integral multiples of two, seventy-eight and eighty, by a number, one, which is relatively prime with respect to both two and seventy-nine. That is, this difference number has no common prime factor with the number of words in the major and minor loops respectively. With the specific relations of the above discussed illustrative embodiment of the invention, it develops that each of two words in the minor loop is brought into operating relation with a specific word in the major loop once during each two complete circulation cycles of informatoin stored in the major loop.

For purposes of clarity a two inch circumference spool, having diametrically opposed indices, rolls about a seventy-nine inch wheel. After one complete revolution index ends of the diameter interchange with respect to the wheel. After two revolutions the index diameter assumes its original relation with respect to the wheel.

Thus on two successive revolutions of the spool about the wheel, opposite spool areas are brought into operative relation with the different wheel circumferential areas. Similar relationships obtain in the case of the geometric spool wheel analogue and the minor-major loop where other specific numerical relationships obtain among the loop word lengths so long as the number of words in the major loop, as noted above, stands in an above specified relationship with the number of words in the minor loop.

Now for consideration of programming of the illustrative computer in accordance with our invention in which these relationships obtain.

All programmed operations in our computer can be classified as being either terminal operations or non-terminal operations.

The terminal operations on the one hand fill the instruction part of the A–I channel with new information. Alternatively these terminal operations take away the function of the instruction part from one half of the A–I channel and give this function to the other part of the A–I channel. In either case these so classified operations terminate the sequence of the execution of the instructions in the A–I channel and start a new such sequence.

The following operations are terminal operations: Jump (J), Jump Conditional Successful (*Jc* with $K=1$), Change Track (CT), Jump Delay (*Jd*), and Leap (L).

The execution of a non-terminal operation is followed two word times later by the execution of the operation corresponding to the next instruction in the instruction part of the A–I channel. The non-terminal operations are Skip (SK), Transfer to General Storage (TS), Transfer to Accumulator (TA), Extract (E), Output (Out), Input (IN), Subtract (SUB), Add (ADD), Jump Conditional Unsuccessful (*Jc* with $K=0$), Clear (CL), Shift Right (SR), Add Conditional (ADD*c*), and Shift Left (SL).

Every non-terminal operation requires two word times for its execution, a "precess" word time to bring the instruction into the control shift register and an "execute" word time to actually execute the instruction.

The terminal operations require various periods of time, as follows:

Jump (J) and Jump Conditional Successful (*Jc* with $K=1$) require four word times, the first and third being "precess" times and the other two being "execute" times. The transfer of the new instruction word from a general storage channel to the instruction part of the A–I channel occurs during the third word time of a Jump (or Jump Conditional Successful).

Change Track (CT) and Jump Delay (*Jd*) require $2(D+K)+6$ word times, where D is the count (the relative address, the displacement address) in the instruction part of the A–I channel, and K is the binary number contained in the F1 flip-flop at the beginning of the Jump Delay or Change Track operation. The first of these $2(D+K)+6$ word times is a "precess" time and the last one is an "execute" time. The transfer of the new instruction word from a general storage channel to the instruction part of the A–I channel occurs during the $(2(D+K)+5)$th word time of the Jump Delay or Change Track operation. The Leap operation requires only one "precess" word time. The interchange of the functions of the two parts of the A–I channel occurs at the end of this "precess" time. The immediately following second "precess" time is counted as the first word time of the next operation.

To identify the sectors of a general storage channel it is necessary for a programmer to label them in some way. A convenient way of numbering the sectors in a general storage of our computer is as follows: An arbitrary sector is assigned number 1 (this is not necessarily the sector containing the initial instruction word). Then the alternate sectors are numbered in consecutive order in such a way that the numbers increase in the direction opposite to the direction of the circulation of the general storage channel. Looking at adjacent sectors the numbering is then: sector 1, sector 41, sector 2, sector 42, sector 3, sector 43, and so forth around the general storage channel. The sectors passing a transducer during alternate word times (these alternate word times are normally either all "precess" times or all "execute" times) are numbered consecutively.

In this discussion, it will be convenient to use the following well-known mathematical notation:

Two numbers are considered equal modulo 79, in symbols $$a \equiv b \pmod{79}$$

whenever their difference is zero or a multiple of 79.

The sum (difference, product) of any two numbers modulo 79 is a number which is contained in the interval (1, 79) and is equal modulo 79 to the conventional sum (difference, product).

For example, $$60 \neq 40 = 21 \pmod{79}$$

Duirng the operation of our computer, the number of a general storage sector under a transducer is increased each word time by 40 (modulo 79). In two word times, the sector number is increased by $40 \neq 40 = 1$ (modulo 79) In three word times, the sector number is increased by $40 \neq 40 + 40 = 41$ (modulo 79), and so on. Since the distance between the reading and writing transducers is 6 sectors, the difference between the number $r$ of the sector under the reading transducer and the number $w$ of the sector under the writing transducer is, at any moment of time $$r - w = 6 \cdot 40 = 3 \text{ (modulo 79)}$$

It must be observed that an instruction word can be transferred from a general storage channel into the instruction part of the A–I channel by means of any of the following operations:

(1) Fill (during initial warm-up sequence).
(2) Jump.
(3) Jump Conditional with $K=1$.
(4) Change Track.
(5) Jump Delay.
(6) Transfer to Accumulator followed by a Leap.

In the first 5 of these 6 cases the "execute" word time (or the first "execute" time) of the operation corresponding to the first instruction in the new instruction word occurs exactly 3 word times after the transfer of this word into the A–I channel. If the new instruction was transferred from sector $n$ of a general storage channel, then the number of the sector which is under the reading transducer 3 word times later is $n+41$ (mod 79). Thus, if, for example, the first instruction in the new instruction word is a "transfer to accumulator" (TA), the number will be transferred from the general storage sector having number $n+41$ (mod 79). It may be said that the implied address of this particular TA instruction is $n+41$ (mod 79).

In a similar manner, the expressions for the implied addresses of all operations involving general storage can be derived. They are listed in Table 7, in which the following notation is used:

$n$ is the sector number of the sector in a general storage channel from which the current instruction word has been transferred into the A–I channel;

$t$ is the position of the instruction in the instruction word ($t=1$ for the first instruction, $t=2$ for the third instruction, etc.);

$d$ is the delay count (the number following a Change Track or a Jump Delay instruction in the instruction word);

K is the binary number contained in F1 flip-flop at the beginning of a Change Track or a Jump Delay operation.

S is the number of Skip instructions occurring between the TA instruction which has transferred the current instruction word from a general storage channel into the accumulator part of the A–I channel and the Leap instruction which has turned the accumulator part of the A–I channel into the instruction part; in the case, the Leap follows the TA immediately, $S=0$.

*Table 7*

A. IMPLIED ADDRESSES OF THE INSTRUCTIONS IN AN INSTRUCTION WORD INTRODUCED BY MEANS OF FILL, JUMP, JUMP CONDITIONAL, CHANGE TRACK, OR JUMP DELAY

| Instruction | Implied Address |
|---|---|
| Extract (E) | |
| Transfer to Accumulator (TA) | $n+t+40$ (mod 79) |
| Add (ADD) | $n+t+40$ (mod 79) |
| Subtract (SUB) | $n+t+40$ (mod 79) |
| Add Conditional (ADDc) | $n+t+40$ (mod 79) |
| Transfer to Storage (TS) | $n+t+37$ (mod 79) |
| Jump (J) | $n+t+1$ (mod 79) |
| Jump Conditional (Jc) | $n+t+1$ (mod 79) |
| Automatic Jump | $n+10$ (mod 79) |
| Jump Delay (Jd) | $n+t+d+K+2$ (mod 79) |
| Change Track (CT) | $n+t+d+K+2$ (mod 79) |

B. IMPLIED ADDRESSES OF THE INSTRUCTIONS IN AN INSTRUCTION WORD INTRODUCED BY MEANS OF A TRANSFER TO ACCUMULATOR FOLLOWED BY A LEAP, OR BY ONE OR MORE SKIPS FOLLOWED BY A LEAP

| Instruction | Implied Address |
|---|---|
| Extract (E) | |
| Transfer to Accumulator (TA) | $n+t+s+40$ (mod 79) |
| Add (ADD) | $n+t+s+40$ (mod 79) |
| Subtract (SUB) | $n+t+s+40$ (mod 79) |
| Add Conditional (ADDc) | $n+t+s+40$ (mod 79) |
| Transfer to Storage (TS) | $n+t+s+37$ (mod 79) |
| Jump (J) | $n+t+s+1$ (mod 79) |
| Jump Conditional (Jc) | $n+t+s+1$ (mod 79) |

In the present embodiment of our invention, a program for the operation of the computer has to be contained in the general storage channels before the operation of the computer is started. The description of means for preloading the program into the general storage is, however, outside of the scope of these specifications.

It is well known in the art that a general purpose digital computer can, if provided with an appropriate program, simulate the behavior of another computer of a different structure. As an example, a portion of a program for the simulation of a simple printing calculator is shown in Table 8 and illustrated by the flow-charts in FIGURES 7*a* and 7*b*.

In operation of this program, decimal numbers are entered by means of the 10 numeric keys of the input keyboard and converted within the computer to binary numbers. Such operations as addition, subtraction, print-out, etc., are initiated by the 6 non-numeric keys of the input keyboard.

Table 8 shows the contents of the general storage sectors which participate in the operation of the illustrated portion of the program. The sectors containing variable information are designated with reference names.

*Table 8*

GS1

| Sector No. | Information | | | | | | | | Flag Bit |
|---|---|---|---|---|---|---|---|---|---|
| 1 | 1001 | 0000 | 0000 | 0000 | 0000 | 0000 | 1100 | 0011 | 0 |
| 31 | 0100 | 1010 | 1011 | 0000 | 0000 | 0000 | 0100 | 1010 | 1 |
| 32 | 0000 | 0000 | 0000 | 0000 | 0000 | 0000 | 0000 | 1011 | 1 |
| 34 | 1001 | 0000 | 0000 | 0000 | 0000 | 0000 | 0011 | 1001 | 1 |
| 69 | 0000 | 0010 | 0100 | 0000 | 1010 | 1011 | 0100 | 0111 | 1 |
| 75 | 1001 | 0000 | 0000 | 0000 | 0000 | 0000 | 0101 | 1010 | 1 |

GS2

| Sector No. | Information | | | | | | | | Flag Bit |
|---|---|---|---|---|---|---|---|---|---|
| 6 | 0000 | 0000 | 0000 | 0010 | 1011 | 0000 | 0000 | 1000 | 1 |
| 7 | 0101 | 1010 | 1011 | 0000 | 0000 | 0000 | 0100 | 1010 | 1 |
| 8 | 0010 | 0110 | 1010 | 0001 | 0000 | 0000 | 0000 | 0000 | 1 |
| 10 | 1111 | 0001 | 1010 | 1011 | 0000 | 0000 | 0000 | 1111 | 1 |
| 11 | 0010 | 0100 | 1000 | 0100 | 1010 | 1011 | 0100 | 0111 | 1 |
| 12 | 1011 | 0000 | 0000 | 0001 | 0000 | 0000 | 0100 | 0110 | 1 |
| 14 | 0000 | 0111 | 0000 | 0001 | 1011 | 0000 | 0010 | 0010 | 1 |
| 15 | 0000 | 0000 | 0000 | 0000 | 0010 | 1111 | 0000 | 0001 | 1 |
| 17 | 0000 | 0000 | 0000 | 0010 | 0001 | 1100 | 0001 | 0000 | 1 |
| 18 | 0010 | 0000 | 0111 | 0000 | 0000 | 0001 | 0000 | 0000 | 1 |
| 20 | 0111 | 0000 | 1010 | 0001 | 0000 | 0000 | 1000 | 0000 | 1 |
| 21 | 0001 | 1011 | 0000 | 0100 | 0100 | 0000 | 0011 | 1101 | 1 |
| 22 | 1100 | 0001 | 1011 | 0100 | 0100 | 0000 | 0011 | 1001 | 1 |
| 24 | 0000 | 0000 | 0000 | 0000 | 0000 | 0100 | 0000 | 1000 | 1 |
| 26 | 1111 | 1111 | 0100 | 1010 | 1011 | 0000 | 0100 | 0010 | 1 |
| 27 | 1011 | 0000 | 0000 | 0000 | 0000 | 0000 | 0011 | 0111 | 1 |
| 28 | 1111 | 1010 | 1111 | 1010 | 0010 | 0011 | 0100 | 0000 | 1 |
| 31 | 1000 | 0100 | 0000 | 0000 | 0000 | 0100 | 0000 | 0000 | 1 |
| 33 | 0010 | 0100 | 1010 | 1011 | 0000 | 0000 | 0100 | 1001 | 1 |
| 49 | Variable (Register D) | | | | | | | | 1 |
| 50 | 0000 | 0000 | 0000 | 0000 | 0000 | 0000 | 0000 | 0001 | 1 |
| 52 | 0000 | 0000 | 0000 | 0000 | 0000 | 0000 | 0000 | 1001 | 1 |
| 55 | Variable (Generated Instruction Word) | | | | | | | | 1 |
| 56 | 1001 | 0000 | 0000 | 0000 | 0000 | 0000 | 0000 | 0000 | 1 |
| 59 | Variable (Register M) | | | | | | | | 1 |
| 61 | Variable (Register F) | | | | | | | | 1 |
| 73 | 0000 | 0000 | 1000 | 0000 | 0000 | 0000 | 0000 | 0000 | 1 |
| 74 | 0000 | 0000 | 0000 | 0000 | 0000 | 0000 | 0000 | 0010 | 1 |
| 77 | 0000 | 0000 | 0000 | 0000 | 0000 | 0000 | 0000 | 0000 | 1 |

The function of the part of the program used for this illustration, is to multiply a number in the register M by a number entered through the keyboard and to store the product in the register F. An overflow symbol is printed if the product exceeds a certain value. The keyboard factor is entered in the decimal form, the other factor and the product are in the binary form. If the second factor happens to be "1," the product, which is in the binary form, equals the first factor, which is in the decimal form. Thus, this part of the program can operate either as a multiplication routine or as a decimal-to-binary conversion routine.

The procedural steps followed by the computer are outlined generally in FIG. 7*a*, and, in FIG. 7*b*, the instructions which, when executed, accomplish these operations are set out in the same outline form.

Each block in FIG. 7*a* represents a step in the computational procedure requiring several instructions for its implementation.

An *initial step* 302, which is the first step executed after the machine has been started, clears the product register F. A pre-input step 304 enters a "1" into the multiplicand register M. The computer now enters into a multiplication loop consisting of the steps 306, 308, 310, 312, 314, 316, 318. As already explained, the multiplication loop acts as a decimal-to-binary input conversion routine whenever the multiplier register M has been loaded with number "1."

The first step in the multiplication loop is an input step 306 which examines the input keyboard. If no key has been pressed by the operator, step 306 is repeated. If a key has been pressed, it is released, the corresponding code enters into the computer accumulator, and the program proceeds to an entry step 308. The entry step 308 transfers the entered code from the accumulator into register D and examines this code to determine whether it represents a numeric or a non-numeric key. In the case of a non-numeric key, the program branches out of the multiplication loop to an examination step 320, which selects one of six possible subroutines, corresponding to the value of the input code. Only one of these subroutines is shown, starting with a carriage return step 322.

In the case the input code represents a numeric key, the program remains in the multiplication loop and proceeds from the step 308 to a print step 310, in which the input digit contained in the register D is printed. A decade step 312 multiplies the contents of the product register F by 10 and leaves the result in the register F.

The program now proceeds to a subloop consisting of steps 314, 316, 318. An inspection step 314 inspects the register F for overflow. If the partial product in that register exceeds 30 binary digits, the program branches out to a subroutine for printing an overflow symbol. Although the register capacity is 32 binary digits, an upper limit of 30 binary digits has been selected to satisfy the requirements imposed by the other parts of the program which are not shown here. A count down step 316 subtracts 1 from the register D and checks it for a sign change. When D becomes negative the program leaves the subloop and goes back to the input step 306, which will process the next keyboard entry. The program cycles through the subloop as many times as there are units in the input digit D. In each cycle, an accumulate step 318 adds the contents of the multiplicand register M to the product register F. Thus when the program leaves the subloop, it has added D times the multiplicand M to the product F.

When the operator enters the next digits the process is repeated, until there is a product overflow, or the operator presses a non-numeric key. The register F contains then a product of the input number with the number in the register M. If the register M contains a 1, then the register F contains simply a binary equivalent of the input number.

Assume now that the operator intends to multiply the number in the register F (however obtained) by another input number. When the "multiply" key is depressed the program proceeds, as already described, through the steps 306, 308, 320, and selects a carriage return step 322 on the basis of the multiply code obtained from the keyboard. This step produces an output code which initiates a carriage return on the printer. Next, is a symbol printing step 324, in which a symbol signifying multiplication is printed out. A transfer step 326, transfers the number in the register F into the multiplicand register M, and in a clear step 328, the register F is cleared. This completes the set-up for the multiplication, and the program proceeds to the input step 306, which starts the multiplication loop.

All computer instructions necessary to implement the steps of the flow-chart of FIG. 7*a*, with the exception of Skip instructions, are shown in FIG. 7*b*. Each instruction is represented by its mnemonic designations. The numbers following the mnemonic designations of some instructions are their implied addresses indicating in each case the sector of a general storage channel on which the instruction operates. The larger boxes in FIG. 7*b* correspond to the steps shown in FIG. 7*a* and are numbered in the same way. The smaller boxes contained within the larger boxes represent the general storage sectors containing the stored program. The location of the instructions in the general storage is indicated at the upper left hand corner of each smaller box. The solid smaller boxes and the encircled numbers identify the sectors of the general storage channel 1; the dotted boxes and the numbers enclosed in rectangles identifying the sectors of the general storage channel 2. The implied addresses of all instructions but the Change Track (CT) instructions refer to the same general storage channel as the channel in which the instruction is stored. The implied addresses of Change Track instructions refer in each case to the other general storage channel.

All implied addresses shown in FIG. 7*b* have been computed according to the formulae given above. A legend $K=0$ or $K=1$ which accompanies every J*d* or CT instruction shows the value of the digit stored by the F1 flip-flop before the corresponding Jump Delay or Change Track operation. This value is necessary for the computation of the implied address. The value of K is also shown opposite the symbol for the Leap (L) instruction (which has the same code as the Extract instruction, but is distinguished by the value of K).

The initial instruction word in sector 1 of the general storage channel 1 contains a Change Track (CT, code 1001) instruction. It must be noted that in the present embodiment of our invention the fill operation transferring the initial instruction word into the A–I channel does not generate a "1" in the flag bit position of this word. Therefore, the function ascribed in the description of the Change Track operation to the instruction word flag bit is performed in the initial instruction word by the "1" bit occupying originally the $t_1$ position. Thus, this bit is not a part of the count delay number. The count delay number in the initial instruction word is, therefore, 1100001 in binary notation (Table 8) which corresponds to 97 in decimal notation. At the start of this initial Change Track instruction, $K=0$ since the F1 flip-flop is reset in the warm-up procedure. The implied address of the initial Change Track instruction is $$n+t+K+d+2 \pmod{79}$$
$$=1+1+0+97+2 \pmod{79}$$
$$=101-79=22$$

A delay count number 18 would have produced the same implied address as the delay count number 97. The long delay in the initial word is necessary for the production of the signal which drops out the start relay.

Another delay which is longer than necessary to produce the desired implied address occurs in sector 75 of the general storage channel 1. This delay has been necessitated by certain limitations of the printing device connected to the first embodiment of our invention.

Most of the program steps shown in FIG. 7*b* require no further explanation.

The Input (IN) operation in the step 306 enters into the accumulator part of the A–I channel a combination of binary digits corresponding to the key pressed by the operator. If no key has been pressed, the Input is unsuccessful and the F1 flip-flop is reset to zero which causes the computer to turn the following Jump Conditional (J*c*) operation into a Skip. The next operation is a Jump Delay (J*d*) with a delay number 1001010 in binary notation (Table 8) and with an implied address 7. This Jump Delay brings again the word in sector 7 of the general storage channel 2 into the instruction part of the A–I channel. The step 306 is repeated in this way until the operator presses a key. Then, the successful Input operation sets the F1 flip-flop to "1" which causes the following Jump Conditional (J*c*) operation to bring an instruction word from sector 10 of general storage channel 2 into the A–I register. The shift left (SL) operation in this word relocates the input code into the $t_1$, $t_2$, $t_3$, $t_4$ positions of the accumulator part of the A–I channel and transfers the bit which identifies the numeric and non-numeric input keys from the $t_{32}$ position of the accumulator part of the A–I channel into the F1 flip-flop. After a Transfer to Storage (TS) operation there follows a Jump Conditional (J*c*) operation which is skipped in the case of a numeric input, but causes the computer to jump to the step 320 in the case of non-numeric input.

In the step 320, a constant consisting of a Change Track code 1001 and a string of zeros is added to the input code in the accumulator and the result is recorded in sector 55 of the general storage channel 2. Then, a Jump Delay (J*d*) is made to this sector, containing a Change Track (CT) instruction the implied address of which depends on the non-numeric input key which has been operated. In particular, the code 1011 corresponding to the "multiply" key, produces at this stage the implied address 69, which is the location of the general storage sector starting the multiply routine.

An output (OUT) operation (step 322) can be successful only after the printer has completed the printing of the previous character. As long as the printer is busy the step 322 is repeated in a manner similar to the repetition of an input step.

As already mentioned, the step 312 in the multiplication loop multiplies by 10 the contents of the register F (represented by sector 61 of the general storage channel 2). The number is first transferred (TA) to the accumulator, doubled (SL) and the two-multiple is recorded (TS) in the register F. The number in the accumulator is then doubled twice (SL, SL), and to the eight-multiple thus obtained the two-multiple from the register F is added (ADD). The resultant ten-multiple is finally recorded (TS) in the register F. An overflow over $2^{32}$ during shift left or an Add operation set the F1 flip-flop. The two Jump Conditional (*Jc*) instructions in the step 312 branch the program to the routine for printing an overflow symbol. In case, there is no overflow over $2^{32}$, the program proceeds to the step 314, the purpose of which is to test for overflow over $2^{30}$.

The printing of the overflow symbol is performed by the instruction word in sector 33 of the general storage channel 2. The Jump Conditional (*Jc*) instructions in the step 312 are so located that they cannot have the implied address 33. Therefore, it has been necessary to introduce the instruction words in sectors 24 and 31 serving no purpose but being a jumping step to the sector 33.

Reference is hereby made to an article by S. P. Frankel, entitled "On the Minimum Logical Complexity Required for a General Purpose Computer," appearing in IRE Transactions on Electronic Computers, vol. EC–7, No. 4, page 82, December 1958.

What is claimed is:

1. In a digital computer, the combination comprising: a register for storing bivalued signals arranged in a plurality of alternate groups, the first group of said plurality representing an accumulator number and the second group of said plurality representing instructions, said second group being further arranged in a plurality of sub groups of signals, at least one sub group of said last named plurality representing an instruction corresponding to an operation to be performed upon information in said computer; means for circulating and serially presenting signals stored in said register; operating means connected to said circulating means and operable in response to a first sub group of signals representing an instruction to perform a corresponding operation upon information in said computer and, in each subsequent cycle of operation, being operable in response to another signal of said sub groups for performing an operation corresponding thereto, each cycle requiring only the time necessary for reading the signals of one each of said first and second groups.

2. In a digital computer, the combination comprising: a cyclically operable recirculating register for storing and serially presenting bivalued signals arranged in at least two groups, alternately recorded first group representing an accumulator number and the second group representing instructions, said second group being further arranged in a plurality of sub groups of signals, at least one among said plurality of sub groups representing an instruction corresponding to an operation to be performed upon information in said computer; signal processing means connected to said recirculating register and operable in response to a first sub group of signals representing an instruction to perform the corresponding operation upon said accumulator number; storage means for storing a plurality of groups of signals representing instructions; and signal transfer means connected to said storage means, said register, and said signal processing means, said transfer means being operable in response to predetermined ones of said sub groups for transferring a new group of signals into said circulating register to replace said second group of signals.

3. In a digital computer, the combination comprising: a cyclically operable recirculating register for storing and serially presenting bivalued signals arranged in at least two groups, a first of said groups representing an accumulator number and a second of said groups representing a series of instructions, said second group being further arranged in a plurality of sub groups of signals, each sub group representing an instruction and each instruction corresponding to an operation to be performed upon information in said computer; staticizing means connected to said circulating register for sequentially isolating one of said sub groups during each cycle of operation; processing means connected to said recirculating register and said staticizing means and operable in response to the isolated sub group of signals representing an instruction for performing a corresponding operation upon information in said computer to produce and store in said register a resultant number, said combination being operable in response to a next isolated sub group in the next subsequent cycle of operation for performing the corresponding operation upon said resultant number.

4. In a digital computer the combination comprising: a cyclically operable circulating memory device for storing and serially presenting bivalued signals representing information, said memory device including reading means for extracting stored information signals and writing means for storing information signals, said memory device storing and serially presenting accumulator number representing signals during one portion of each cycle, storing and serially presenting instruction representing signals during another portion of each cycle, said instruction signals being arranged in a plurality of alternate groups, at least one of said instruction signal groups corresponding to an operation to be performed upon information in said computer; timing means connected to said circulating memory to provide a first signal during the said one portion of each cycle and to provide a second signal during said other portion of each cycle; staticizing means connected to said memory device and said timing means and operable during said one portion of each memory device cycle for isolating a single instruction signal group and storing the remaining signal groups in said memory device; logical operating means connected to said memory device, said timing means and said staticizing means and operable during said other portion of a memory device cycle for operating upon said information stored in said computer in accordance with the instruction signal group isolated in said staticizing means to produce and store in the memory device, resultant signals representing the operated-upon information, and, said staticizing means sequentially isolating the remaining instruction signal groups in subsequent cycles and said logical operating means being responsive, in each cycle to the isolated instruction signal group to produce and store new resultant signals.

5. In a digital computer including a general memory store the combination comprising: a cyclically operable circulating memory device for storing and serially presenting bivalued signals representing information, said memory device storing and serially representing signals representing an accumulator number in the second half of each memory device cycle and storing and serially presenting signals representing instructions during the first half of each cycle, said instructions being arranged in a plurality of groups, at least one of said instruction representing signal groups corresponding to an operation to be performed upon information in said computer; staticizing means connected to said memory device and operable during said first half of each cycle for isolating a single instruction signal group and storing the remaining groups in said memory device with an additional predetermined signal group replacing the isolated instruction signal group; logical operating means connected to the general memory store, said memory device, and said staticizing means and operable in response to a predetermined instruction signal group isolated in said staticizing means for transferring signals between said general memory store and said memory device during a succeeding one of said half cycles.

6. In a digital computer operable in major cycles of two minor cycles each, the combination comprising: a cyclically operable circulating memory device for serially presenting bivalued signals representing during a first minor cycle, a series of instructions respectively corresponding to a series of operations to be performed upon information in said computer, said signals representing, during a second alternate minor cycle, information to be operated upon; first means connected to said memory device for staticizing signals representing a single one of said series of instructions during said first minor cycle and for holding said signals during said second minor cycle; second means, connected to said memory device and said first means, being operable during said first minor cycle for storing signals representing the others of said series of instructions in said memory device, and for storing a predetermined signal combination replacing the signals held in said first means, said second means being operable during said second minor cycle, in response to signals held in said first means, for performing an operation corresponding thereto to produce output signals representing a resultant number, said second means further including means operable during said second minor cycle to store said output signals in said memory device to replace the aforementioned information upon which a series of operations are to be performed, said combination being operable during subsequent major cycles to isolate sequentially signals representing each of the instructions during first minor cycles, to replace said isolated signals with predetermined signal combinations and to produce resultant numbers during second minor cycles; storage means for storing a plurality of bivalued signals representing other numbers and other instructions; and signal transfer means connected to said memory device, said staticizing means, and said storage means, said signal transfer means being operable in response to specified instruction signal combinations for transferring signals from said storage means to said memory device during one of said minor cycles to furnish signals representing a new set of information signals.

7. In combination: a first cyclical memory device for recirculating bivalued signals representing two binary words stored thereon, each of the said binary words having $(nm+1)$ binary digits, $n$ and $m$ being whole integers; one of said binary words representing a number, and the other of said binary words including a first valued digit and "$n$" instructions, each having "$m$" binary digits, said first memory device including write means for recording binary numbers in said first device, read means for reading recorded numbers, and apparatus for coupling said read means to said write means; a stepping register having "$m$" stages; a second cyclical memory device synchronously connected to said first device for recirculating a plurality of binary numbers thereon; a third cyclical memory device synchronously connected to said first and second devices for producing periodic mark signals at $(nm+1)$ digit intervals; fourth means connecting said first device to said stepping register and responsive to alternate mark signals for stepping said other binary word numbers representing instructions through said stepping register and for holding an "$m$" digit instruction in said stepping register and including instruction responsive means for operating upon said binary word representing a number in accordance with the instruction stored in said register, said fourth means storing a different instruction in each of "$n$" cycles, said stepping register being operable in the "$n+1$" cycle to store said first valued digit of said other binary word, said fourth means being operable in response to a predetermined combination of said first valued signal and $(m-1)$ binary digits in said stepping register to transfer a new binary instruction word from said second device to said first device, thereby providing a new series of "$n$" instructions for operating upon said binary number word.

8. In a digital computer operable upon bivalued signals representing numbers in response to combinations of bivalued signals representing instructions, the combination comprising: two epicyclic memory devices comprising a first recirculating memory device including write means for storing and read means for serially presenting $2(mn+1)$ bivalued signals representing two information words, "$m$" and "$n$" being integers, $(mn+1)$ of said signals representing a number word and $(mn+1)$ of said signals representing an instruction word, said instruction word comprising a flag signal representing the first low order bit and "$n$" combinations of "$m$" signals corresponding respectively to "$n$" instructions to be performed upon said number word; staticizing means having "$m$" stages for holding "$m$" signals corresponding to a single instruction; switching means connecting said first memory device and said staticizing means for interposing said staticizing means between said read means and said write means to temporarily store an instruction signal combination during the circulating of each instruction word; a second recirculating memory device including write means for storing and read means for serially presenting $p(mn+1)$ bivalued signals representing "$p$" information words including number words and instruction words, "$p$" being an integer; operating means connected to said staticizing means and said first and second storage devices and operable in response to each instruction signal combination isolated in said staticizing means for performing the corresponding operation upon signals concurrently presented by said first and second storage devices to produce resultant output signals for storage therein.

9. The apparatus of claim 8 including means for clearing said staticizing means after execution of each instruction to insert "$m$" predetermined signals in said first memory device following said signals representing a resultant number word, whereby said signals of said instruction word are precessed by "$m$" signals in each recirculation of said first device, to sequentially isolate in said staticizing means each of said "$n$" instructions in successive cycles of said first device.

10. Apparatus of claim 9 wherein said operating means includes means responsive to the signal combination of said flag signal, and $(mn-1)$ first valued signals stored in said staticizing means for applying the succeeding $(mn+1)$ signals representing said number word from said first device read means to said first device write means for recirculating said number word in said first device, and for applying $(mn+1)$ signals from said second memory device to said first device write means for storing a new instruction word in said first device.

11. Apparatus of claim 8 wherein said operating means includes signal transfer means responsive to a predetermined signal combination in said staticizing means for applying signals representing said number word from said first device read means to said second device write means whereby said number word is stored in said second device.

12. Apparatus of claim 8 wherein said operating means includes adding means operable in response to a predetermined signal combination in said staticizing means for combining signals simultaneously appearing at said first and second device read means to produce and apply to said first device write means for storage in said first device, sum signals representing the arithmetic sum of the number word in said first device and the number represented by the signals contemporaneously presented by said second device read means.

13. Apparatus of claim 8 wherein said operating means includes subtracting means operable in response to a predetermined signal combination in said staticizing means for combining signals simultaneously appearing at said first and second device read means to produce and apply to said first device write means for storage in said first device, difference signals representing the arithmetic difference of the number word in said first device and the number represented by the signals contemporaneously presented by said second device read means.

14. Apparatus of claim 8 wherein said operating means includes shift and add means operable in response to a predetermined signal combination in said staticizing means for combining signals simultaneously appearing at said first and second device read means to produce and apply to said first device write means for storage in said first device, logical product signals representing the logical product of the number word in said first device and the number represented by the signals contemporaneously presented by said second device read means.

15. Apparatus of claim 8 wherein said operating means includes signal transfer means responsive to a predetermined signal combination in said staticizing means for applying signals representing said number word from said second device read means to said first device write means whereby a new number word is stored in said first device.

16. Apparatus of claim 8 further comprising entry means for applying new input signal combinations on a plurality of separate conductors to the first memory device write means, said operating means including means connected to said entry means operable in response to predetermined signal combinations in said staticizing means for sequentially connecting each of said conductors to said first device write means for storing an applied new signal combination in place of said number word.

17. Apparatus of claim 8 further comprising read out means for supplying output signal combinations on a plurality of separate conductors, said operating means including means connected to said read out means operable in response to predetermined signal combinations in said staticizing means for sequentially connecting each of said conductors to said first device read means for producing an output signal on each of said conductors in a signal combination corresponding to a portion of said number word.

18. The apparatus of claim 8 wherein said first device read means includes an access point represented by an anticipating register for reading signals at an earlier time than at said first device write means and means operable in response to predetermined signal combinations for connecting said first device write means to said access point to store signals representing a mathematical function of said number word.

19. The apparatus of claim 18 in which the mathematical function of said number word is division by a factor of "2."

20. Apparatus of claim 8 wherein said operating means includes adding means having an addend and an augend input, said adding means being operable in response to predetermined signal combination in said staticizing means for combining signals simultaneously presented to said addend and augend inputs to produce and apply to said first device write means for storage in said first device, sum signals representing the arithmetic sum of number representing signals applied to said addend and augend inputs, and means coupling said first device read means to both addend and augend inputs for producing signals representing the number word multiplied by a factor of "2."

21. Apparatus of claim 8 including means responsive to predetermined combinations of instruction signals for entering into said first device write means only signals representing binary "0" in place of a number word.

22. Apparatus of claim 8 including means responsive to predetermined combinations of instruction signals for applying the output of said first device write means to said first device read means for recirculating said number word.

23. Apparatus of claim 8 including a static storage device for storing a single signal produced in a prior cycle of said first device and means responsive to predetermined instruction signal combinations and said static storage device signals for selecting one of two modes of execution of said predetermined instruction signal combinations.

24. Apparatus of claim 23 including means operable in response to a first predetermined instruction signal combination and a first signal in said static storage means for modifying the contents of said staticizing means to represent a second predetermined instruction signal combination, and operable in response to a second signal in said static storage device for modifying the contents of said staticizing means to represent a third instruction signal combination, and means responsive to said third instruction signal combination for combining number representing signals from said first and second devices to form signals representing their sum.

25. Computer apparatus comprising a first uninterruptedly circulating information path for at least momentarily storing a first number of information groups of like length, a second uninterruptedly circulating information path for storing at least momentarily a second number of information groups of the same like length, said second number differing from a nearest integral multiple of said first number by a third number, said third number being relatively prime to said first number and to said second number, and means for bringing successively stored information groups from said first and second paths, respectively, into operatively combining relation.

26. Apparatus as set forth in claim 25 wherein said last named information bringing means comprises means for bringing consecutively stored information groups in said first and second circulating paths, respectively, into operatively combining relation.

27. Apparatus as set forth in claim 25 wherein said last named means comprises counting control means synchronized with groups in said first path for defining said combining relation.

28. Apparatus as set forth in claim 27 wherein said control means comprises means for transposing combining relations associated with consecutive groups stored in said first information circulating path.

29. Computer apparatus for processing digit signals comprising a first circulating path for storing, at least momentarily, a first plurality of information signal groups, each of said groups comprising a second plurality of signal subgroups and at least one indicating digit signal, a second circulating path for storing at least momentarily an information signal corresponding in length to one of said groups, a control register having a storage capacity for at least one of said subgroups, means for repetitively and sequentially transferring signal subgroups from said second circulating path to said control register and for shifting digits remaining in said second circulating path in correspondence with the transfer of signal subgroups, signal handling means, and means, responsive to a transfer of selected combinations of digit signals from said second path to said control register, for initiating an interchange of at least one information signal group between said first circulating path and said signal handling means.

30. In a computer, the combination comprising epicyclically synchronized memory loops including a first circulating memory loop having storage for an odd number of fixed length words, a reading station associated with said first loop for reading signal information therefrom, a writing station associated with said first loop for recording signal information thereon, a second circulating memory loop at least two words long synchronized with said first loop, a writing station associated with said second loop for recording signal information thereon, a reading station for said second loop located downstream from said writing station by less than two word lengths for reading signal information therefrom, first clock means synchronized with the said first loop for signalling the bit time of binary words in said first loop, second clock means synchronized with the said first loop for signalling the last bit time of each of the first loop words, third clock means associated with the first loop for designating the first bit time of said first loop words, input signal means operatively connected to the said second memory loop whereby input signals may be recorded in the second loop, an output register operatively connected to the read station of the second loop whereby signals from the second loop may be directed to the output register for recognition and use, a one bit word counter operatively associated with the second clock means for counting the signals from said second clock means thereby alternately to define a first period of time designated as the precess time and a second period of time designated as the execute time, a bit counter operatively connected with the said input signal means, the second memory loop and the output register, an add-subtract unit having at least two inputs and an output and operatively connected with the read and write stations of the first and second memory loops whereby numeral representing signals are added and subtracted and utilized to perform the functions of displacement addressing and a shift to the left, carry-borrow binary one bit memory means associated with the add-subtract unit and interconnecting the first loop read station with the second loop write station whereby a change of state in the carry-borrow means will cause bits to pass from the reading head of the said first loop into the writing head of said second loop, during precess time, so as to be recorded in the second loop, an order shift register interconnected between the read and write heads of the second loop for holding and precessing order signals, an anticipating shift register also between the reading and writing heads of said second loop and placed prior to the order shift register in signal time so that the anticipating shift register may foresee computer conditions to thereby control the shift of signals from the anticipating shift register, and a flag bit memory flip-flop associated with the said second loop for registering the passage of a significant bit through a reference point in said second loop.

31. In a computer, the combination comprising epicylically synchronized memory loops including a first circulating memory loop having storage for an odd number of fixed length words, a reading station for said first loop, a writing station for said loop, a second circulating memory loop at least two words long synchronized with said first loop, a writing station for said second loop, a reading station for said second loop located downstream from said writing station, clock means, a one bit word counter for counting the signals from said clock means thereby alternately to define a first period of time designated as the precess time for shifting instruction signals and a second period of time designated as the execute time for executing the proper instruction signals, an order shift register for holding and precessing orders, an anticipating shift register between the reading and writing heads of said second loop, and a logical gating network comprising skip means for regenerating second loop signals during both precess and execute times including gates to pass bits read by the reading head of said second loop through said anticipating shift register and subsequently through said order shift register and into the said writing head of said second loop during the precess state of said word counter, and to pass bits read by the reading head of said second loop through the said anticipating shift register and into the writing head of said second loop during the execute state of said word counter.

32. In a computer, the combination comprising epicyclically synchronized memory loops including a first circulating memory loop having storage for an odd number of fixed length words, a reading station for said first loop, a writing station for said loop, clock means for said loop, a second circulating memory loop two words long synchronized with said first loop, a writing station for said second loop, a reading station for said second loop located downstream from said writing station, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network comprising means for transferring to said first loop, said last named means comprising gates to pass bits read by the reading head of said second loop through said anticipating shift register and subsequently through said order shift register and into the writing head of said second loop during the precess state of said word counter, and to pass the bits read by the reading head of said second loop through said anticipatory register and into the writing head of said first named loop during the execute state of said word counter.

33. In a computer, the combination comprising epicyclic memory loops including a first circulating memory loop having storage for an odd number of fixed length words, a reading station for said first loop, a writing station for said loop, a second circulating memory loop two words long synchronized with said first loop, a writing station for said second loop, a reading station for said second loop located downstream from said writing station, clock means, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network including transfer to accumulator means having gates to pass bits read by the reading head of said second loop through said anticipating shift register and subsequently through said order shift register and into the said writing head of said second loop during the precess state of said word counter, and to pass bits read by the reading head of said first loop into the writing head of said second loop during the execute state of said word counter.

34. In a computer, the combination comprising epicyclic memory loops including a first circulating memory loop having storage for an odd number of fixed length words, a reading station for said first loop, a writing station for said loop, a second circulating memory loop two words long synchronized with said first loop, a writing station for said second loop, a reading station for said second loop located downstream from said writing station, clock means, input signal means operatively connected to the writing station for the said second loop, a distributing bit counter interconnecting the said input signal means and second loop writing station, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network including character input means having gates for passing bits read by the reading head of said second loop through said anticipating shift register and subsequently through said order shift register and into the writing head of said second loop during the precess state of said word counter, and to pass the signals from said input means in bit sequence as determined by said distributing bit counter into the writing head of said second loop during the execute state of said word counter.

35. In a computer, the combination comprising epicyclic memory loops including a first circulating memory loop having storage for an odd number of fixed length words, a reading station for said first loop, a writing station for said loop, a second circulating memory loop two words long synchronized with said first loop, a writing station for said second loop, a reading station for said second loop located downstream from said writing station, clock means, an output register operatively connected to the second loop reading station, a distributing bit counter interconnecting the said output register and second loop reading head, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network including character output means having gate means for passing bits read by the reading head of said second loop through said anticipating shift register and subsequently through said order shift register into the writing head of said second loop during the precess state of said word counter, and to distribute the bits read by the reading head of said second loop by means of said distributing bit counter into said output register during the execute state of said word counter.

36. In a computer, the combination comprising epicyclic memory loops including a first circulating memory loop having storage for an odd number of fixed length words, a reading station for said first loop, a writing station for said loop, a second circulating memory loop two words long synchronized with said first loop, a writing station for said second loop, a reading station for said second loop located downstream from said writing station, clock means, add-subtract means having inputs operatively connected to the first and second loop read stations and having an output operatively connected to the second loop writing station, a one bit word counter for counting the signals from said clock means thereby alternately to define a first period of time designated as the precess time and a second period of time designated as the execute time, an order shift register for holding and processing orders, an anticipating shift register between the reading and writing heads of said second loop, and a logical gating network including the said add-subtract means and having gate means for passing bits read by the reading head of said second loop through said anticipating shift register and subsequently through said order shift register and into the writing head of said second loop during the precess state of said word counter, and to pass bits read simultaneously from said first loop and said second loop as serial input operands into the input of said add-subtract means while passing the output bits from said add-subtract means into the writing head of said second loop during the execute state of said word counter.

37. In a computer, the combination comprising epicyclic memory loops including a first circulating memory loop having storage for an odd number of fixed length words, a reading station for said first loop, a writing station for said loop, a second circulating memory working loop two words long synchronized with said first loop, a writing station for said second loop, a reading station for said second loop located downstream from said writing station, clock means, add-subtract means interconnecting the read and write stations of the second loop, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network including displacement addressing means including gate means for passing bits read by the reading head of said second loop into said add-subtract means as one input operand while applying a fixed signal as the other input operand while passing the output of said add-subtract means into the writing head of said working loop during the precess state of the word counter, and to pass the bits read by the reading head of said working loop through said anticipating shift register into the writing head of said working loop during the execute state of the said word counter.

38. In a computer, the combination comprising a first circulating memory loop having storage for an odd number of fixed length words, a reading station for said first loop, a writing station for said loop, a second circulating memory loop two words long synchronized with said first loop, a writing station for said second loop, a reading station for said second loop located downstream from said writing station, clock means, a carry-borrow memory operatively interconnected between the first loop reading head and the second loop writing head, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network including means responsive to a change of state in the said carry-borrow memory for passing bits from the reading head of said first loop into the writing head of said second loop during the precess time period.

39. In a computer, the combination comprising a first circulating memory loop having storage for an odd number of fixed length words, a reading station for said first loop, a writing station for said loop, a second circulating memory loop two words long synchronized with said first loop, a writing station for said second loop, a reading station for said second loop located downstream from said writing station, clock means, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network including gate means operatively interconnected between the read and write stations of the second loop for passing bits read by the reading head of said second loop through said anticipating shift register thence through said order shift register into the writing head of said second loop during the precess state of said word counter, and to pass the bits read by the reading head of said second loop through a number of stages of said anticipating shift register equal to one bit less than the capacity of said register and for thereafter passing said bits into the writing head of said second loop during the execute state of the said word counter to thereby effect a shift right to the binary signals so as to effectively divide the initial number by the quantity two.

40. In a computer, the combination comprising a first circulating memory loop having storage for an odd number of fixed length words, a reading station for said first loop, a writing station for said loop, a second circulating memory loop two words long synchronized with said first loop, a writing station for said second loop, a reading station for said second loop located downstream from said writing station, clock means, add-subtract means having two input leads connected to the second loop read station and having its output connected to the second loop write station, a one bit word counter for counting the signals from said clock means thereby alternately to define a first period of time designated as the precess time and a second period of time designated as the execute time, an order shift register for holding and precessing orders, an anticipating shift register between the reading and writing heads of said second loop, and a logical gating network including gate means for passing bits read by the reading head of said second loop through said anticipating shift register thence through said order shift register into the writing head of said second loop during the precess state of said word counter, and for further passing bits read from said second loop into both input leads to said add-subtract means while passing the output bits from said add-subtract means into the writing head of said second loop during the execute state of said word counter so as to cause the signals initially read from the second loop to be shifted left so as to effectively multiply the number represented by the initial signals, by the quantity two.

41. A computer system comprising: a cyclical storage device comprising a first information track having a plurality of bivalued signals representing a binary number group and an instruction group recorded thereon, said instruction signals group representing a plurality of instructions arranged in signal combinations each corresponding to an operation upon information in said computer; timing means to alternately define a first period of time designated as the precess time when instruction signals are normally shifted through the registers, and a second period of time designated as the execute time when one of the instructions operates upon the numerical information in accordance with the instruction order, signal transfer means including a read transducer for reading signals from said first information track, a write transducer for writing signals on said track, a shift register interconnected between the said read and write transducers whereby the instruction word group may be precessed through the shift register from the read head to the write head, means for causing the shift register to cease shifting so as to temporarily store the high order instruction in the shift register during the precess time and to have the temporarily stored instruction operate upon the next succeeding binary group during the next execute time, means for resetting the shift register to thereby automatically generate predetermined signal information in the shift register to replace the instruction signal which has been executed, and means for continuing the process of precess, use one instruction, and substitute any predetermined signals for the instruction until all of the instructions of a command group have been executed or until a command group breaks the sequence.

References Cited in the file of this patent

UNITED STATES PATENTS

| | | |
|---|---|---|
| 2,954,166 | Eckdahl | Sept. 27, 1960 |
| 2,978,175 | Newman et al. | Apr. 4, 1961 |